(12) United States Patent
Anderson et al.

(10) Patent No.: US 6,266,176 B1
(45) Date of Patent: Jul. 24, 2001

(54) DEVICE FOR OPTICAL INTERCONNECTION

(75) Inventors: Betty Lise Anderson, Gahanna; Stuart A. Collins, Worthington, both of OH (US)

(73) Assignee: The Ohio State University, Columbus, OH (US)

( * ) Notice: Subject to any disclaimer, the term of this patent is extended or adjusted under 35 U.S.C. 154(b) by 0 days.

(21) Appl. No.: 09/688,904

(22) Filed: Oct. 16, 2000

Related U.S. Application Data

(63) Continuation-in-part of application No. 09/645,136, filed on Aug. 24, 2000
(60) Provisional application No. 60/150,889, filed on Aug. 29, 1999.

(51) Int. Cl.[7] .................................................. G02F 1/03
(52) U.S. Cl. .................. 359/245; 359/291; 359/619; 359/237; 359/246; 359/247; 359/320; 385/16; 385/18; 385/42
(58) Field of Search .................................. 359/290, 291, 359/298, 618, 619, 629, 583, 237, 245, 246, 320, 321, 247; 385/2, 14, 16, 18, 42, 40

(56) References Cited

U.S. PATENT DOCUMENTS

| | | | |
|---|---|---|---|
| 4,225,938 | 9/1980 | Turpin | 708/816 |
| 4,474,434 * | 10/1984 | Carlsen et al. | 359/320 |
| 4,474,435 * | 10/1984 | Carlsen et al. | 359/320 |
| 5,117,239 | 5/1992 | Riza | 342/375 |
| 5,319,477 | 6/1994 | DeJule et al. | 349/65 |
| 5,463,497 * | 10/1995 | Muraki et al. | 359/619 |
| 5,465,175 * | 11/1995 | Woodgate et al. | 359/619 |
| 5,936,759 * | 8/1999 | Buttner | 359/291 |
| 6,064,506 * | 5/2000 | Koops | 359/237 |

* cited by examiner

Primary Examiner—Loha Ben
(74) Attorney, Agent, or Firm—Standley & Gilcrest LLP

(57) ABSTRACT

The present invention includes optical interconnection devices and optical interconnection systems. The invention also includes machines and instruments using those aspects of the invention. The invention may also be used to upgrade, repair, or retrofit existing machines or instruments, using methods and components known in the art. An optical interconnection device of the present invention utilizes a multiple-pass optical cell. This approach differs from previous approaches in that spatial light modulators are used in a White cell device or other multiple-pass optical configuration. In a spatial light modulator, each individual element typically only has two or three variations used to direct the light. Therefore, precise calibration is not needed. The light simply needs to be directed towards the appropriate arm of the optical cell, which utilizes a self-correcting mirror in order to direct a light stream to the next desired location in the system.

51 Claims, 33 Drawing Sheets

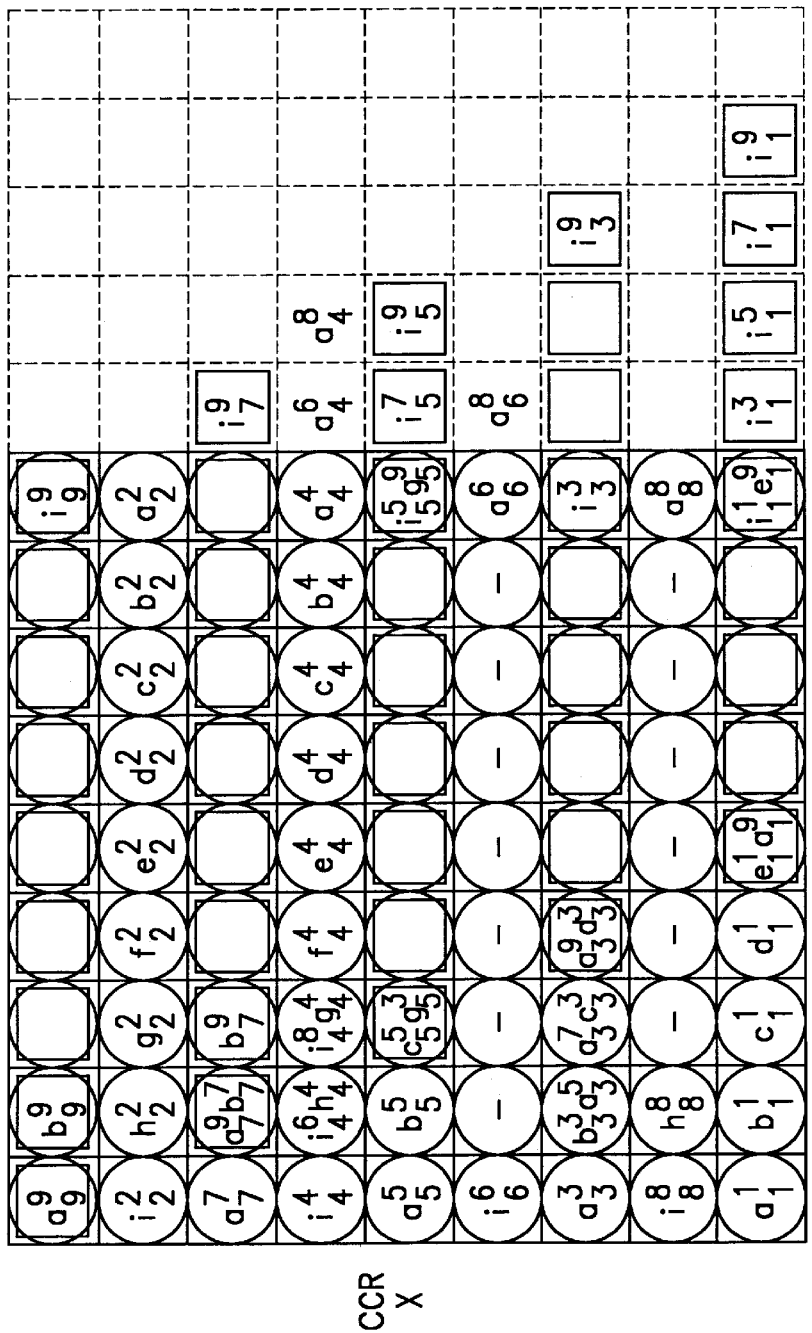
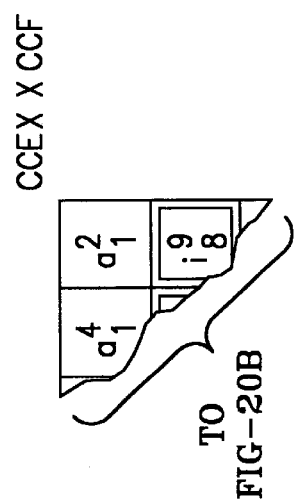
FIG-20A

FIG-20B

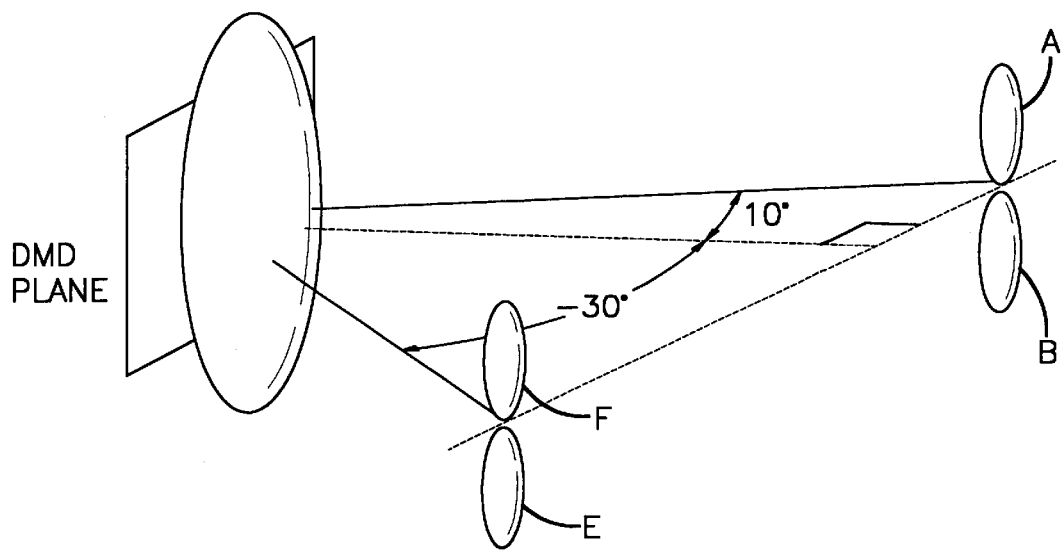
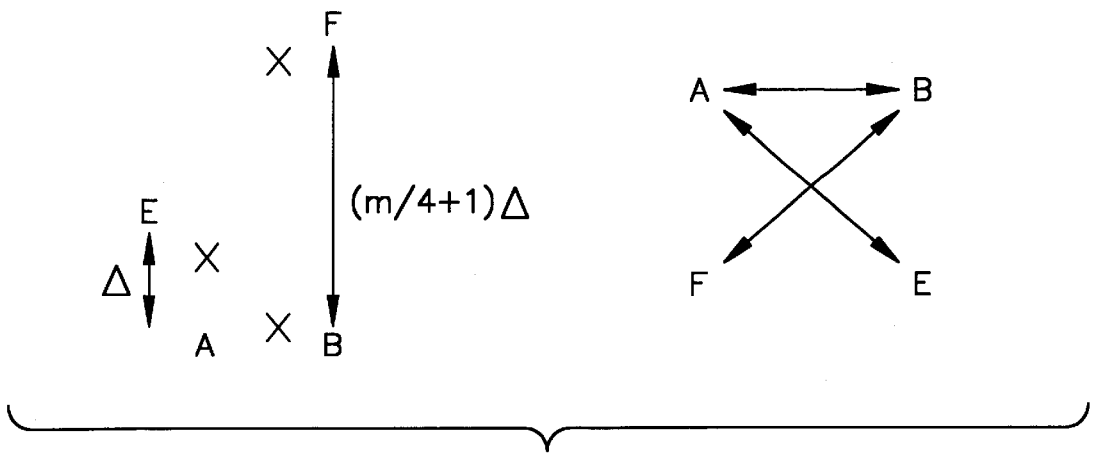
FIG-32

DEVICE FOR OPTICAL INTERCONNECTION

This application is a continuation-in-part application of application Ser. No. 09/645,136 filed Aug. 24, 2000 claiming the benefit of Provisional Application Serial No. 60/150,889 filed Aug. 29, 1999.

TECHNICAL FIELD OF THE INVENTION

The present invention is in the field of optical interconnection devices, such as those that may be useful in routing information for communications systems.

BACKGROUND OF THE INVENTION

This invention relates to apparatus supporting optical interconnection, such as those that may be useful in the routing of signals in the communications industry. In communications systems such as telecommunications systems, optical signals currently must be downconverted to an electrical signal before being transmitted over long distances. The transmission rate of these electrical signals is much slower than that of optical signals. This conversion is a barrier to a fast Internet system capable of delivering applications requiring significant bandwidth, such as streaming on-demand video and music. It is therefore desirable to use a system that keeps signals in their optical form without having to convert to a slower, less-efficient electrical system.

One area to be addressed is the electronic switches in fiber-optic backbones. Backbones are expensive communications links between major cities. Optical fibers often carry information to central hubs in these major cities, then creating a bottleneck at each hub while all this information waits to be converted into electrons and switched by bulky electronic switches. This conversion process was sufficient when fiber optics carried only one signal over a limited distance, but electronics now have difficulty keeping up with the newly complex signals.

The industry has turned its attention toward photonic switches. Photonic switches do not require signal downconversion, and are capable of optically directing even complex light streams. Several variations of these photonic switches have been reported. Agilent reportedly uses bubbles to deflect light between crisscrossing glass columns in order to direct light back and forth to the switches. Corning is reportedly investigating liquid crystals to redirect the light streams. Bell Labs is reportedly using tiny micromirrors to direct beams to the appropriate fibers. While these systems are much smaller than the previous switching systems, and may effectively achieve the desired optical switching, they can be very complex. For example, in the Bell Labs device where an array of micromirrors is used to direct beams to the appropriate fiber, each mirror must be accurately calibrated to send a beam to any of the appropriate fibers. The calibration must also take into account any minute variation in position from fiber to fiber, an array of fibers not being aligned in perfect rows and columns.

It is therefore an object of the current invention to create a photonic switching device that is compact in design, relatively simple to setup and operate, and can effectively route multiple complex light streams.

Although described with respect to the field of communications, it will be appreciated that similar advantages of optical routing, as well as other advantages, may obtain in other applications of the present invention. Such advantages may become apparent to one of ordinary skill in the art in light of the present disclosure or through practice of the invention.

SUMMARY OF THE INVENTION

The present invention includes optical interconnection devices and optical interconnection systems. The invention also includes machines and instruments using those aspects of the invention. The invention may also be used to upgrade, repair, or retrofit existing machines or instruments, using methods and components known in the art.

The present invention includes an optical interconnection device utilizing a multiple-pass optical cell and at least one spatial light modulator. In a spatial light modulator, each individual element typically only has two or three variations used to direct the light. In an optical configuration of the present invention, such as a White cell, precise calibration of each individual element is not needed. The light simply needs to be directed toward the appropriate arm of the optical cell, which utilizes a self-correcting mirror in order to direct a light stream to the next desired location in the system.

An optical interconnection apparatus included in the present invention utilizes at least one input light source to generate an array of light beams. A light beam may be of any appropriate wavelength, and it should be understood that an input signal may also comprise any appropriate beam that can carry information and be directed by the elements of the present system. An input mirror may be used to reflect this array to an optical configuration, such as a White cell or equivalent optical device or array, comprising a plurality of optical elements such as mirrors, lenses, gratings, and prisms. These elements are configured so as to define multiple possible light paths for each light beam in the array. At least one refocusing optical element preferably restricts the divergence of a light beam diverted by the optical elements through at least one of the light paths. A spatial light modulator selects a path from among the light paths for each pass of a light beam through the optical elements. Each beam will undergo multiple reflections off the spatial light modulator. An output plane then receives each light beam emerging from the optical elements. The output plane preferably has two dimensions. The resultant position of each light beam on the output plane is determined in part by the position of the light beam in the input array. The particular light paths traveled by the beam through the optical elements also determine the output location. The emerging light beams may also be placed across a non-planar array to form a non-planar pattern, and the position determined accordingly (although this may make positional determination more difficult).

In another apparatus for optical interconnection included in the present invention, at least one input light source generates at least one individual light beam from at least one direction. An input mirror preferably reflects the beam(s) to a first optical configuration, such as a first White cell or equivalent optical device or array. The first optical configuration is made up of a first plurality of optical elements configured so as to define a plurality of possible light paths for each light beam, and a first spatial light modulator adapted to select a path for each pass of a light beam through the first plurality of optical elements.

The apparatus also utilizes a second optical configuration, such as a second White cell or equivalent. The second optical configuration receives as input any light beams emerging from the first optical configuration. The second optical configuration is made up of a second plurality of optical elements configured so as to define a plurality of possible light paths for each light beam emerging from the first optical configuration, and a second spatial light modulator adapted to select a path from among the light paths for each pass of a light beam through the second plurality of optical elements. The apparatus preferably utilizes an output mirror to reflect each light beam emerging from the second optical configuration. At least one receiving device then receives any emerging light beam. The first and second optical configurations are configured such that a similar period of time is needed for each light beam to pass from the input light source through the optical configurations to the receiving device. The first and second pluralities of optical elements preferably comprise mirrors, lenses, gratings, quarter wave plates, and prisms.

Alternatively, the first and second spatial light modulators may be replaced by a single spatial light modulator. The spatial light modulator is then shared by the two optical configurations, preferably having a portion dedicated to each. The pluralities of optical elements have to be arranged accordingly.

The present invention also includes an optical switching apparatus. The apparatus has as an input source at least one input optical fiber, each input optical fiber adapted to carry an optical signal. An input mirror preferably then reflects the optical signal into a first optical configuration, such as a White cell. The first optical configuration has a first plurality of optical elements configured so as to define a plurality of possible light paths for each optical signal reflected by the input mirror. The first optical configuration also has a first spatial light modulator adapted to select a path from among the light paths for each pass of an optical signal through the first plurality of optical elements. Each beam will undergo multiple bounces off the spatial light modulator. The apparatus also has a second optical configuration, the second optical configuration adapted to receive as input an optical signal emerging from the first optical configuration. The second optical configuration has a second plurality of optical elements configured so as to define a plurality of possible light paths for each optical signal emerging from the first optical configuration. A second spatial light modulator, or another portion of the first spatial light modulator, then selects a path from among the light paths for each pass of an optical signal through the second plurality of optical elements. A plurality of output optical fibers is then used to receive the optical signals exiting the second optical configuration. The first and second optical configurations are adapted such that a similar period of time is needed for each optical signal to pass from an input optical fiber to an output optical fiber.

BRIEF DESCRIPTION OF THE DRAWINGS

FIG. 20 is another diagram showing spot progression in accordance with one embodiment of the present invention.

FIG. 32 is a perspective view showing a dual White cell using a two-position DMD in which there are four White cell mirrors instead of three, in accordance with one embodiment of the present invention.

DETAILED DESCRIPTION OF THE PREFERRED EMBODIMENT(S)

In accordance with the foregoing summary, the following presents a detailed description of the preferred embodiment of the invention that is currently considered to be the best mode.

Figure 1:
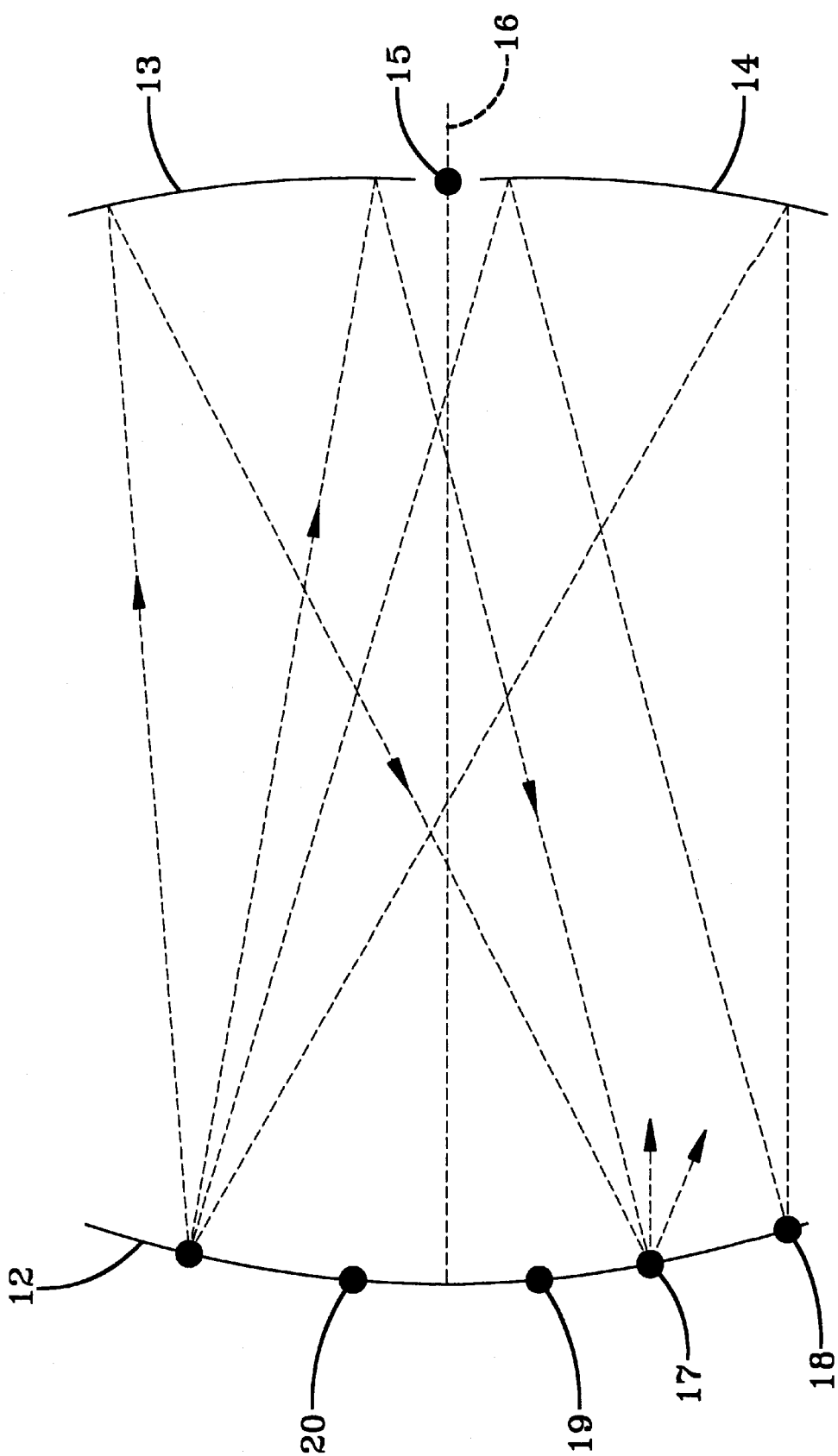
FIG. 1 is a top view of a standard optical cell configuration on which one embodiment of the present invention is based.

The present invention is based on the traditional White cell and its equivalent optical systems or arrays. FIG. 1 is a diagram of the path of a light beam passing through a White cell. The cell comprises three identical spherical mirrors, all of the same effective radius of curvature. The first mirror 12 is separated from the second 13 and third 14 mirrors by a distance equal to their radii of curvature. The center of curvature 15 of the first mirror lies on the centerline or optical axis 16 and falls between the second and third mirrors. The second and third mirrors are aligned so that the center of curvature 20 of the second mirror 13 and the center of curvature 19 of the third mirror 14 land on the first mirror, for example an equal distance from the optical axis. Light from the second mirror is imaged onto the third mirror, and vice versa. Light is input onto a spot 18 in the plane of, but off the edge of, the first mirror; the light beam is prepared so that it expands as it goes to the third mirror. The third mirror refocuses the beam to a point on the first mirror. The beam is then reflected to and expanded at the second mirror. The second mirror refocuses the light beam to a new spot 17 on the first mirror. At this point, the light may either exit the cell if the spot is off the edge of the first mirror, or continue to traverse the cell. The beam may traverse the cell a predetermined number of times, depending on the locations of the centers of curvature of the second and third mirrors.

Figure 2A:
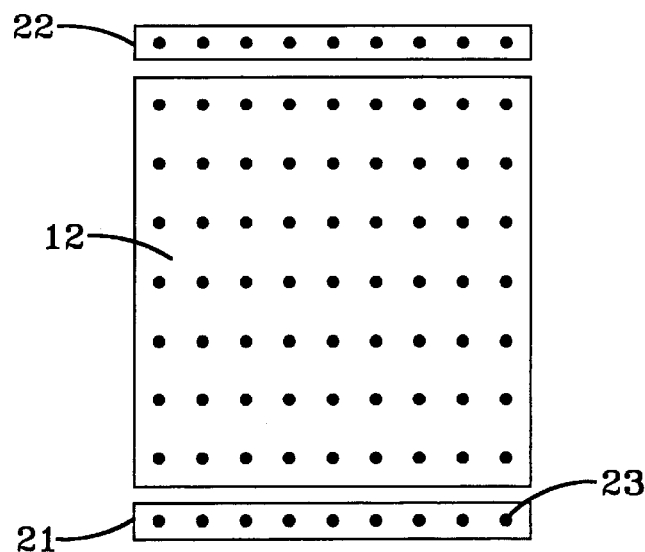
FIG. 2(a) is a front elevational view of the spatial light modulator, along with the input and output mirrors in accordance with the present invention.

The angle of the input beam may be controlled by an input turning mirror 21, as shown in FIG. 2(a). The angle of the output beam may similarly be controlled by an output turning mirror 22. The input spot of each light beam is shown by a spot 23 on the turning mirrors, and each bounce is shown by a spot on the first mirror 12. A spatial light modulator or other appropriate device may alternatively replace the first mirror. A beam of light may be reflected off the input turning mirror into the White cell, and may traverse the cell until the beam is directed to the output turning mirror, at which point it may exit the cell.

Figure 3:
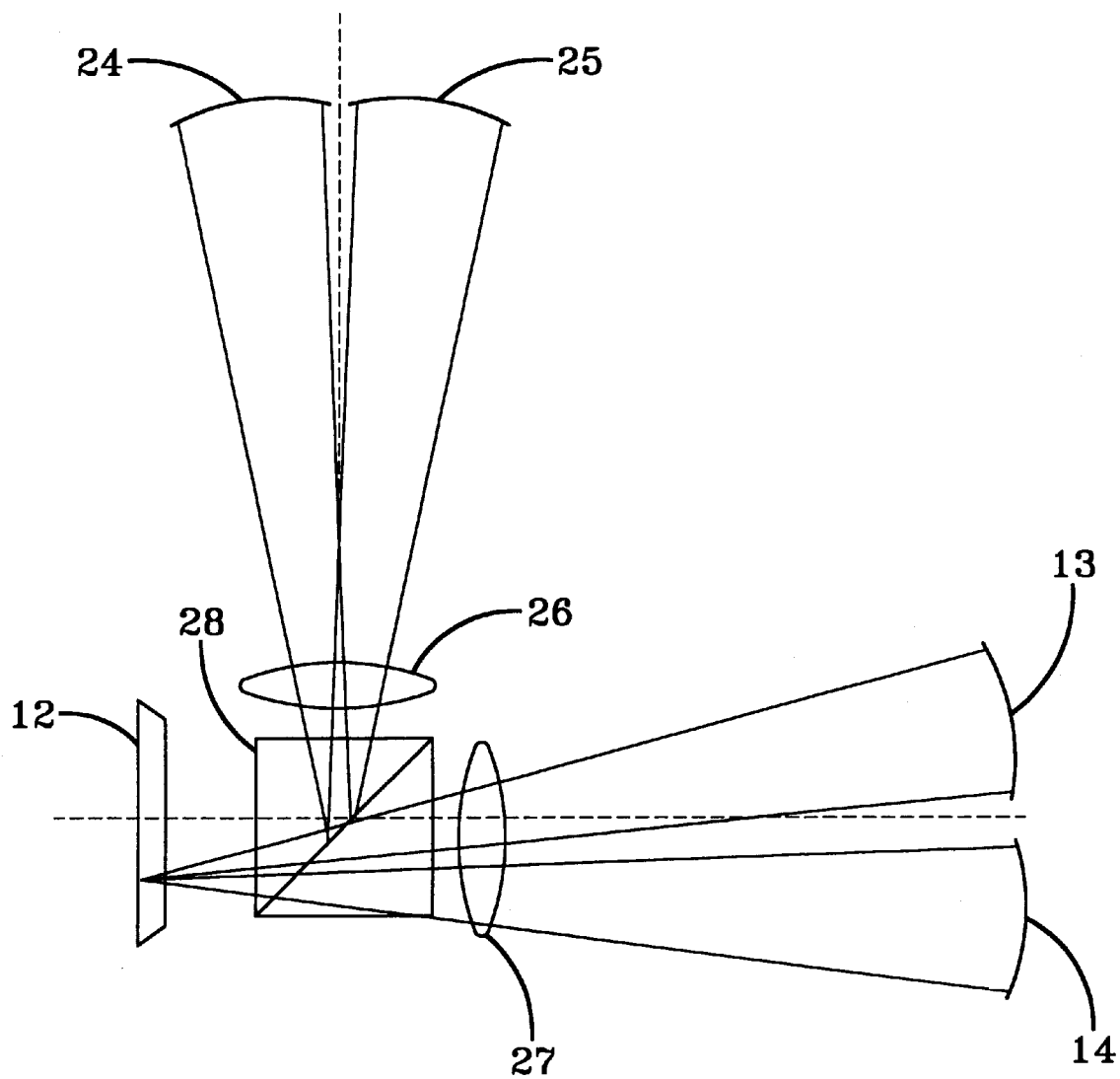
FIG. 3 is a top view of the dual-arm cell with a beam splitter in accordance with one embodiment of the present invention.

FIG. 3 shows a first modification to the White cell to adapt it to variable applications. A first modification is to change the first mirror 12 from a curved mirror to a flat one and to add a lens 27 of focal length such that the lens-mirror combination is optically equivalent to the mirror it replaces. Next, the flat mirror may be replaced with a spatial light modulator. This particular spatial light modulator may be configured to rotate the direction of polarization of the reflected beam by ninety degrees at any particular pixel that is activated. A polarizing beam splitter 28 may be added, and the distances to the second 13 and third 14 mirrors may be adjusted to maintain imaging. The input light may be polarized in the plane of the figure. The beam splitter may reflect light polarized in the plane perpendicular to the figure but transmit light polarized parallel to the plane of the figure.

A better photonic device may be implemented by next adding a fourth mirror 24 and fifth mirror 25, where these mirrors are identical to the second and third mirrors. There now exist dual cells joined at the beam splitter. A lens 26 length may be added to the other output side of the beam splitter.

Figure 4:
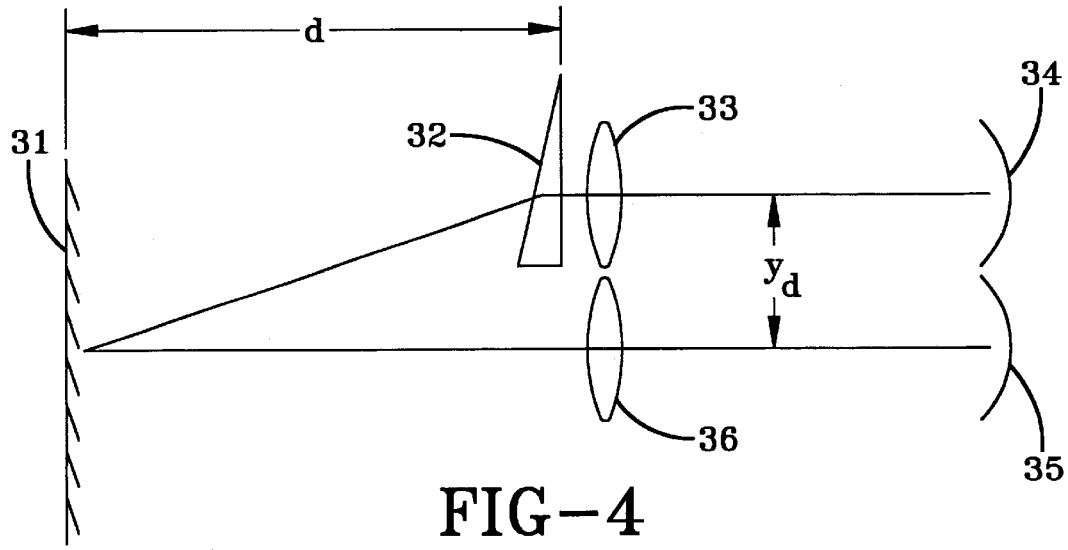
FIG. 4 is a diagram of an optical configuration using a deformable mirror device spatial light modulator and an appropriate prism in accordance with one embodiment of the present invention.
Figure 5:
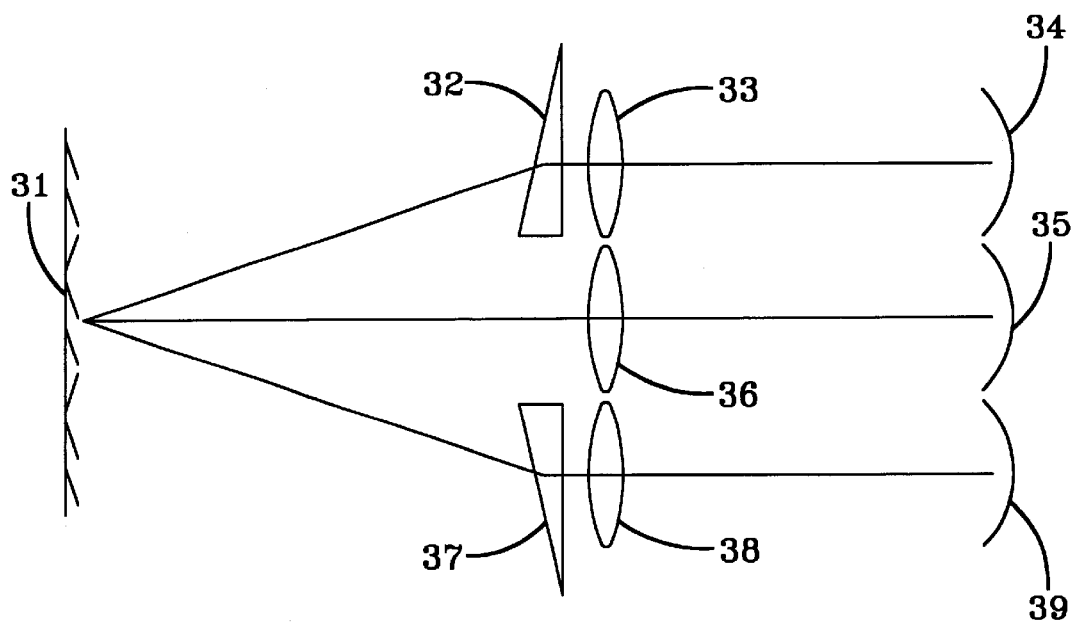
FIG. 5 is a diagram of a multiple arm version of the deformable mirror device configuration in accordance with one embodiment of the present invention.

If a deformable mirror device spatial light modulator 31 is used, a simple White cell can be constructed as shown in FIG. 4. A prism 32 may be used to direct the light beam through a focusing lens 33 onto the appropriate mirror 34 off the optical axis. FIG. 5 also shows that another prism 37 may be introduced to direct light from the deformable mirror device spatial light modulator 31 through a refocusing lens 38 onto the other off-axis mirror 39 in the dual-arm configuration.

A prism such as 32 and its adjacent lens such as 33 may be replaced with a single lens that is appropriately tilted or decentered or both.

Materials and Methods

Imaging Conditions. An analytical description of one arm of the White cell is presented. The configuration to be described is shown in FIG. 3. At the right of the figure, a White cell spherical mirror B (14) is shown below the axis and a White cell mirror C (13) above the axis. The center of curvature of White cell mirror B is a distance $\delta_1$ above the optical axis (shown by the dotted line in the figure passing between mirrors B and C). The center of curvature of Mirror C is a distance $\delta_2$ below the optical axis. To the left of the lower White cell mirrors is lens f1 27 with focal length $f_1$. Adjacent to it is the polarizing prism 28 represented by a cube of glass of side d, and next to that is a flat mirror perpendicular to the optical axis representing the SLM. To present the analytical description of the imaging requirements, optical ray matrices are used. These matrices operate on a column vector $$\begin{pmatrix} y \\ np_y \\ 1 \end{pmatrix}$$

where y, n, and $p_y$ refer to the projection of a ray on the y-z plane. The vector element y represents the displacement of the ray from the optical (z) axis at some value of z. The element $p_y$ represents the slope of the ray at that point and n is the refractive index in the region. The third matrix element "1" is used in representing a tilted spherical mirror as will be shown later. A similar analysis could be used with y replaced by x and $p_y$ replaced by $p_x$ for the projection of the ray on the x-z plane. 3×3 ray matrices are used because they will be useful in representing the tilted spherical mirrors. Three ray matrices are used. The first is the matrix T(d, n), representing a translation through a material of refractive index n by a distance d in the axial direction.

$$T(d, n) = \begin{pmatrix} 1 & d/n & 0 \\ 0 & 1 & 0 \\ 0 & 0 & 1 \end{pmatrix}.$$

The second is the matrix L(f) representing a thin lens of focal length:

$$L(f) = \begin{pmatrix} 1 & 0 & 0 \\ -1/f & 1 & 0 \\ 0 & 0 & 1 \end{pmatrix}.$$

The thin lens matrix is identical to that of a spherical mirror of focal length f with its center of curvature on the axis.

A last matrix represents a spherical mirror tilted so that a line from the intersection of the mirror and the optical axis to the center of curvature, point CC, makes an angle $\theta$ with the optical axis. A ray comes from the lower left with slope $p_{y1}$ reflecting off the mirror at point P and leaving with slope $p_{y2}$. Line CCP is drawn from point P through the center of curvature. There are two lines parallel to the axis, one through the center of curvature and one through point P. Line CCP makes angle $\alpha_1$ with the incoming ray and angle $\alpha_2$ with the reflected ray. The center of curvature is a distance $\delta$ above the optical axis, and point P is a distance y above the optical axis and a distance y' above point CC.

There are five equations to be addressed for this situation. Since the angle of incidence equals the angle reflection, $\alpha_1 = \alpha_2$. For small angles $\alpha_1 = p_{y1} - (y'/R)$ and $\alpha_2 = p_{y2} + (y'/R)$. Also, $y = y' + \delta$ and $\delta = \theta R = 2\theta f$, where f is the focal length of the mirror. Combining these equations to eliminate $\alpha_1$, $\alpha_2$, y', and R, gives $p_{y2} - \theta = p_{y1} + \theta - y/f$, the equation relating $p_{y1}$, the ray slope before reflection off the spherical mirror with $p_{y2}$, the ray slope after reflection. This leads to the ray matrix M(f,$\theta$):

$$M(f, \theta) = \begin{pmatrix} 1 & 0 & 0 \\ -1/f & 1 & 2\theta \\ 0 & 0 & 1 \end{pmatrix}.$$

To use these matrices in practice, one may identify the translations, thin lenses, and mirrors encountered as a ray traverses an optical system. The associated matrices may then be multiplied together to represent the effect of the optical system on the ray. Call the product matrix S. There then results a matrix equation representing the ray slope-index products at the input and output $n_1 p_{y1}$ and $n_2 p_{y2}$ and the displacements of the ray from the axis at the input and output, $y_1$ and $y_2$:

$$\begin{pmatrix} y_2 \\ n_2 p_{y2} \\ 1 \end{pmatrix} = S \begin{pmatrix} y_1 \\ n_1 p_{y1} \\ 1 \end{pmatrix} \begin{pmatrix} A & B & G \\ C & D & H \\ I & J & K \end{pmatrix} \begin{pmatrix} y_1 \\ n_1 p_{y1} \\ 1 \end{pmatrix}.$$

This represents three simultaneous equations. For example, the first such equation is $y_2 = A y_1 + B\, n_1 p_{y1} + G$. This equation nicely relates the input and output ray positions. The requirement that there be imaging between the input and output planes is that matrix element B=0. That requirement allows solving for the desired distances or focal lengths.

To return to the optical system, there are four requirements for proper operation. The first requirement is that Mirror B be imaged onto Mirror C so that no light will be lost by rays starting from Mirror B and missing Mirror C. To establish this requirement, the system matrix S(B, C) is calculated for rays traversing from Mirror B to Mirror C. It is $S_{(B,C)} = T(d, 1)L(f_1)T(2d_1, n_1)L(f_1)T(d, 1)$. Inserting d, $d_1$ and $f_1$ in the appropriate matrices and multiplying the matrices together yields:

$$S_{(B,C)} = \begin{pmatrix} \{(1-(d/f_1))(1-(2d_1/n_1 f_1)) - (d/f_1)\} & 2\{(1-[d/f_1])(d+(d_1/n_1)(1-[d/f_1]))\} & 0 \\ -(2/f_1)(1-[d_1/n_1 f_1]) & (1/f_1)\{d+(2d_1/n_1)(1-[d/f_1])\}+(1-[d/f_1]) & 0 \\ 0 & 0 & 1 \end{pmatrix}.$$

The requirement that Mirrors B and C be conjugates then is that matrix element B be zero:

$$2\{(1-[d/f_1])(d+(d_1/n_1)(1-[d/f_1]))\} = 0.$$

This is used to give the desired focal length for lens $f_1$. There are two solutions: $f_1 = d$ and $f_1 = d/(1+[n_1 d/d_1])$. These solutions represent symmetric and anti-symmetric ray patterns about the SLM. In the first solution a point on Mirror B has an image at infinity which gives an image on Mirror C with a magnification of −1. In the second solution a point on Mirror B has an image on the SLM. This also gives an image on Mirror C with a magnification of +1. The first solution works very nicely for this situation. This puts Mirrors B and C in the focal plane of lens f1. The same analysis applies to Mirrors E 25 and F 24 and lens f2 26 as shown in FIG. 3. Mirrors E and F are in the focal plane of lens f2.

The second requirement is that Mirrors E and F be images of each other.

Considering requirements three and four that a point on the SLM be imaged back onto itself through each cell, take f to be the focal length of mirror B. The system matrix for that case is given by $S = T(d_1 n_1)L(f_1)T(d,1)L(f,\theta)T(d,1)L(f_1) T(d_1,n_1)$. Multiplying the appropriate matrices together and putting $f_1 = d$ as required by the first imaging condition results in $$S = \begin{pmatrix} -1 & 2(d-[d_1/n_1]) - (d^2/f) & 0 \\ 0 & -1 & 0 \\ 0 & 0 & 1 \end{pmatrix}.$$

The imaging condition is then $B = 0 = 2(d-[d_1/n_1]) - (d^2/f)$, or $f = d/\{2(1-[d_1/n_1 d])\}$. This equation allows predicting the required focal length for the spherical mirrors.

The equation also has some interesting implications leading to physical meaning. For the first one, consider the image of the center of curvature of Mirror B through lens f1. The radius of curvature of Mirror B is 2f and the distance of its center of curvature from lens f1 is d−2f. Then the distance of the image from the center of curvature, call it $d_{cc}$, is given by $1/d_{cc} + 1/(d-2f) = 1/f_1$. Eliminating f in these equations and simplifying results in $d_{cc} = d_1/n_1$. That is, the image of the center of curvature of Mirror B lies on the SLM surface. The image of the center of curvature of mirror B on the SLM can be called the center of curvature point.

To find out where on the SLM surface the center of curvature point is located, look to the magnification. The y value of the image of the center of curvature point, call it $y_{cci}$ is given by the y value of the center of curvature itself, $y_{cco}$, times the magnification, or $y_{cc}=y_{cco}\times$magnification$=2f\theta\times(-$image distance$/n_1)/$(object distance$)=2f\theta\times\{-d_1/(n_1[d-2f])\}$. Using a previous equation for 2f and simplifying gives $y_{cc}=\theta d$, which has a very nice interpretation. If a line is drawn from the intersection of the optical axis with Mirror B through the center of curvature of Mirror B, then the intersection of that line, extended if necessary, with lens f1 is a distance $\theta d$ from the axis. The projection of that intersection onto the SLM gives the center of curvature point.

There is a further interpretation in terms of point sources on the SLM that are imaged back onto the SLM. Writing the first linear equation for the system matrix gives $y_2=-y_1+2\theta d$. Here, $y_1$ is the location of a point source on the SLM and $y_2$ is the location of its image after the light from the source has passed through lens f1, been reflected off Mirror B and passed back through lens f1. Defining $\delta=\theta d$ and rewriting this equation gives $(y_2-\delta)=-(y_1-\delta)$. This is interpreted in terms of a distance $\delta$. The interpretation is that the image formed by Mirror B of a point on the SLM is as far above the center of curvature image as the object is below the center of curvature point.

The behavior in the x direction is identical, with the exception that Mirror B is tipped only in the y direction so that $\theta=0$. The x equation equivalent is $x_2=-x_1$. Since the center of curvature point is on the y axis, an image of a point source from the center of curvature is as far from the source point as the object was, but on the opposite side in both the x and y directions. To find the image of a point source on the SLM, one can merely reflect about the center of curvature point.

Deformable Mirror Device SLM. To derive a ray matrix for a particular situation two equations are needed, one showing how the distance of a ray from the axis changes as the ray moves through the object, and the other showing how the ray slope changes. Some pixel-mirrors of the DMD are oriented with their normals at $+\theta$ and some at $-\theta$. The surface of the DMD may be defined as a vertical line (y direction) intersecting the center of each pixel so that part of the pixel is behind the surface and part is in front of it. A ray can enter from the right with an angle $p_o$ and intersect the pixel at a distance y above the center of the pixel, then be reflected off the pixel. At the point the ray intersects the pixel, it is a distance $d=y\tan\theta$ behind the surface. In going from the surface to the pixel, the height of the ray has increased a distance $d\tan p_o=y\tan\theta\tan p_o$. After reflection from the pixel, the ray again passes through the surface. In doing so, the height has further increased a height $d\tan(p_o+2\theta)=y\tan\theta\tan(p_o+2\theta)$. The height has changed by a total distance $\Delta y=y\tan\theta[\tan(p_o)+\tan(p_o+2\theta)]$.

The ray matrices deal with paraxial rays so that $p_o<<\pi$, and $\theta=10°<<180°$, also a small angle. Putting the tangent of the angle equal to the angle, the increase in height $\Delta y=2y\theta(\theta+p_o)$. The net result of all these steps is that the increase in height is proportional to the product of small angles and can be neglected. Thus the first matrix ray equation relates the input y value, $y_o$, with the output y value, $y_1$, as $y_1=y_o$. The second equation is the one for the slopes. Using the law of reflection, the incident slope, $p_o$, and the reflected slope, $p_1$, are related as $p_1-\theta=p_o+\theta$, or $p_1+p_o+\theta$. Combining these equations into a 3×3 ray matrix yields the ray matrix for the DMD:

$$\begin{pmatrix} y_1 \\ p_1 \\ 1 \end{pmatrix} = \begin{pmatrix} 1 & 0 & 0 \\ 0 & 1 & 2\theta \\ 0 & 0 & 1 \end{pmatrix} \begin{pmatrix} y_o \\ p_o \\ 1 \end{pmatrix}.$$

There is an addendum that can be mentioned, where the discussion could also apply to reflection off a tipped plane mirror if extending the edge of the pixel-mirror. Thus, the matrix equation also applies to a tipped plane mirror if the tip angle is small. If the tip angle is not a small angle, however, then the approximation does not hold and there will be an increase in distance from the axis.

Next, a prism with a small angle is considered. A prism with its apex pointing down can be considered. The refractive index of the prism material is n. The two large sides make small angles $\alpha_o$ and $\alpha_1$ with the vertical. A ray with slope $p_o$ and height $y_o$ can come in from the right, be refracted at the interfaces, and leave. Since the angles between the surfaces and the vertical are small, arguments like those used previously for the mirror can be used to show that the vertical displacement in crossing the prism can be neglected. The first matrix equation is then $y_1=y_o$. Snell's law can be used to derive the equation for the change of slope. The entering ray has a slope $p_o$. The slope of the ray exiting the surface is p'. The angle between the ray entering the surface and the normal is $p_o-\alpha_0$. Similarly, the angle between the ray exiting the surface and the normal is $p'-\alpha$. Snell's law is then $\sin(p_o-\alpha_o)=n\sin(p'-\alpha_o)$, or using the small angle restriction, $np'=p_o+2(n-1)\alpha_0$. A comparable equation can be written for the ray as it exits the left-hand surface: $p_2=np'+(1-n)\alpha_1$.

Eliminating p' and defining the prism angle, $\alpha=\alpha_o-\alpha_1$, we have the equation for the change of slope by the prism, $p_2=p_1+(n-1)\alpha$. The ray matrix for the small angle prism is then:

$$\begin{pmatrix} y_2 \\ p_2 \\ 1 \end{pmatrix} = \begin{pmatrix} 1 & 0 & 0 \\ 0 & 1 & (n-1)\alpha \\ 0 & 0 & 1 \end{pmatrix} \begin{pmatrix} y_2 \\ p_2 \\ 1 \end{pmatrix}.$$

Discussion

A dual White cell is shown in FIG. 3 connected by a polarizing prism beamsplitter. The mirror in the optical spatial light modulator 12 and spherical mirrors B (13) and C (14), combined with lens f1 (27), constitute one White cell, hereafter referred to as Cell I. The mirror in the SLM and spherical Mirrors E (24) and F (25), combined with lens f2 (26), constitute a second White cell called Cell II. The distances between the SLM and Mirrors B and C are the same, and the distances for light reflected off the polarizing beamsplitter going to Mirrors E and F are the same. The distance from the SLM to Mirrors E and F is also the same as the distance from the SLM to Mirrors B and C. In operation, a light beam bounces from the SLM to one of Mirrors B, C, E and F and back again on each traverse of the cell.

The polarizing beamsplitter and the SLM determine which cell the beam goes to on each pass. The polarizing beam splitter transmits light of one polarization, say the plane of the figure, and reflects light of the polarization perpendicular to the plane of the figure. If the light starts out going to Mirror B with polarization in the plane of the figure and the SLM does not change the polarization, it is then reflected back and forth between the SLM and Mirrors B and C. Conversely, if the light starts towards Mirror E with polarization perpendicular to the plane of the figure and the SLM does not change the polarization, it will continue to reflect between the SLM and Mirrors E and F. The path of a beam can be changed from one cell to the other by using the SLM to rotate the plane of polarization as the beam bounces off the SLM.

Five possible imaging conditions are examined. First, the focal length of lens f1 is chosen to image Mirror B onto Mirror C and vice versa. Second, similar to the first condition, the focal length of lens f2 is chosen to image Mirror E onto Mirror F and vice versa. This requirement may be met by placing Mirrors B and C in the right hand focal plane of lens f1 and by placing Mirrors E and F in the focal plane of lens f2. The third condition is that Mirror B should be imaged onto Mirror F, and Mirror C should be imaged onto Mirror E. The requirement that Mirrors B and C be in the focal plane of lens f1 together with the requirement that Mirrors E and F be in the focal plane of lens f2 also satisfies this condition.

The last two imaging conditions are also comparable. The fourth condition is that the focal lengths of Mirrors B and C are chosen so that, in conjunction with lens f1, Mirrors B and C image a small spot of light on the SLM back onto another small spot on the SLM. The last condition is that the focal lengths of Mirrors E and F are chosen so that, in conjunction with lens f2, a small spot of light on the SLM is again imaged back onto the SLM.

In operation, a point of light starts on a small mirror next to the SLM called a turning mirror. The light is directed towards Mirror B. Suppose the light is polarized in is the plane of FIG. 3 so that it is not reflected off the polarizing beam splitter. Mirror B images the spot back onto the SLM. In one scenario, the light is reflected off the SLM and imaged by lens f1 onto Mirror C, which images it to a different spot on the SLM. It then goes to mirror B, which again images it onto the SLM. The light bouncing back and forth forms a sequence of spots on the SLM.

If the polarization is changed by the SLM to be perpendicular to the plane of the figure, the light bounces in a similar fashion back and forth between Mirrors E and F and the SLM. The plane of polarization of the light can be changed at any bounce off the SLM so that any combination of paths in cells one and two can be chosen.

Considering the exact locations of the spots of light on the SLM, there are various configurations, depending on the locations of the centers of curvature of Mirrors B, C, E and F and also depending on the size of the SLM. The centers of curvature of Mirrors E and F may be located at different points than those of Mirrors B and C. Reference will only be made to the centers of curvature of Mirrors B and C in describing the spot patterns for simplicity.

Figure 2B:
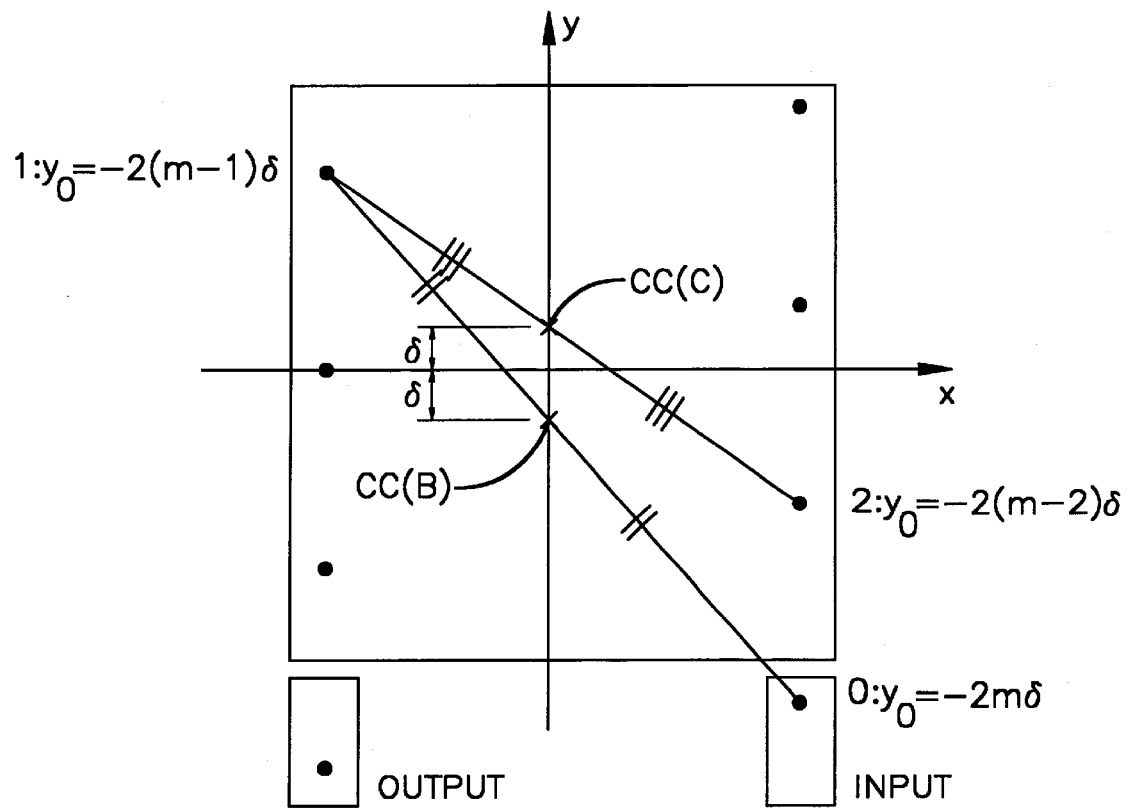
FIG. 2(b) is a front elevational view of a bounce pattern in accordance with one embodiment of the present invention.

FIG. 2(b) is a view of the SLM looking at it from lens f1, showing one possible spot pattern. The SLM is assumed to have a square shape. Also shown are two mirrors below the SLM, the input turning mirror on the right and an output turning mirror on the left. A spot is introduced into the cell at a distance of $-2m\delta$ from the x-axis, where m is an integer related to the number of times the light is re-imaged on the SLM. The projections of the centers of curvature of Mirrors B and C are taken to be $\pm\delta$ from the horizontal axis.

The point of light on the input mirror is conditioned, as mentioned previously, to M be traveling toward Mirror B. That spot is imaged to a new point on the SLM located opposite the center of curvature of Mirror B and an equal distance from the center of curvature. The position of the input spot is $(x_0,y_0)$ where $y_0=-2m\delta$. The point image is at a location opposite the center of curvature of Mirror B. To find that location the signs of both coordinates are reversed and in addition $2\delta$ is subtracted from the y coordinate. If the light were being imaged by Mirror C, the signs of the coordinate would be reversed and $2\delta$ added. The result is $$(x_1,y_1)=(-x_o,y_o-2\delta)=(-x_o,+2\delta(m-1)).$$

The light is then reflected back and re-imaged by Mirror C. The point image is opposite the center of curvature of Mirror C and an equal distance from it. The location is then at $$(x_2,y_2)=(-x_o,-y_o+4\delta)=(-x_o,-2\delta(m-2)).$$

As the process continues, the light alternately bounces off Mirror B and C and is re-imaged. Locations of successive spots are designated as $(x_n,y_n)$ at the nth re-imaging. These spot locations are given by $$(x_n,y_n)=((-1)^n x_o,(-1)^n(y_o-2n\delta))=((-1)^n x_o,(-1)^n+2\delta(m-n)).$$

In this example, the point images form two vertical lines of spots at $\pm x_o$. The point images are indicated with filled circles. The horizontal coordinate of the points alternates to the left and right of the center. As the image number n increases, the spots also alternate above and below the axis, first moving successively toward the axis and then away. The process ends when the spot location falls off the mirror and winds up on the output turning mirror.

Figure 2C:
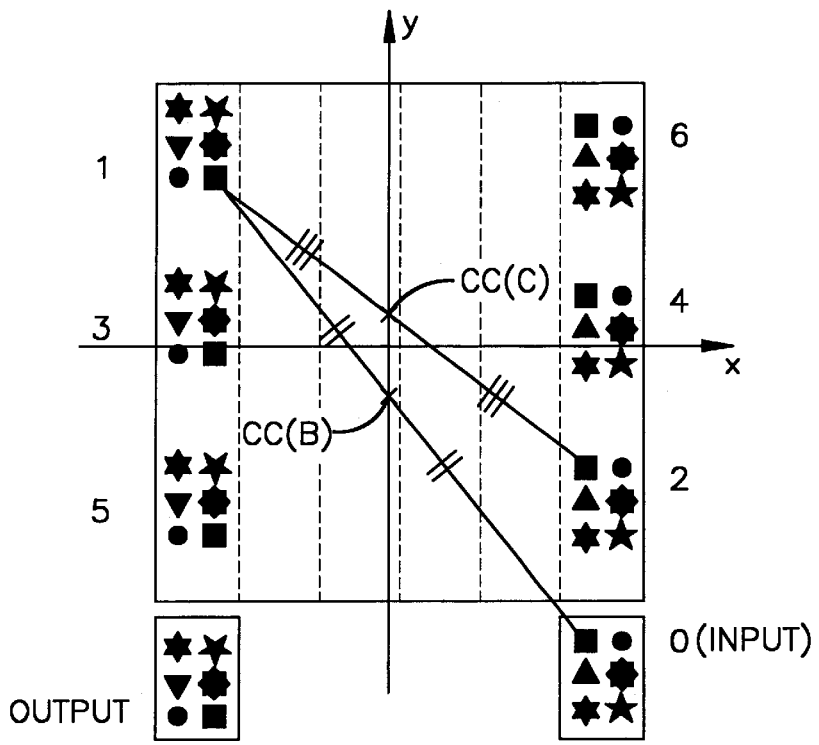
FIG. 2(c) is another front elevational view of a bounce pattern in accordance with one embodiment of the present invention.

It is possible to introduce a second input spot, as shown by the square in FIG. 2(c). It also is imaged across the centers of curvature of Mirrors B and C and creates a unique spot pattern that does not conflict with the previous input beam. The entire input turning mirror may be covered with a two-dimensional array of input spots, as indicated by the additional shapes.

Figure 2D:
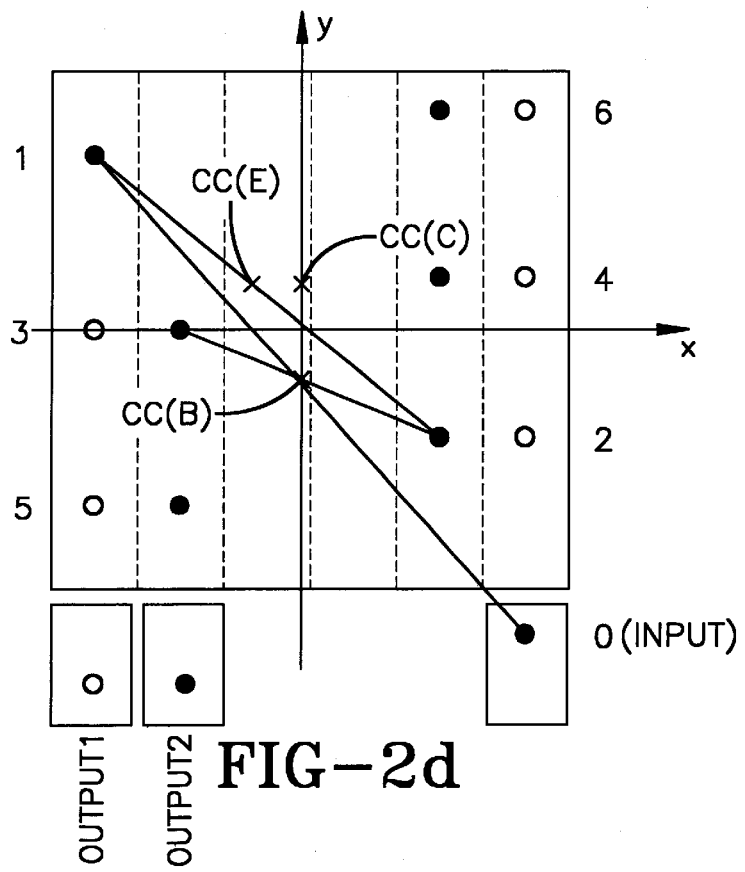
FIG. 2(d) is another front elevational view of a bounce pattern in accordance with one embodiment of the present invention.

If the beams are always directed to go to Mirrors B and C, the spots will trace out their individual patterns and appear in their appointed locations on the output turning mirror. Next, passes to Mirror E are allowed. Mirror E is aligned with its center of curvature displaced from the line containing the centers of curvature of Mirrors B and C as shown in FIG. 2(d). When a light beam is switched such that it goes to Mirror E instead of Mirror C, the next image spot appears in the same row but in a different column. In the figure the beam is sent to Mirror E one time. It starts out going to B, then goes to E. The spot then appears in a new column. The light then goes to Mirror B again, and appears in a new column on the left side. When the light goes to Mirror C and B for the rest of its bounces, it will trace out the pattern of spots indicated by the filled circles. Note that the output beam exits the cell on a different output turning mirror. The open circles represent the spot pattern that would have resulted had the m never gone to Mirror E.

Instead of a specific situation where the centers of curvature of mirrors B and C are equidistant from the optical axis, a more general situation can be discussed. There, the centers of curvature of the mirrors are on the y-axis. The center of curvature of Mirror B is at location $y_B$. The center of curvature of Mirror C is a distance $2\delta$ above it. The input spot is at location $x_o$, $y_o$. The expression for the location of spot n is $(x_n, y_n)=((-1)^n x_o,(y_B+\delta)+(-1)^n(y_o+2\delta n))$, where $y_B+\delta$ is the location of the point midway between the two centers of curvature. The equation still gives two columns of spots parallel to the line between the centers of curvature, the y-axis. The spots alternate from one column to the other as n increases. In general, a distance $4\delta$ separates the spots in a given column. The vertical positions of the spots in one column are, however, not identical with those in the other column. They depend on the y value of the location of the input spot. The equation reduces to the previous equation when $y_B=-\delta$. Two special cases present themselves. For simplicity, the origin is taken midway between the centers of curvature so that $y_B+\delta=0$. In the first case $y_o$ is an even integer times $\delta$, or $y_o=n_e\delta$ ($n_e$ even). This is the situation for n=6. Then the y values of the spots in one column are midway between the y values of the spots in the other column. The input spot is on the bottom turning mirror and the output spot is on the top turning mirror as in FIG. 2(a). There are m-1 reflections off the SLM.

The second specific case arises when yK is an odd multiple of $\delta$, $y_o=n_o\delta$ ($n_o$ odd). Then for each spot in one column there is a spot opposite it in the other column. The input spot is on the bottom turning mirror and so is the output spot. There are still n-1 spots on the SLM.

A Deformable Mirror Device spatial light modulator (DMD) is also used in the present invention. The DMD has the potential advantages of higher information density and faster speed. But it also has some associated problems that have to be addressed. The DMD is a pixilated spatial light modulator. That is, the reflecting lis surface is divided into incremental image areas. Each image element has a mirror surface that can be independently rotated to two positions, for example making angles of ±10° with the surface. The elements can modulate the direction of the reflected light by changing the input direction to one of two output directions. It does this element by individual image element. The direction change can be transformed into an amplitude change by directing the reflected light through an aperture or directing it to something blocking it. Pulsing the mirror between transmitting and blocked states, at a rate faster than eye or detector response, can also change the average observed amplitude.

Imagine a cut through the DMD surface, where the individual mirrored image elements are shown as in FIG. 5. Some are rotated in one direction, the remaining mirror elements in the other possible direction. The angle, θ, of tip is ±10° on presently available devices so that light incident normal to the plane of the DMD is reflected from a given image element at ±20°. The reflective image elements or pixels are currently square, 16 μm on a side with a spacing of 17 μm between centers. There is a hole in the center of each image element roughly 6 μm in diameter. The pixels rotate about a diagonal. The light incident perpendicular to the paper is reflected in the ±x direction.

Figure 6:
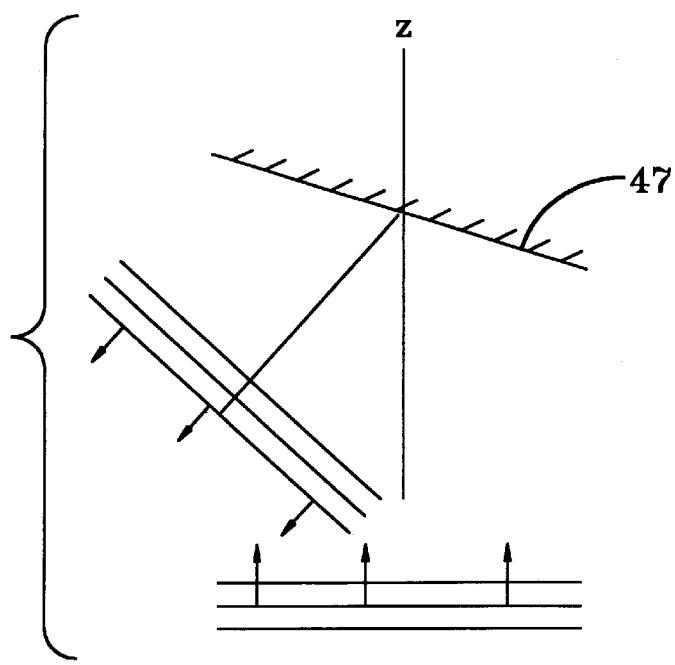
FIG. 6 is a diagram of reflected planes in accordance with one embodiment of the present invention.
Figure 7:
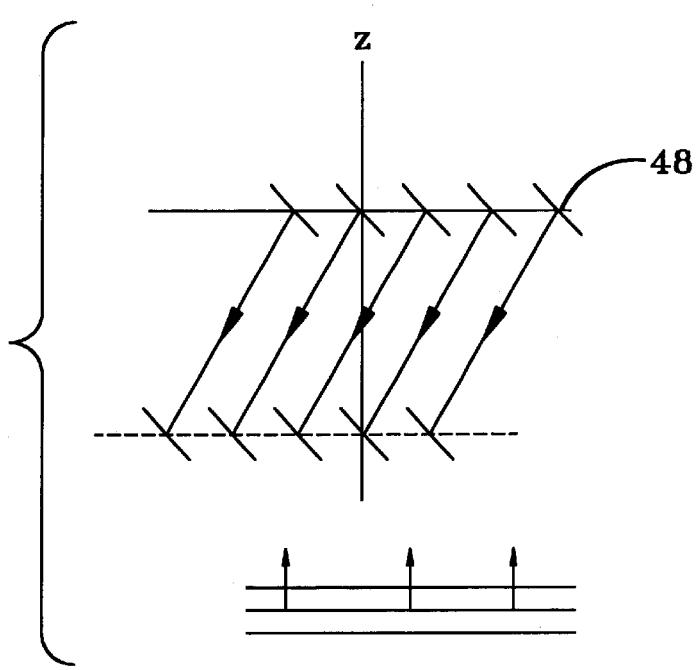
FIG. 7 is another diagram of reflected planes in accordance with one embodiment of the present invention.

The DMD presents an interesting pattern on reflection. To see this, compare it to a flat mirror 47 as shown in FIG. 6. The intersection of the mirror surface with the x-z plane makes an angle a with the x-axis. A plane wave travelling in the z direction enters at the bottom, is reflected off the mirror, and exits to the lower left. This is in the near field of the mirror. A continuous reflected wavefront results as expected. Considering a plane wave reflected off the DMD 48, as shown in FIG. 7, the image element mirror surfaces are all oriented in the same direction for simplicity. The mirror surfaces do not form a continuous surface as in the case of the extended plane mirror. As a result the field reflected off the DMD is a discontinuous set of wavefronts all travelling in the same direction but with some lagging behind. The discontinuous set forms an "average" plane parallel to the plane of the DMD. However, this average plane is not perpendicular to the direction of propagation of the reflected light.

Figure 8:
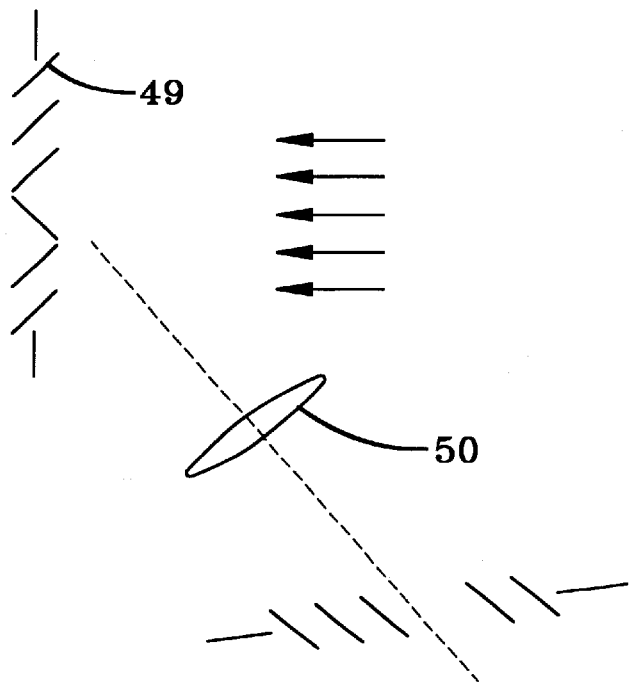
FIG. 8 is a diagram of the object and image planes of a light beam reflected off a DMD element in accordance with one embodiment of the present invention.
Figure 9:
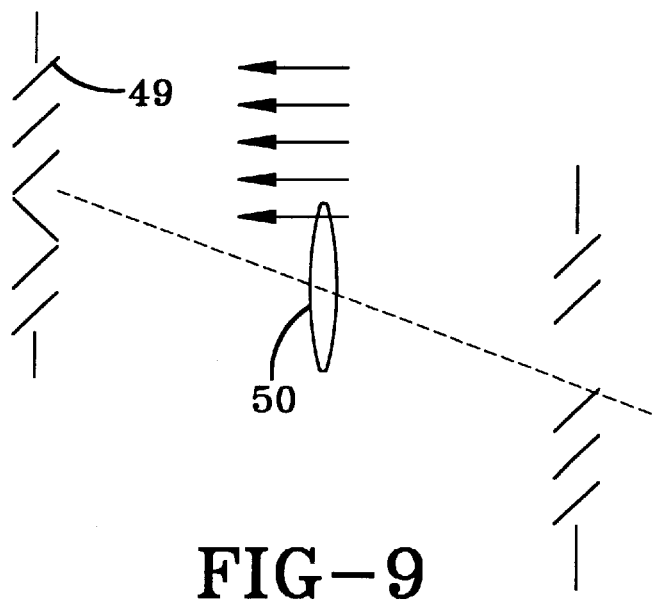
FIG. 9 is another diagram of the object and image planes of a light beam reflected off a DMD element in accordance with one embodiment of the present invention.

The fact that the elements of the DMD do not lie in one continuous surface makes it more difficult at times to image the DMD in reflected light. The difficulty is shown in FIG. 8. A DMD 49 at the left is normally illuminated with a beam from the right. The reflected light is imaged with a lens 50. Neither the object plane nor the image plane is perpendicular to the direction of propagation of the light leaving the DMD. Indeed the object plane and image plane are parallel only if the magnification is unity or if the lens is rotated to be parallel to the object plane as shown in FIG. 9. The main problem is that the object and image planes are not perpendicular to the direction of propagation.

If the direction of the light were reversed so as to be incident on the DMD 49 at an angle and leaving it perpendicular to the surface, as shown in FIG. 9, then there would be no problem. That is the way projectors using the DMD operate. For application in a White cell, however, it may be necessary to have light approaching the SLM from both directions.

One way to remedy the problem of the object plane and image plane not being perpendicular to the direction of propagation is to use an associated prism to change the direction, as shown in FIG. 4. The DMD is illuminated with light normal to its surface as before, and a prism is placed in the reflected beam. The directions and the angles of the prism have been adjusted to remove the angular offset of the DMD. The lens is then used in a normal fashion.

The effect of the prism can be demonstrated analytically. To do this, a ray matrix description is utilized. A ray with slope po incident on a DMD mirror/pixel leaves the pixel with slope $p_1$. The 3×3 ray matrix for the DMD whose mirror elements are tipped by ±θ is given by $$\begin{pmatrix} y_1 \\ p_1 \\ 1 \end{pmatrix} = \begin{pmatrix} 1 & 0 & 0 \\ 0 & 1 & \pm 2\theta \\ 0 & 0 & 1 \end{pmatrix} \begin{pmatrix} y_o \\ p_o \\ 1 \end{pmatrix}.$$

The first of the three linear equations represented by the matrix equation shows that upon reflection the position of the ray remains constant and the second linear equation shows that the slope changes direction by ±2θ. Similarly, it has been shown that for the prism the ray matrix for a prism of small angle α and index $n_1$ is given by $$\begin{pmatrix} y_1 \\ p_1 \\ 1 \end{pmatrix} = \begin{pmatrix} 1 & 0 & 0 \\ 0 & 0 & (n-1)\alpha \\ 0 & 0 & 1 \end{pmatrix} \begin{pmatrix} y_o \\ p_o \\ 1 \end{pmatrix}.$$

Return to the situation in FIG. 4 where a DMD is on the left so that the light is reflected upward, translates a distance d and passes through the prism. The effect of the angle on the DMD can be cancelled. To find the conditions, multiply the matrices for the DMD, the translation and the prism and accept that the product be equivalent to that for the translation by itself. Thus, $$\begin{pmatrix} y_1 \\ p_1 \\ 1 \end{pmatrix} = \begin{pmatrix} 1 & 0 & 0 \\ 0 & 0 & -(n-1)\alpha \\ 0 & 0 & 1 \end{pmatrix} \begin{pmatrix} 1 & d & 0 \\ 0 & 1 & 0 \\ 0 & 0 & 1 \end{pmatrix} \begin{pmatrix} 1 & 0 & 0 \\ 0 & 1 & +2\theta \\ 0 & 0 & 1 \end{pmatrix} \begin{pmatrix} y_o \\ p_o \\ 1 \end{pmatrix}$$

$$= \begin{pmatrix} 1 & d & +2\theta d \\ 0 & 1 & 2\theta - (n-1)\alpha \\ 0 & 0 & 1 \end{pmatrix} \begin{pmatrix} y_o \\ p_o \\ 1 \end{pmatrix}.$$

It is seen by taking the product that the angular offset of the DMD is cancelled if α=2θ/(n−1). The horizontal axis is then translated upward in the y direction by a distance $y_d$=+2dθ.

The axis is selected by choosing for the position and input slope $y_o=0$ and $p_o=0$. Using these in the previous equations, we find the output position is $y_1=+2d\theta$. This is reasonable because the axis has been raised by a distance $y_d=2d\theta$ in translating a distance d. To compensate for this, set $y_1=y_2-y_d=y_2-2\theta d$. This affects only the top line in the above equation. The result is the following matrix equation. Note that the equation has the form of a simple translation by a distance d.

$$\begin{pmatrix} y_1 \\ p_1 \\ 1 \end{pmatrix} = \begin{pmatrix} 1 & d & 0 \\ 0 & 1 & 0 \\ 0 & 0 & 1 \end{pmatrix} \begin{pmatrix} y_o \\ p_o \\ 1 \end{pmatrix}.$$

Thus, with the redefined axis the prism compensates nicely for the angular deflection of the DMD.

The equivalent of the Dual White Cell with unequal arms using the DMD is shown in FIG. 5. There the DMD 31 is at the left and to the right of the DMD are lens f1 36 and spherical Mirror C 35. There are two paths, depending whether a given pixel reflects light up or down. For light reflected downwards there are prism $P_1$ 37, lens f2 38 and Spherical Mirror B 39. For light reflected upward, there are Prism $P_2$ 32, lens $f'_2$ 33 and Mirror M 34. The prisms counteract the angular effects of the DMD as described. Of the two sets of conditions, the SLM-imaging conditions, and the light-conserving conditions, it is simpler to consider the light-conserving conditions first. The light-conserving conditions are that Spherical Mirrors B, C, and M be imaged onto each other and no light is lost going around the outsides of Mirrors B, C or M. This is accomplished by placing Mirrors B, C, and M in the focal planes of Lenses $f_2$, $f_1$, and $f'_2$ respectively. The curvatures of Mirrors B, C, and M are all chosen so that in conjunction with lenses $f_2$, $f_1$, and $f'_2$ the DMD is imaged back onto itself. As has been shown, images of the centers of curvature of Mirrors B, C and M through Lenses $f_1$, $f_2$, and $f'_2$ lie on the DMD. The result is the equivalent of the dual cell in FIG. 3. The light can go from Mirror C to Mirror B and back or from Mirror C to Mirror M and back depending on the state of a given pixel. The DMD decides between the two paths on any particular bounce.

In operation, light comes in from an input source below the unit. Light from the outside source is imaged onto a pixel in the "down" position which acts as a turning mirror. That pixel directs the light to Spherical Mirror 34 which then images it onto a pixel in the "up" position. The pixel then directs the light to Spherical Mirror 35 which images it back to the DMD. The light is now considered to be "in the unit". The choices of tip of the DMD direct the light to the Spherical Mirror 34 and back to Spherical Mirror 35 or to Spherical Mirror 39 and back to Mirror 35. After the last bounce off Spherical Mirror 35, the light goes to Spherical Mirror 39 and back to a pixel on the DMD which is in the "up" position and directs the light out of the cell.

Figure 10:
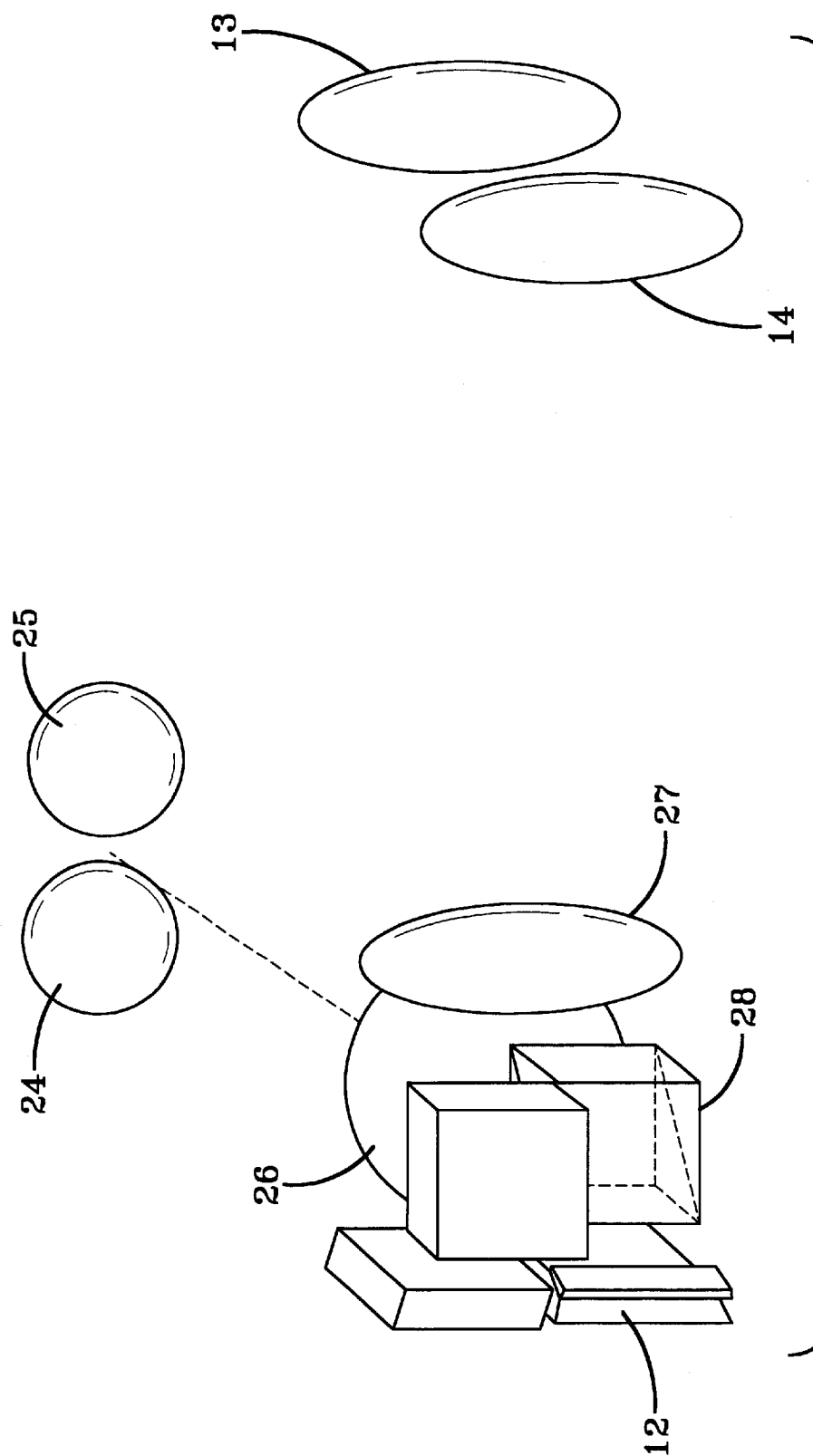
FIG. 10 is a perspective view of a dual arm cell with an auxiliary mirror in accordance with one embodiment of the present invention.

In one preferred embodiment of the present invention, a number of input beams are introduced into the device, whose components comprise a spatial light modulator (SLM) and several mirrors. Each beam input into the device bounces back and forth between the SLM and the mirrors, as shown in FIG. 10. Each beam traces a unique path through the device, and each illuminates the SLM in a unique series of focused spots. Each beam is refocused on every pass through the cell. On any particular pass, the SLM may be addressed at the corresponding pixel such that the selected beam will be switched out of the cell and into another cell or re-imaged onto the output plane. The output plane preferably consists of output ports, or may be any appropriate device such as an SLM or deformable mirror device.

Many beams may be introduced at the input turning mirror, the beams each then progressing through a unique spot pattern. These spot patterns have been discussed previously, so we will not repeat them here. The number of beams that can be circulating through the cell simultaneously is limited only by the number of pixels on the SLM.

Figure 11:
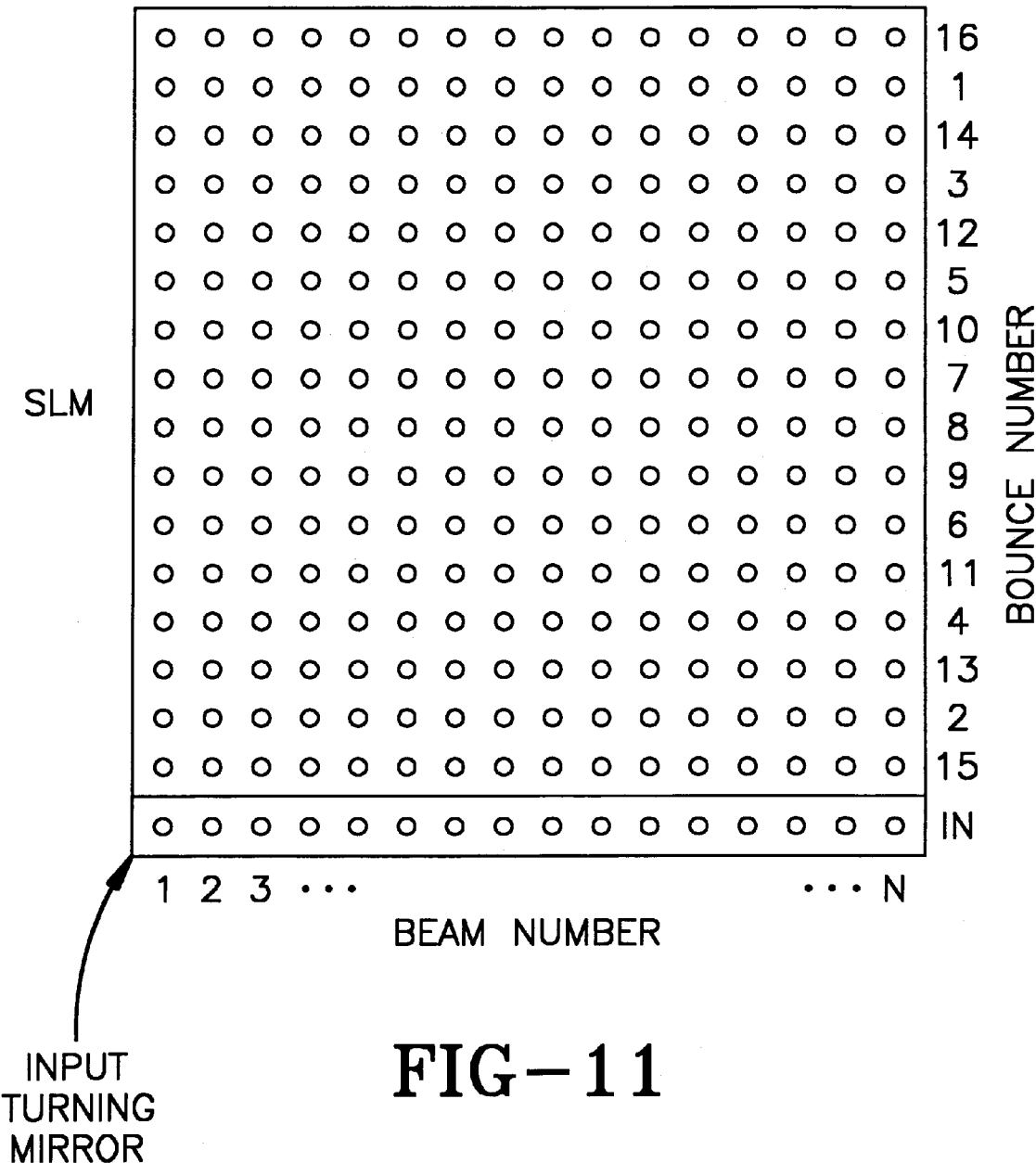
FIG. 11 is a diagram showing the spots that would appear on the SLM if no pixels are addressed, in accordance with one embodiment of the present invention.

A preferred device operates in the following manner. There is an array of N input beams at the input turning mirror. Suppose, to start, that they are arranged in a line of N dots along the input turning mirror, as shown in FIG. 11. The dots all expand to fill Mirror B, and are refocused by that mirror to another line of spots, labeled "1." From there they expand to fill Mirror C, and are re-imaged to the next line of spots on the SLM.

Now suppose the SLM pixel corresponding to spot '4' for a particular beam is addressed. The SLM switches the beam, in this embodiment by changing its polarization. The beam now goes to Mirror E, whose center of curvature is above the beamsplitter. The spot is re-imaged to the row "4" and the column belonging to that particular beam on the output plane.

Figure 12:
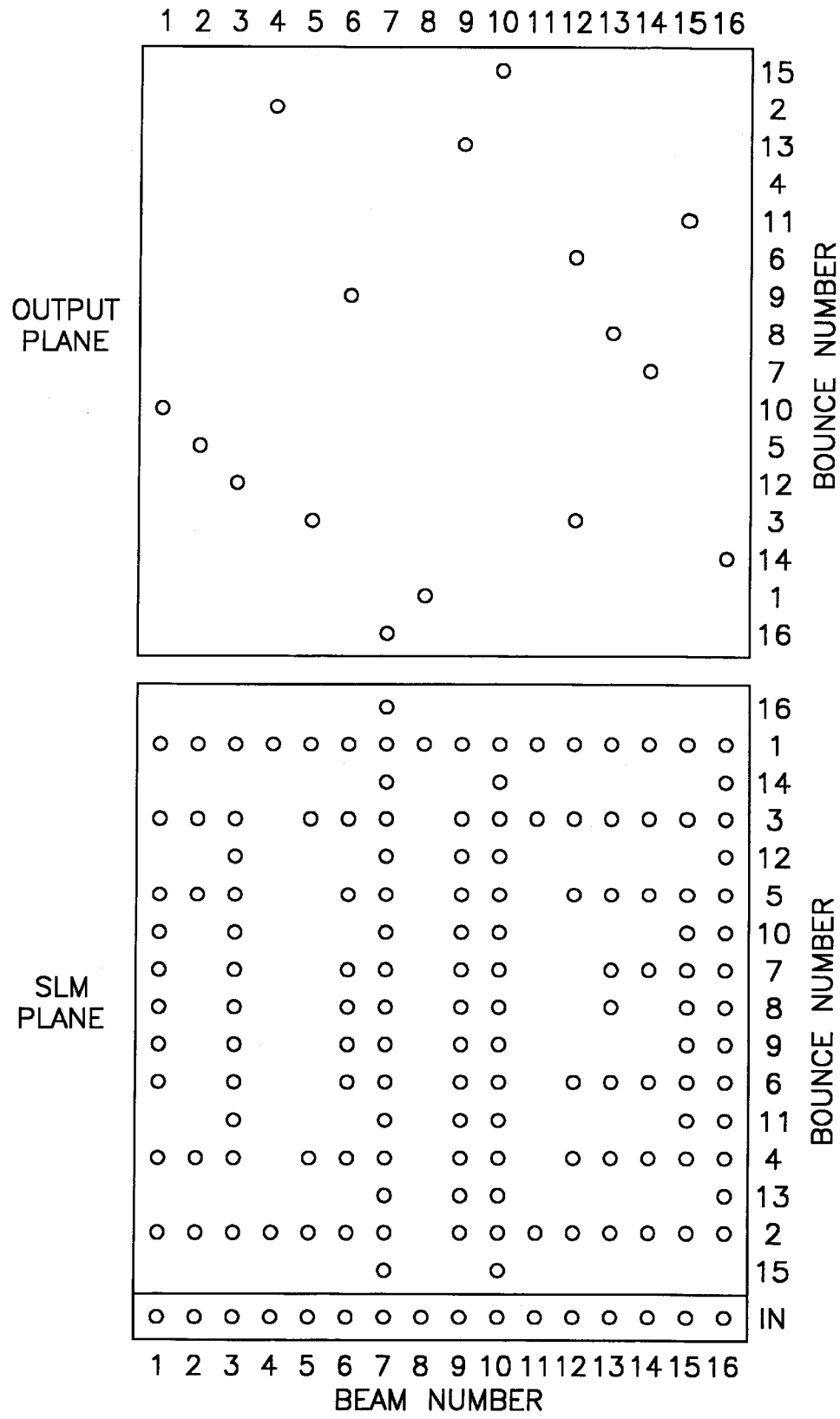
FIG. 12 is a diagram showing a spot pattern that maps 16 inputs to 16 arbitrary outputs in accordance with one embodiment of the present invention.

FIG. 12 shows an example of how 16 input beams are directed to 16 randomly chosen output spots. The bottom is the SLM plane, the top is the output plane. The input beams are along the bottom. The solid spot for each column indicates the addressed pixel. The mapping is indicated in Table 1. Each input beam is mapped to a unique row on the output plane. Note that the output pattern at the top of FIG. 12 is also the pattern of addressed pixels on the SLM.

TABLE 1

| in  | 1  | 2 | 3  | 4 | 5 | 6 | 7  | 8 | 9  | 10 | 11 | 12 | 13 | 14 | 15 | 16 |
|-----|----|---|----|---|---|---|----|---|----|----|----|----|----|----|----|----|
| out | 10 | 5 | 12 | 2 | 4 | 9 | 16 | 1 | 13 | 15 | 3  | 6  | 8  | 7  | 11 | 14 |

The output plane may be a fiber array or other mechanism for collecting and distributing beams. The array need not be square. Multiple beams may be directed to a single output point if desired. More likely the typical application would be to switch N inputs among N outputs.

Figure 13:
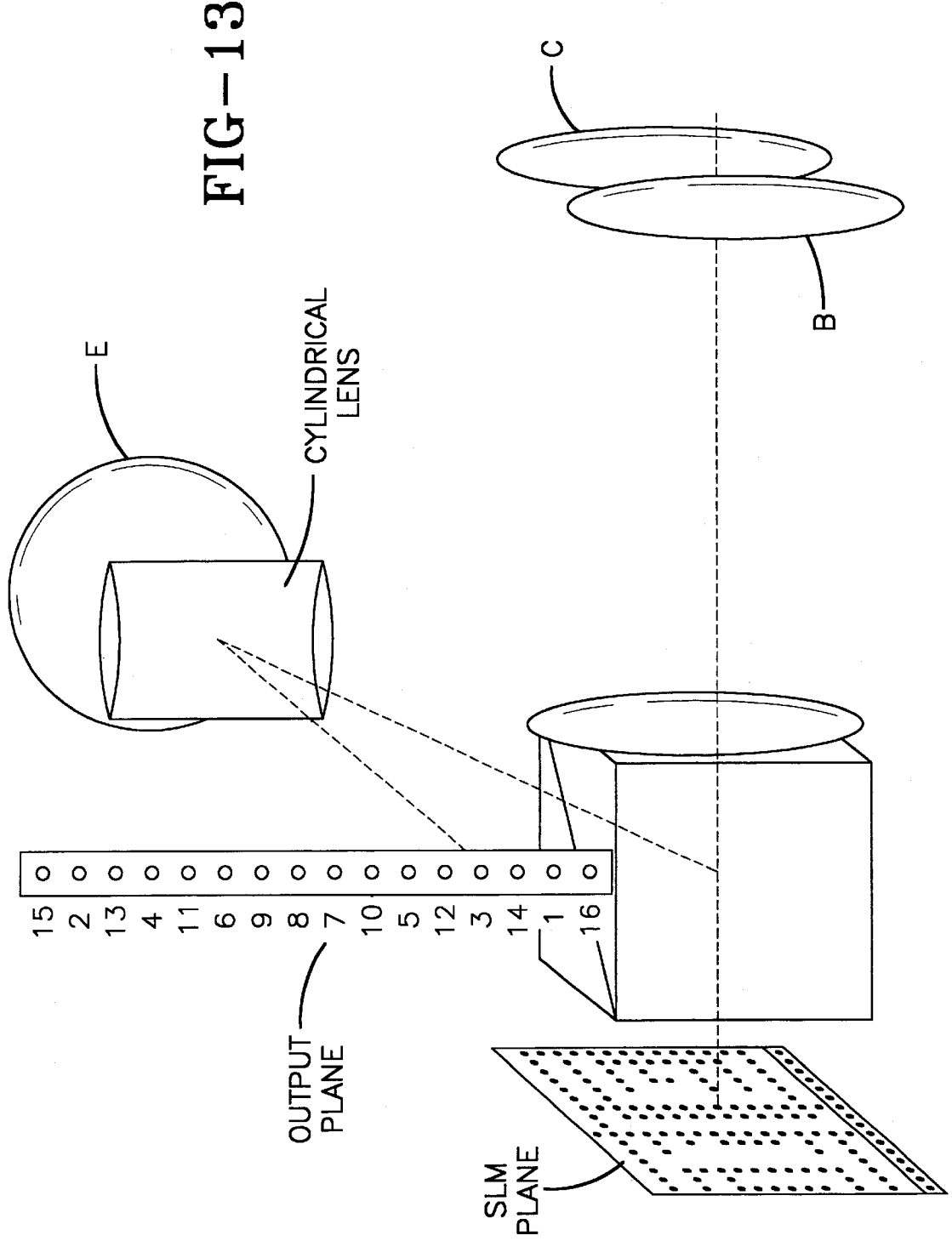
FIG. 13 is a perspective view of an apparatus of one embodiment of the present invention using a cylindrical lens to focus all spots in the output plane.

To combine all the output spots in row 5, one could use a cylindrical lens. In this embodiment, all spots are focused in the output plane that would land in row "5" to a single output spot "5," as shown in FIG. 13. Alternatively, the beams could be combined using other types of beam combiners such as optical fibers.

The embodiment based on the White cell previously described allows for the interconnection of a large number of optical inputs to a large number of optical outputs. It is also completely reconfigurable and strictly non-blocking. It has, however, the property that the latency and loss that a given input signal experiences depends on the output chosen. For some applications, that can be undesirable.

In another preferred embodiment, the architecture of the interconnection device is modified such that all signals require the same time to propagate through the device, thereby having the same loss.

In the basic interconnection device described previously, there is an input turning mirror that directs an array of beams into a White cell. The White cell consists of a spatial light modulator (SLM) and its lens, and Mirrors B and C. The beams bounce around forming a unique spot pattern on the SLM, but all beams strike the same row on any given bounce number. The beams may be switched out on a particular bounce, and every spot in that row corresponds to a specific output. This much is retained.

Figure 14:
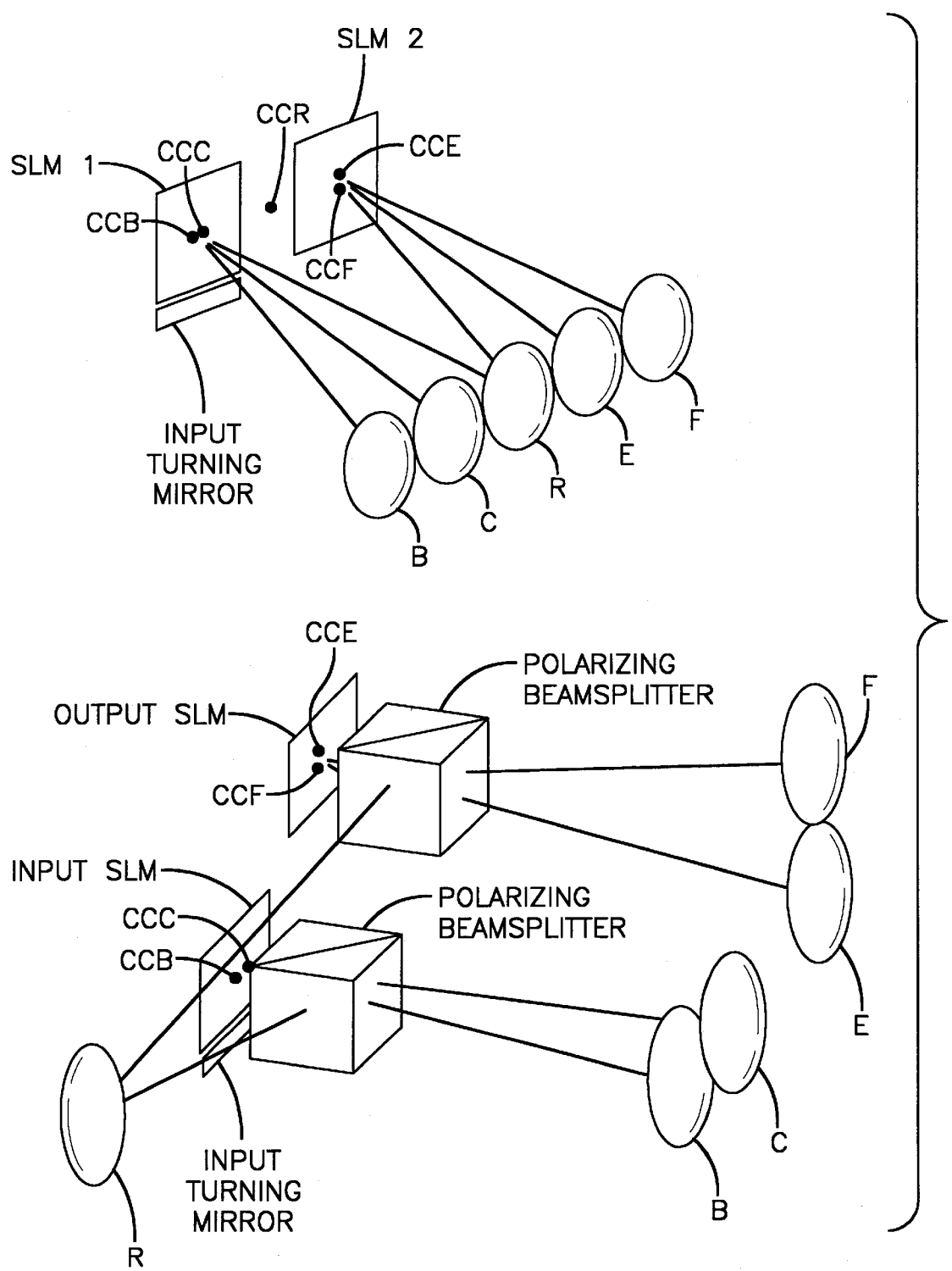
FIG. 14 is a perspective view of a dual White cell apparatus of one embodiment of the present invention.

In this preferred embodiment, however, once the beam is bounced out of the White cell, it is directed to another spatial light modulator, as shown in FIG. 14. There are two White cells now, each White cell having a spatial light modulator, which could be a DMD as shown in the top of the figure, or a liquid crystal or other polarizing type, as shown in the bottom of the figure. Mirrors B and C and the spatial light modulator labeled "input SLM" constitute the input White cell. Mirror "R" is a relay mirror, which images the first SLM onto a second SLM. The second SLM is also part of an output White cell, consisting of the output SLM and Mirrors E and F.

Figure 15:
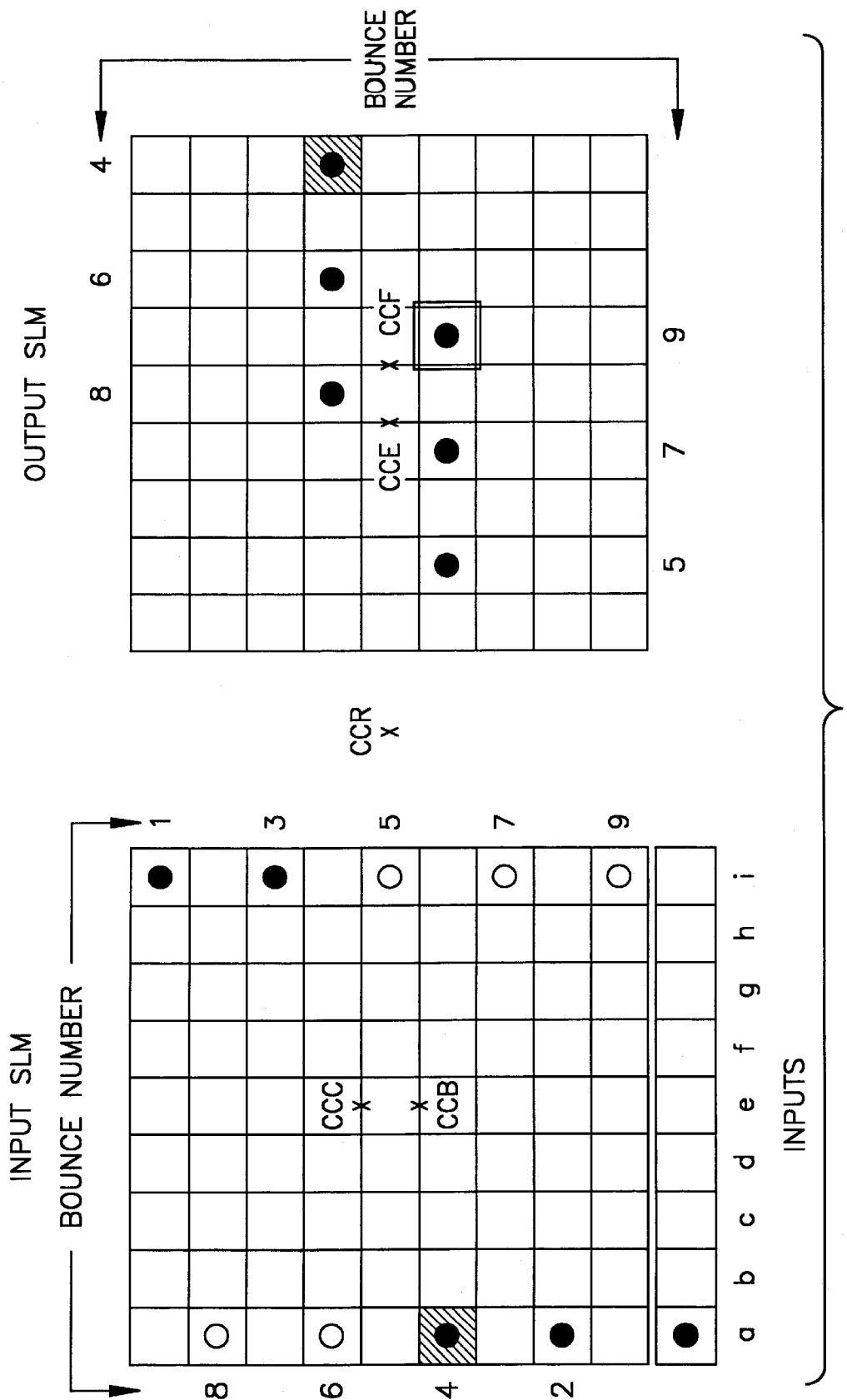
FIG. 15 is a diagram of a spot pattern switched to the output SLM on bounce 4 in accordance with one embodiment of the present invention.

Considering a particular beam input into the interconnection device, FIG. 15 shows a spot pattern for input "a." On the left is the input SLM (which may be of either type); on the right is the output SLM. Beam "a" follows the bounce pattern dictated by the input White cell, which is determined by the placement of the centers of curvature of Mirrors B and C. If the centers of curvature are placed one above the other as shown in FIG. 15, the input beam under discussion then bounces in the input White cell, forming two columns of spots. On a particular bounce, 4 in this example, the appropriate SLM pixel is switched, sending the beam to Mirror R. The beam then leaves the input cell. (The open circles on the input SLM show where the beam would have struck next if the pixel were not switched.)

The center of curvature of Mirror R is placed between the input and output SLMs. Thus, if input "a" is switched on bounce 4 (input "a" is to be sent to output 4), then the pixel on the input SLM corresponding to column "a" and bounce number 4 (the shaded pixel) is imaged by Mirror R onto the output SLM. The image at the second SLM is then reversed. This is a result of the magnification of −1 introduced by a single spherical mirror in a 2f—2f imaging configuration.

The second SLM is addressed such that it activates the pixel corresponding to input 'a' and output 4. By "activate" it is meant that that the pixel is switched so that the beam is sent into the output White cell (mirrors E and F). The other pixels may then be set so that the beam continues to bounce in the second White cell.

The second White cell is preferably different from the first, however. The centers of curvature of Mirrors E and F are placed side by side. Thus a given beam, as it propagates in the output cell, forms two rows of spots rather than forming two columns as it did in the input White cell. This means that while the beam continues to propagate through the second White cell, the row (output) information is retained. The large open square indicates the pixel of the last bounce for a given input. In a 9-bounce system that is the $9^{th}$ bounce.

Figure 16:
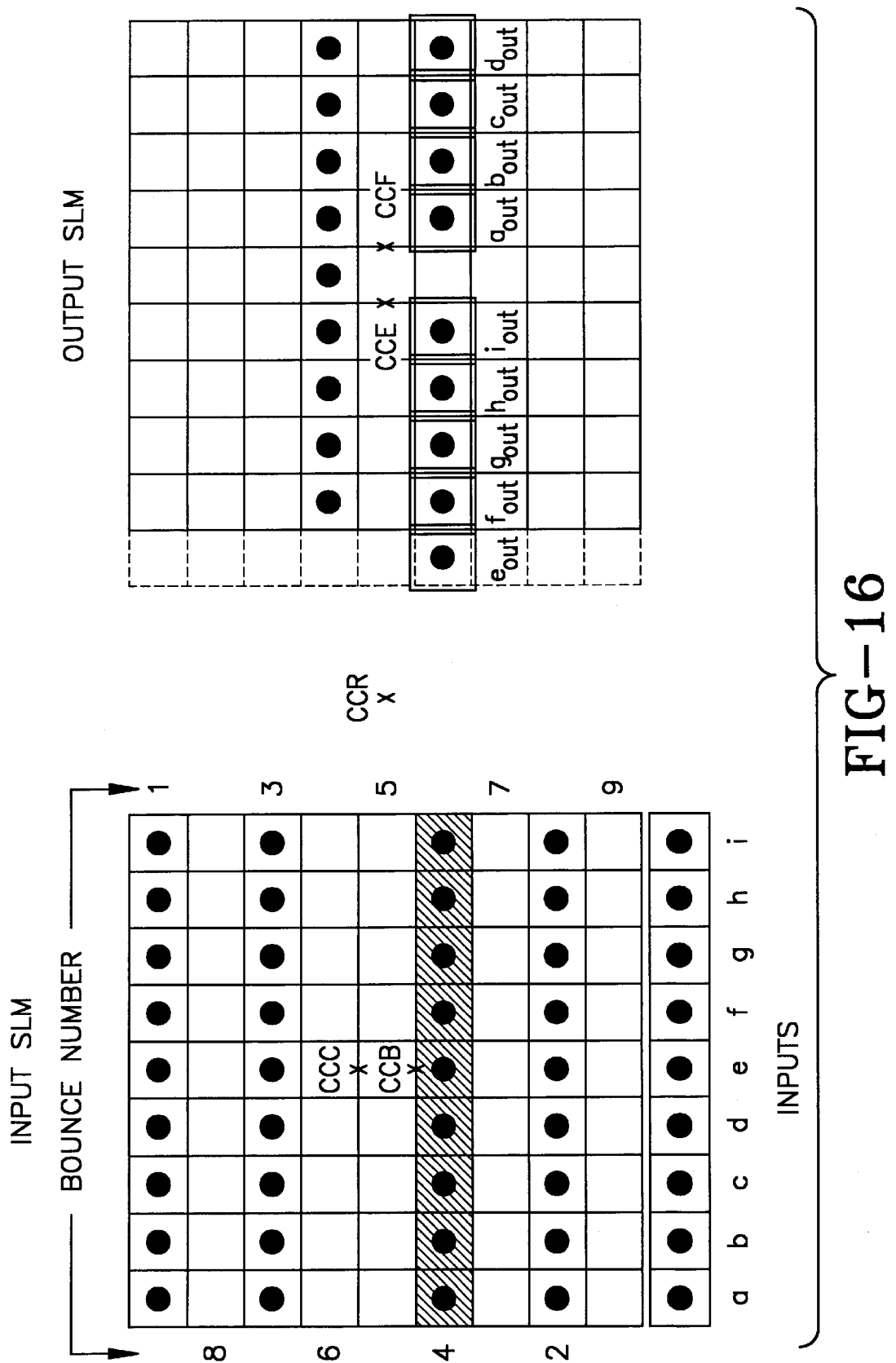
FIG. 16 is another spot pattern diagram in accordance with one embodiment of the present invention.

FIG. 16 shows the case for every input switched out of the input cell on bounce 4. This is illustrated for a 9-bounce system. All beams trace out spots in two rows on the output SLM, and they will all end up in the same row again on the $9^{th}$ bounce. (The SLM in this case was made slightly bigger in order to accommodate all spots, as indicated by the dashed lines.) Thus, as in the previous embodiments, a cylindrical (or elliptical) lens may be used to focus all of row 4 onto output 4. In this manner, any beam switched out of the input cell on bounce 4 ends up at output 4.

It will become important later to note that the beam always goes to Mirror E first in the output White cell. The object then is to design the system so that every beam makes a fixed number of bounces, regardless of the specific input and output selected. Then all beams would experience the same latency and the same loss. Thus in a system designed for 9 bounces, a beam destined for output 2 would make 2 bounces in the input cell and finish the rest of its bounces in the output cell. A beam being directed to output 8 would bounce 8 times in the input cell and one time in the output cell.

Figure 17:
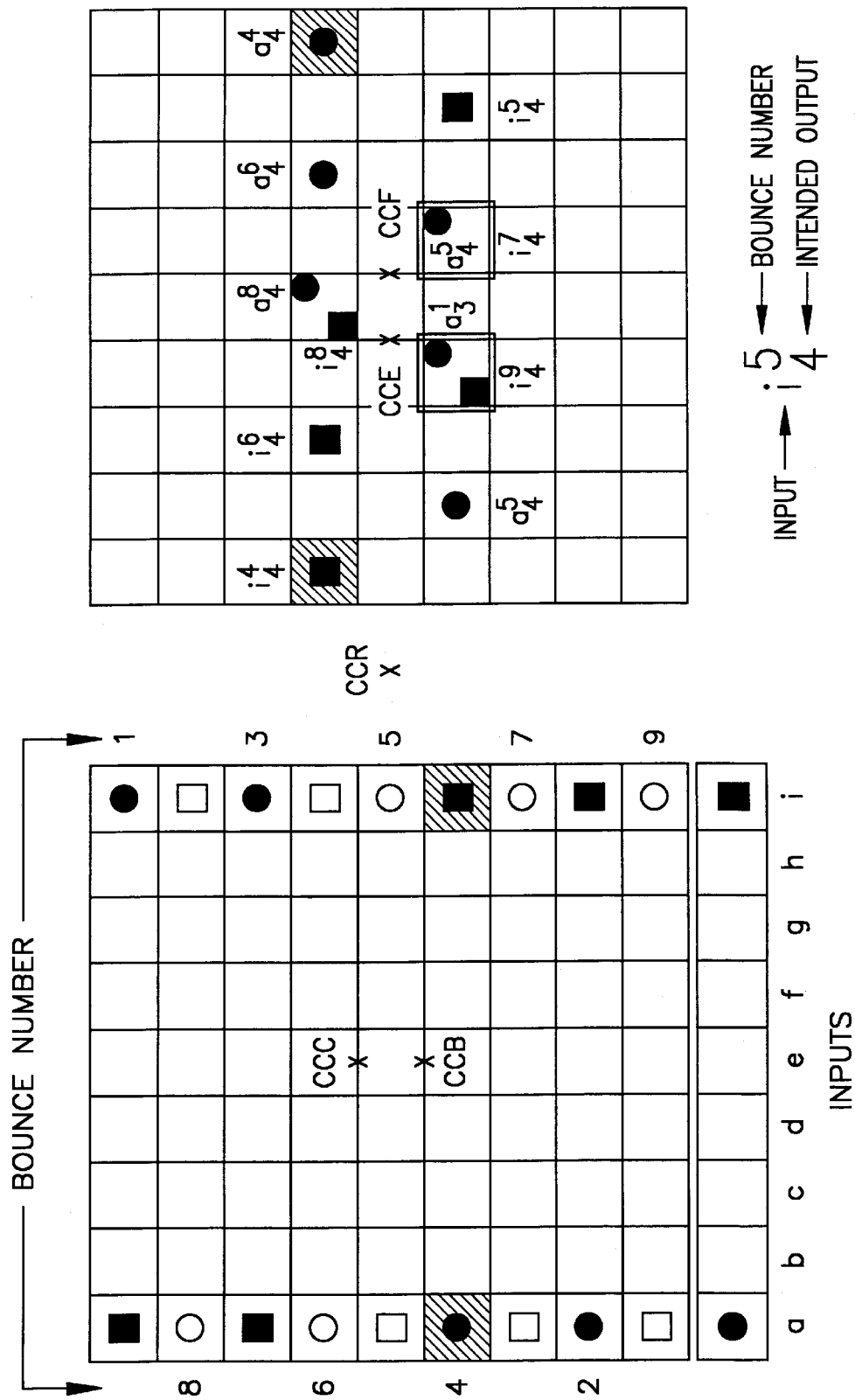
FIG. 17 is another spot pattern diagram in accordance with one embodiment of the present invention.
Figure 18A:
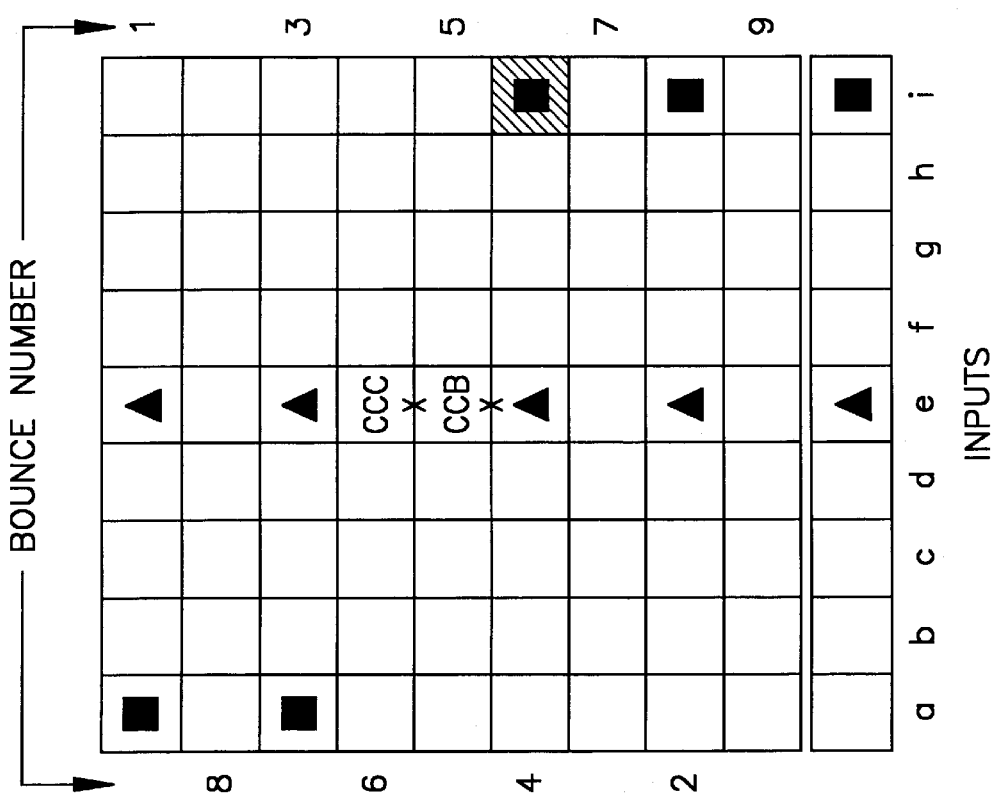
FIG. 18 is another spot pattern diagram in accordance with one embodiment of the present invention.
Figure 18B:
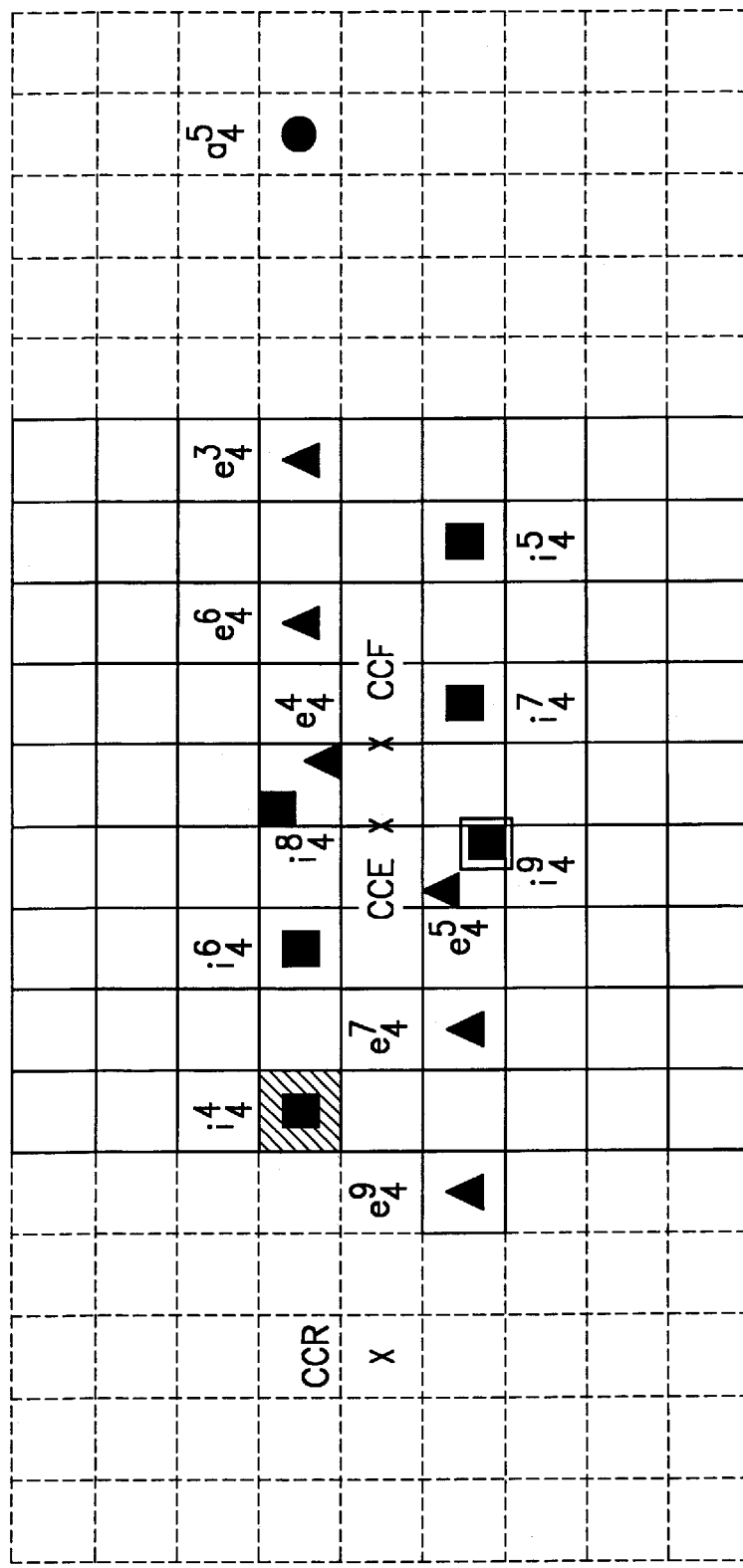

There is a problem with the arrangement shown in FIG. 16. A conflict can occur, as shown in FIGS. 17 and 18. Here it was intended to direct input "e" to output 4, and input "i" to output 4 as well. Thus on the input SLM, shaded pixels (e,4) and (i,4) are selected. The triangles represent the bounce of beam "e" and the squares represent the bounces of beam "i." The following notation will be used for the bounces in the second White cell. The letter "e" in $e_4^6$ tells which input beam is being considered. The subscript indicates the desired output (4 in this case) and the superscript tells the bounce number. On output SLM, the spots of beam "e" progress away from the center of the SLM, but at the same time the spots of input "i" are progressing toward the center. It does not matter if bounces from different beams strike the same pixels, as long as the pixels are not ones that need to be activated. In the figure, however, it can be seen that if "e" is to be connected to output 4, then "i" cannot finish its spot pattern. This is because the pixel beam "i" strikes on its $8^{th}$ bounce, which has been already selected to accommodate input "e". Thus input "i" cannot be connected to output 4 at the same time as input "e."

Figure 19:
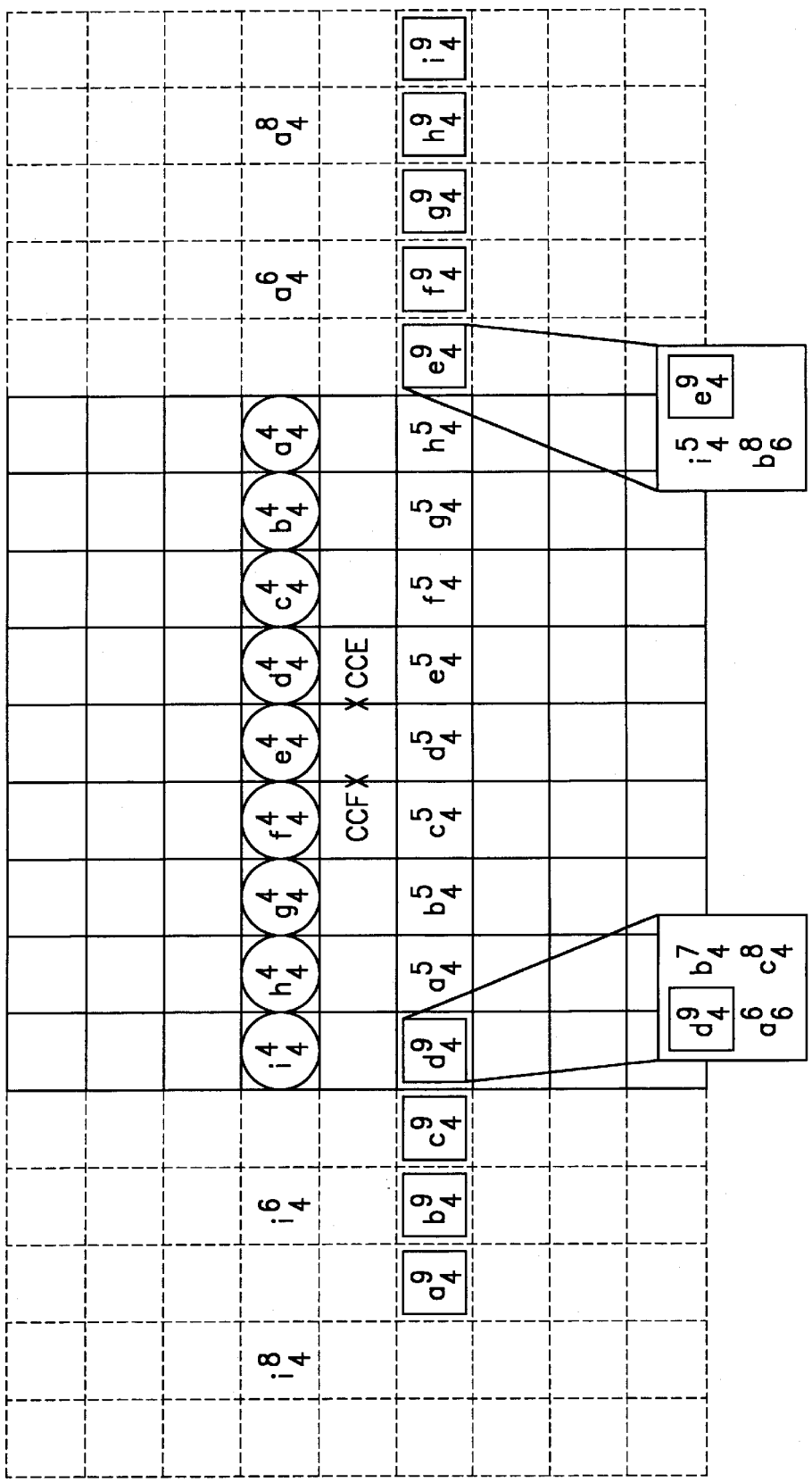
FIG. 19 is a diagram showing spot progression in accordance with one embodiment of the present invention.

This problem may be gotten around by reversing mirrors E and F. Recall that every beam would visit mirror E first when it entered the output White cell. FIG. 19 illustrates that if the center of curvature of mirror E is placed closer to the center of curvature of Mirror R, the spots on the second White cell will progress away from center rather than toward it. The circles represent the pixels that must be activated to accept a given beam into the output White cell. The square represents the output pixel. Note also that a larger output spatial light modulator is now required.

There is another problem with this scheme, however. We observe that the bounces corresponding to output 4 bounce in two rows, but these are the same rows used by any beams being connected to output 6. The figure shows that to connect input "a" to output 6, the pixel needed to input the beam into the output White cell is also that which needs to be activated to connect output beam "d" to output 4. That same pixel must simultaneously not be activated to keep the bounces going to direct input "b" to output 4 and input "c" to output 6.

Figure 20B:
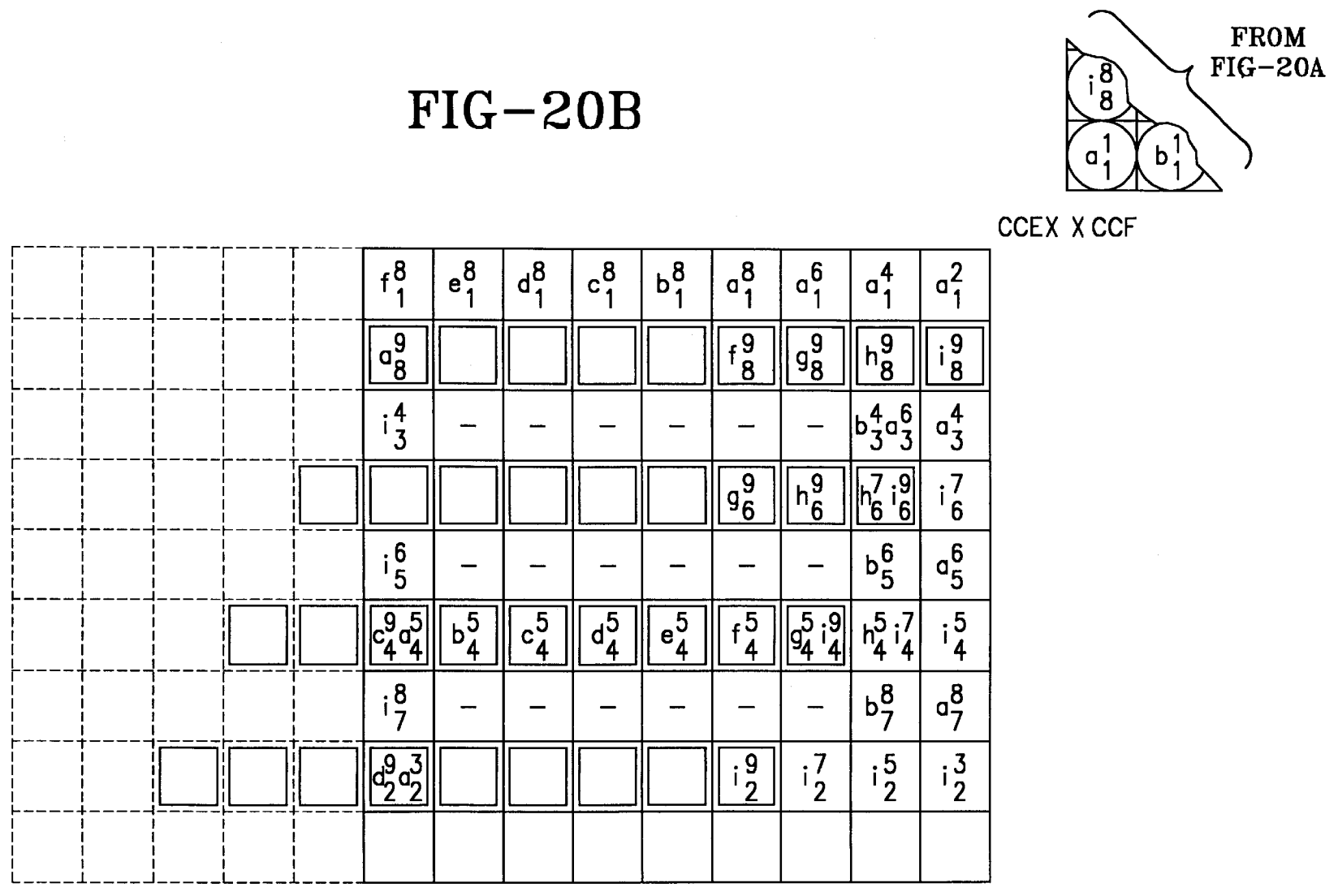

The problem is caused by having the centers of curvature on the horizontal bisector of the output SLM. The solution, then, is to move them below all of the input rows, and extend the size of the output SLM even further. This approach is shown in FIG. 20. Again, the circles represent pixels that may have to be activated in order to connect a particular input to a particular output. The squares may have to be activated to perform a given connection. There is some overlap, the implication of which is that no two inputs may be connected to the same output in this approach.

Figure 21:
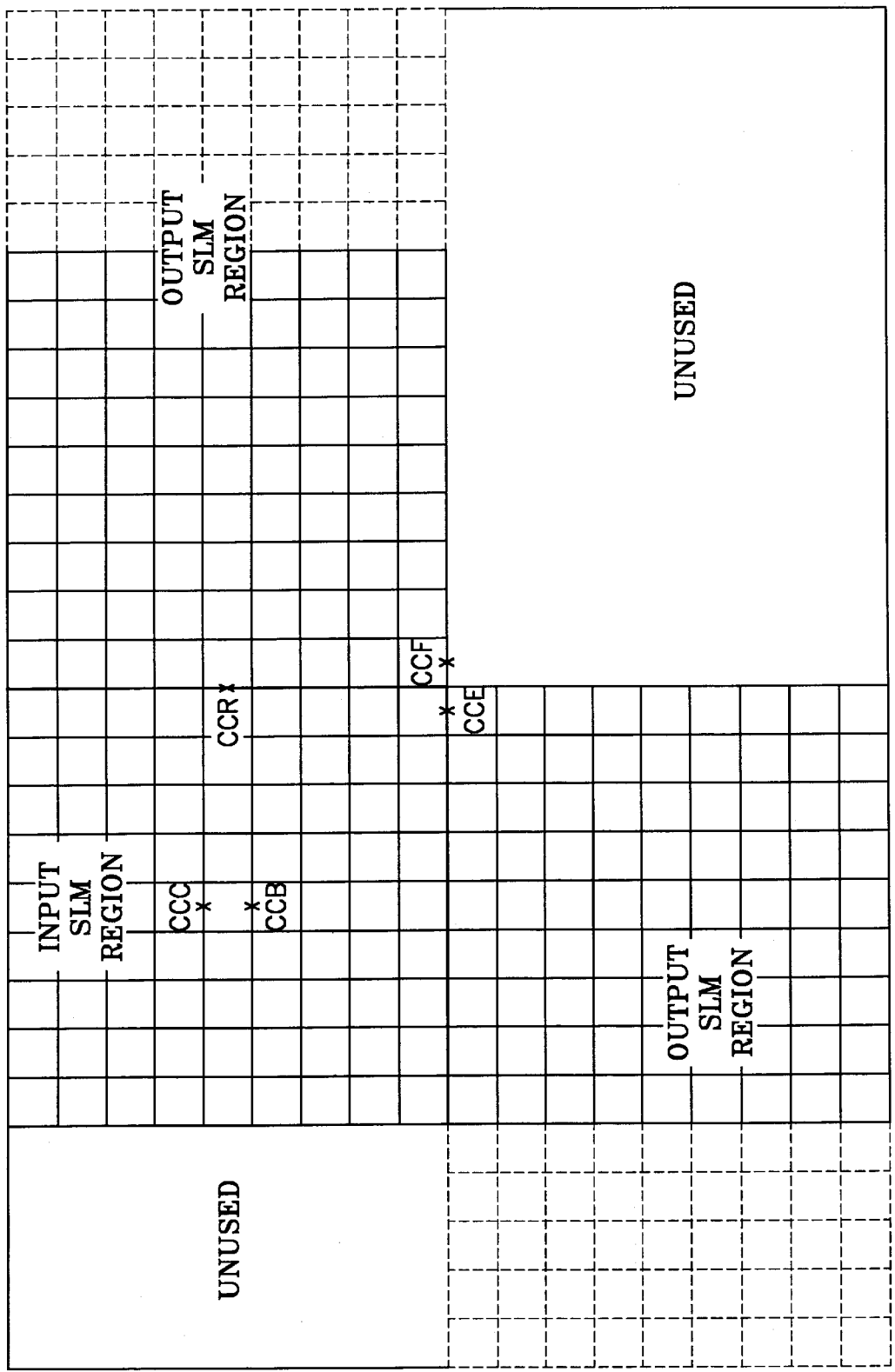
FIG. 21 is a diagram showing regions of an SLM in accordance with one embodiment of the present invention.
Figure 22:
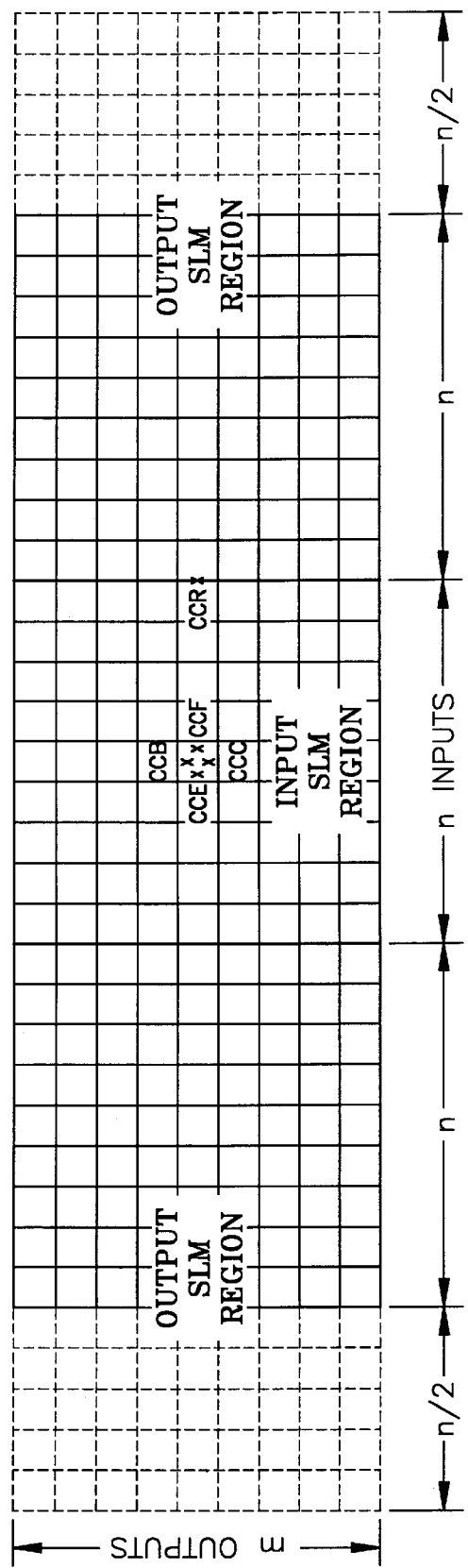
FIG. 22 is another diagram showing regions of an SLM in accordance with one embodiment of the present invention.

A preferred embodiment does not actually require two different spatial light modulators. For the arrangement shown in FIG. 20, the output SLM area does not overlap the input area, even if they are on the same plane. Thus a single SLM can be used as shown in FIG. 21. This is not an efficient use of SLM space, however, since much of the area is unused. This can be circumvented by the placement of the mirror centers of curvature as shown in FIG. 22.

The number of pixels needed on the spatial light modulator to interconnect n inputs to m outputs is 4n×m. For example, a small SLM such as is used for television projection might have 480×640 pixels, so it could in principle connect 160 inputs to to among 480 outputs. If one desires to have the number of inputs equal the number of outputs, such an SLM could support three separate interconnections, each connecting 160 inputs to 160 outputs.

Figure 23:
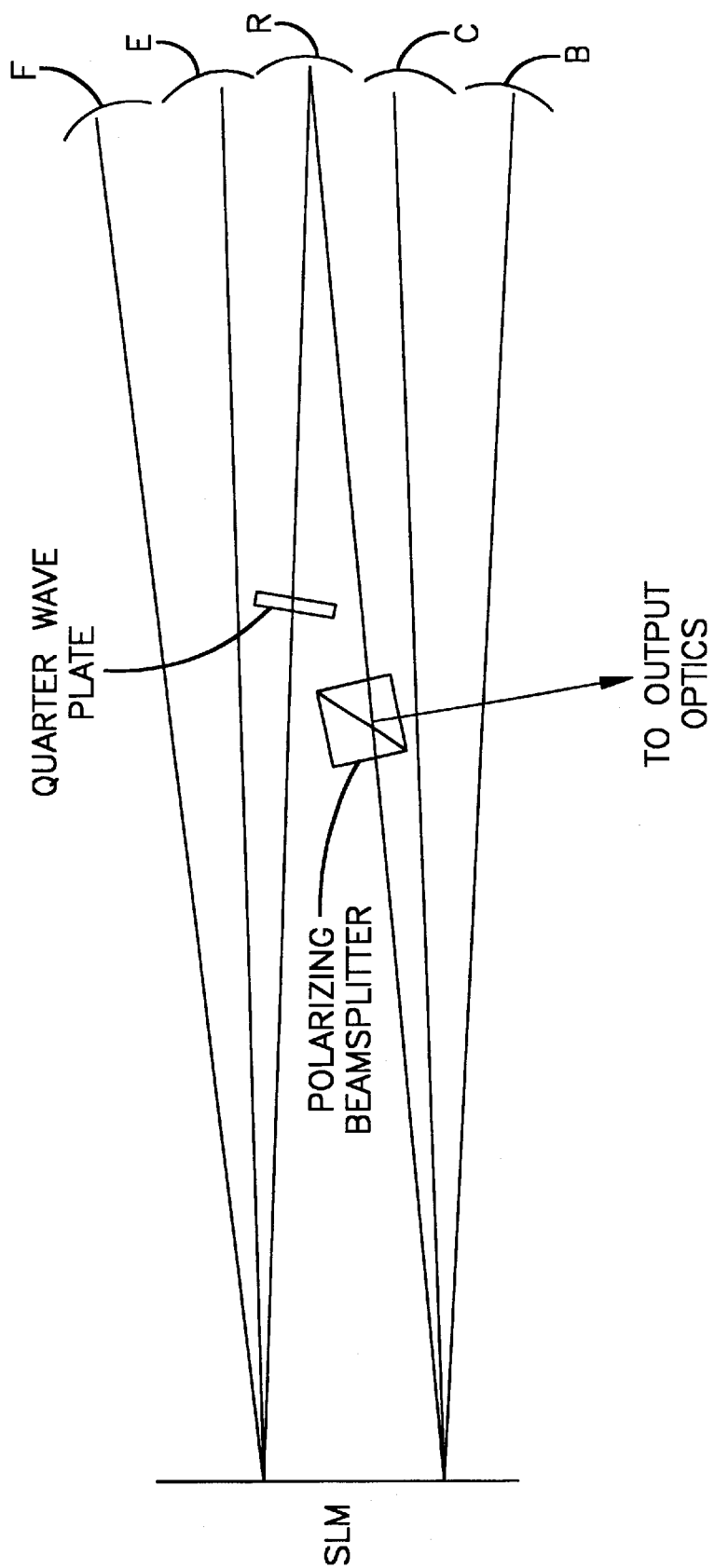
FIG. 23 is a diagram of an apparatus of one embodiment of the present invention utilizing a polarizing beam splitter.

There is one problem remaining to be solved in this embodiment. When a beam has finished its bounces and is switched out of the output White cell, it will return via Mirror R to the input White cell. This creates a conflict with the bounce patterns in the input cell. One way to circumvent this is to restrict the SLM to a non-polarizing SLM, such as a DMD. Then one can use light of a particular polarization in the input cell. A quarter wave plate may be added in the path to Mirror R as shown in FIG. 23. As the light passes into the second cell, it becomes circularly polarized. It continues its bounce pattern, and when it is switched back out of the output White cell, it passes through the quarter wave plate again at which point it is polarized orthogonal to the input polarization. A polarizing beamsplitter then preferably reflects the output beam out of both cells and into the output optics.

Up to now, dual White cell design has been considered in which spots in one White cell bounce in columns, and in the other cell bounce in rows. This approach has the disadvantage that for a given output connection, the various inputs will all come out at different locations along the output row, requiring a cylindrical lens or the equivalent to combine all the possible output points to one detector or fiber. For example, in FIG. 20, for output number 4, the inputs a–i finish their bounces in a row, but each at a different pixel along that row. It also does not allow multiple inputs to be connected to be the same output.

Figure 24:
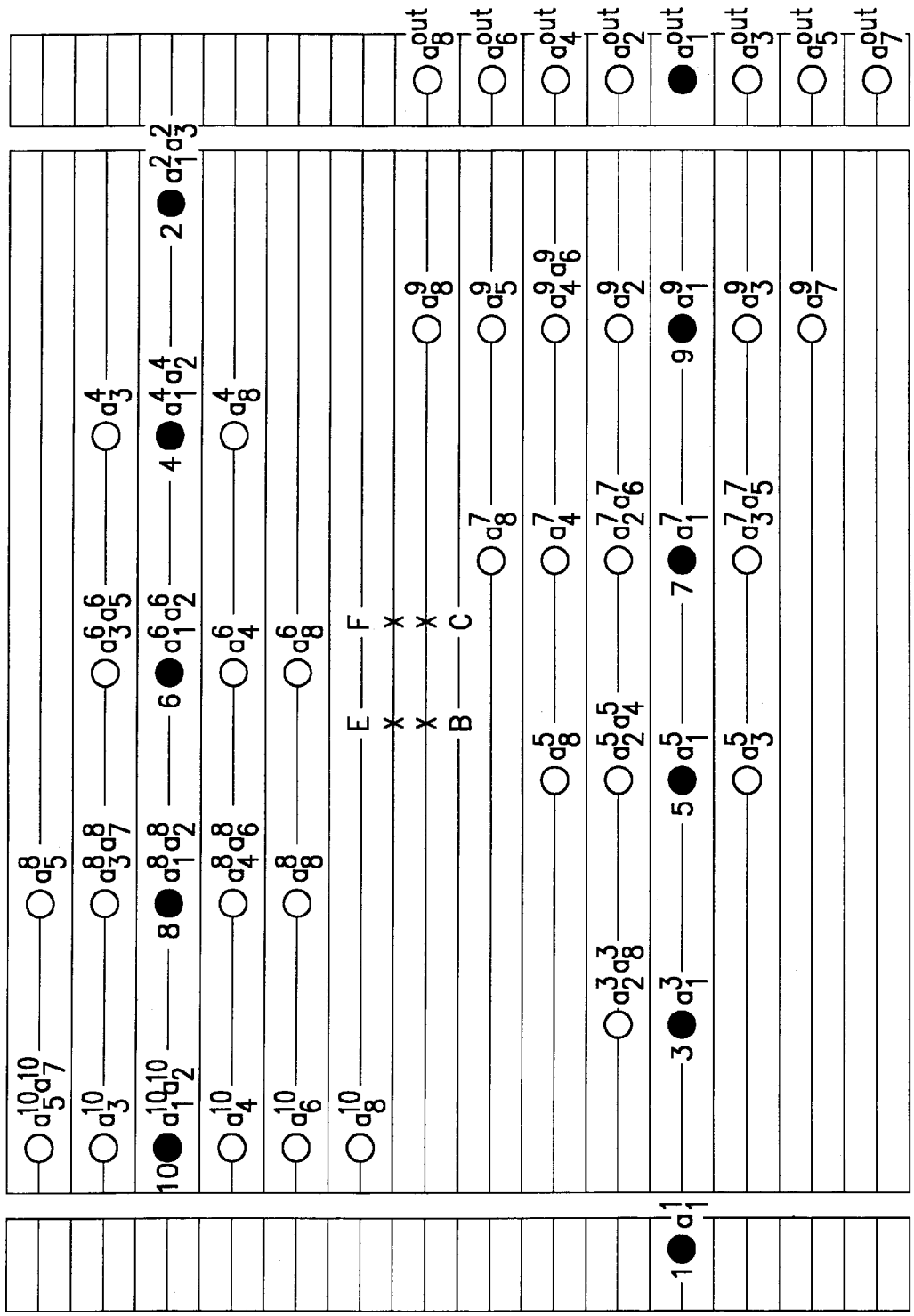
FIG. 24 is a diagram showing spot progression in accordance with one embodiment of the present invention.

A more elegant solution, then, is to keep the two White cells but arrange the centers of curvature such that CC(E) is directly above CC(B) and CC(F) is directly above CC(C). In this way when light goes from one White cell to the other, the bounces remain in the same column but may move up or down between rows. FIG. 24 illustrates this for one input. The solid circles represent the bounces if the beam remains always in the White cell containing Mirrors B and C. The open circles represent the spots for various cases, again using the notation that the subscript indicates the intended destination and the superscript is the bounce number.

Table 2 shows the mirror order used to generate the particular spot pattern in FIG. 24. Actually, there are many possible patterns possible and the mirrors can be visited in different orders than represented in the Table to arrive at the correct output.

TABLE 2

One possible set of mirror orders to achieve the spot pattern of FIG. 24:

| To send the input to | This pattern of mirrors can be used: |
| --- | --- |
| 1 | BC BC BC BC BC |
| 2 | BF EF EF EF EF |
| 3 | BC EC BC BC BC |
| 4 | BC BF BF EF EF |
| 5 | BC BC EC EC BC |

TABLE 2-continued

One possible set of mirror orders to achieve the spot pattern of FIG. 24:

| To send the input to | This pattern of mirrors can be used: |
| --- | --- |
| 6 | BC BC BC FB FE |
| 7 | BC BC BC EC EC |
| 8 | BE CE CE CE FE |

Next, multiple inputs may be considered. Where there is a single spot in 24, an array of spots is introduced, represented as a dotted square in FIG. 25. The next move is to move the columns closer together, such as by adjusting the centers of curvature of the mirrors, and move the two triangular regions, indicated with dashed lines, vertically until they meet or overlap. This avoids wasting space on the spatial light modulator.

This approach overcomes the shortcomings of the previously described architecture. Every input spot requires the same number of bounces, regardless of the output selected. Therefore, the latency is the same. The beams all strike the same number of optical elements regardless of the output selected, so the loss is the same. Every input spot in the approach of FIG. 25 strikes a completely unique set of pixels, so now multiple inputs can be connected to the same output. Finally, the need for a cylindrical lens is eliminated. Now any input that is directed to output 8 will appear in the square of spots labeled output 8. This has the advantage in that a common spherical lens may be used to focus all of those spots onto a single detector. This is illustrated in FIG. 26 using a spherical lens array as an example.

Figure 25:
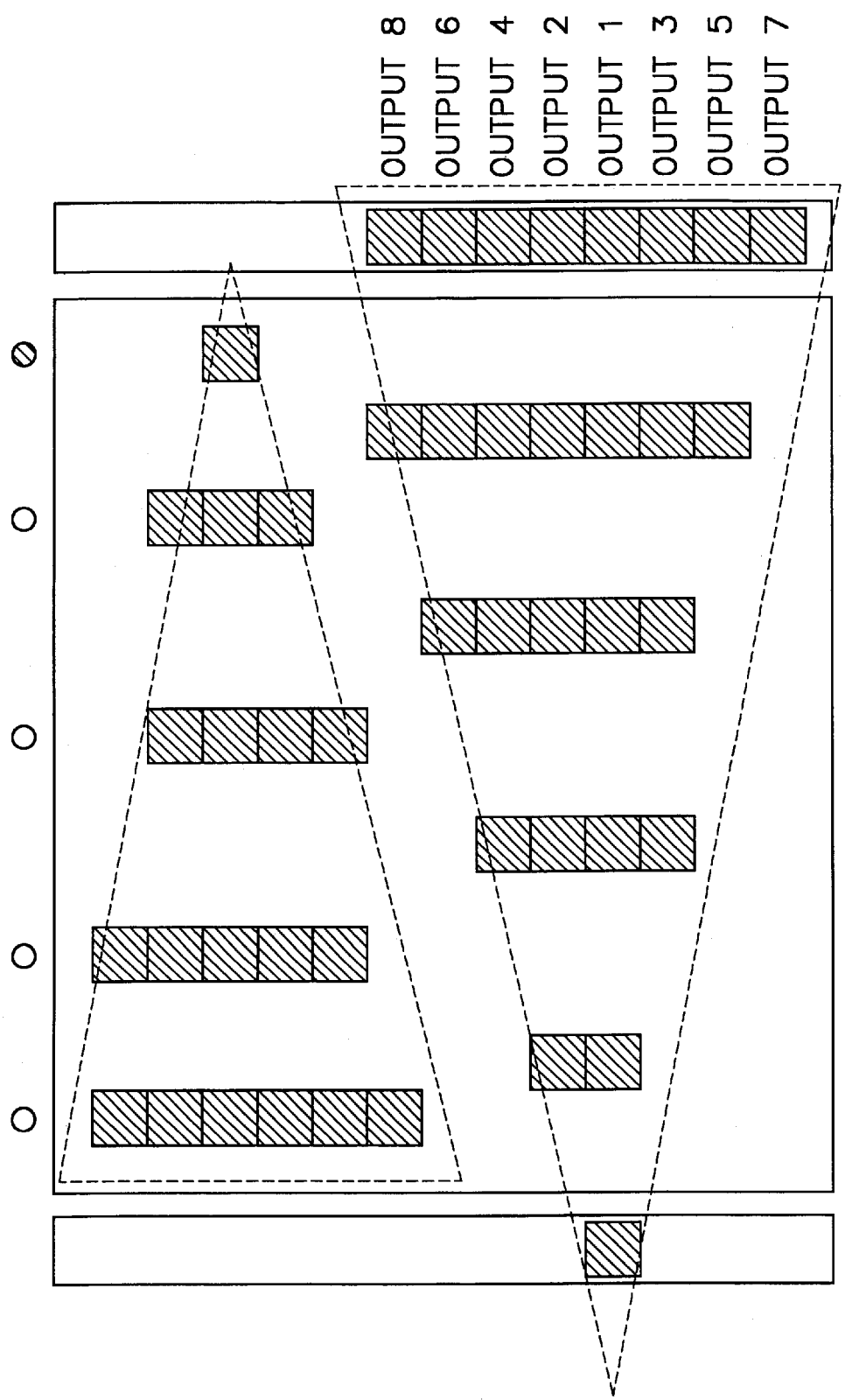
FIG. 25 is another diagram showing spot progression in accordance with one embodiment of the present invention.
Figure 26:
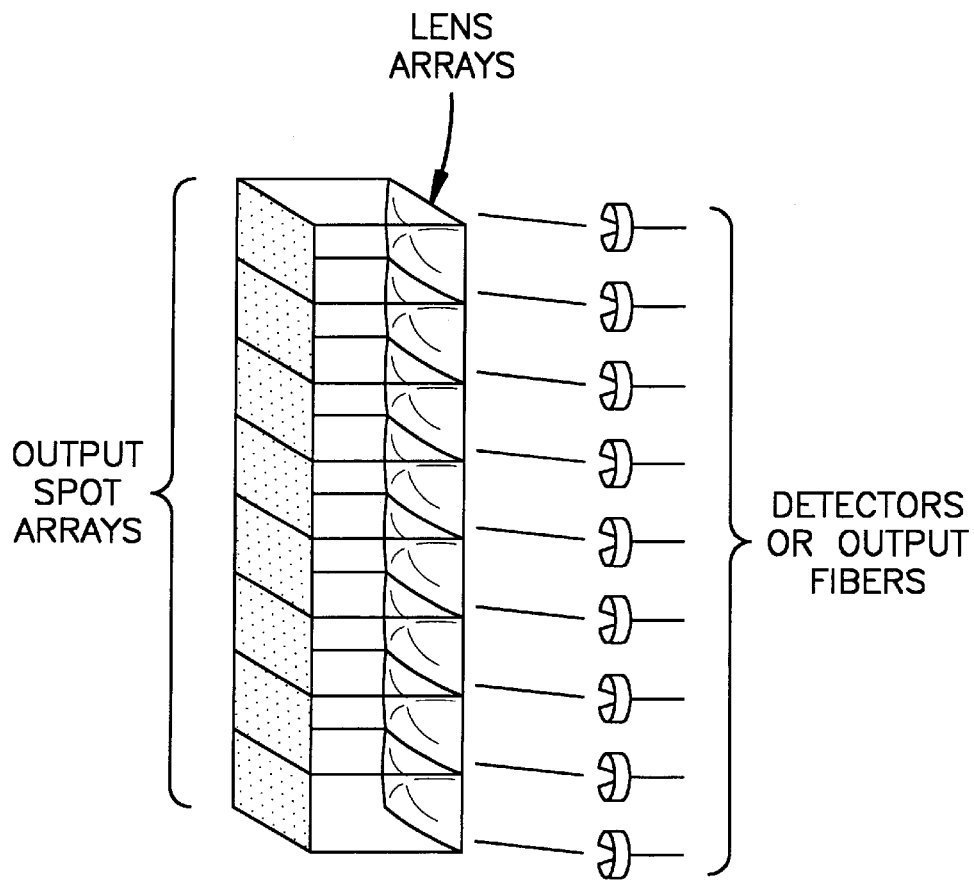
FIG. 26 is a perspective view of a lens array in accordance with one embodiment of the present invention.
Figure 27:
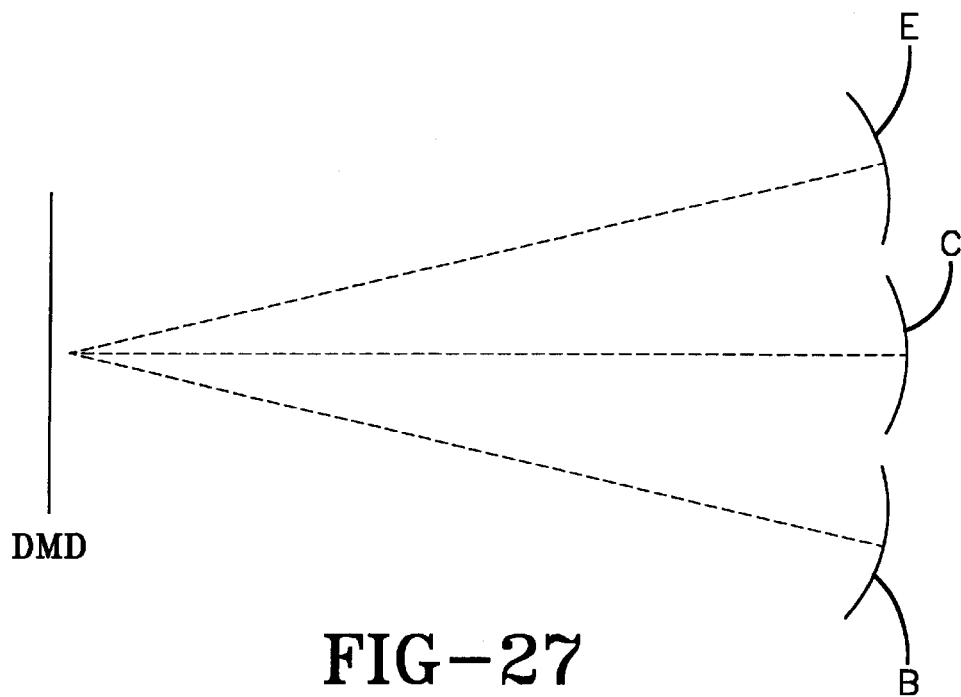
FIG. 27 is a diagram of a dual White cell device in accordance with the present invention.

The arrangement of FIGS. 24 and 25 both assume that there are four mirrors, B, C, E, and F, and that light can go from B to C, B to F, E to F, or C to E. This flexibility is not necessarily available if the spatial light modulator is a DMD. Considering the simplest example, a two-position DMD device is used as in the configuration of FIG. 27. Here there are three White cell arms that compose two total White cells, one using Mirrors B and C and the other using Mirrors E and C.

Figure 28:
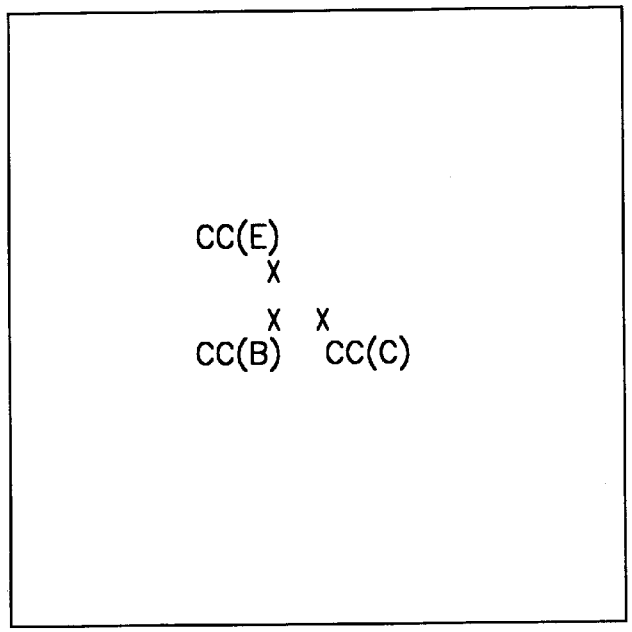
FIG. 28 is a diagram of an arrangement of centers of curvature in accordance with one embodiment of the present invention.

In this case, the light can go between Mirrors B and C or between Mirrors E and C. It cannot go directly from E to B, and light must visit Mirror C on every other bounce. The centers of curvature can be arranged as shown in FIG. 28. The center of curvature of Mirror E here is directly above that of Mirror B. A beam bouncing in White cell (BC) will trace out, in general, two rows of spots. Each time the beam is switched to the other White cell (EC), the next spot will move up one row on the DMD. If there are m bounces, any given input spot can be moved by some number of rows up to m/2. All spots associated with bounce n will still appear in the column associated with bounce n.

Figure 29:
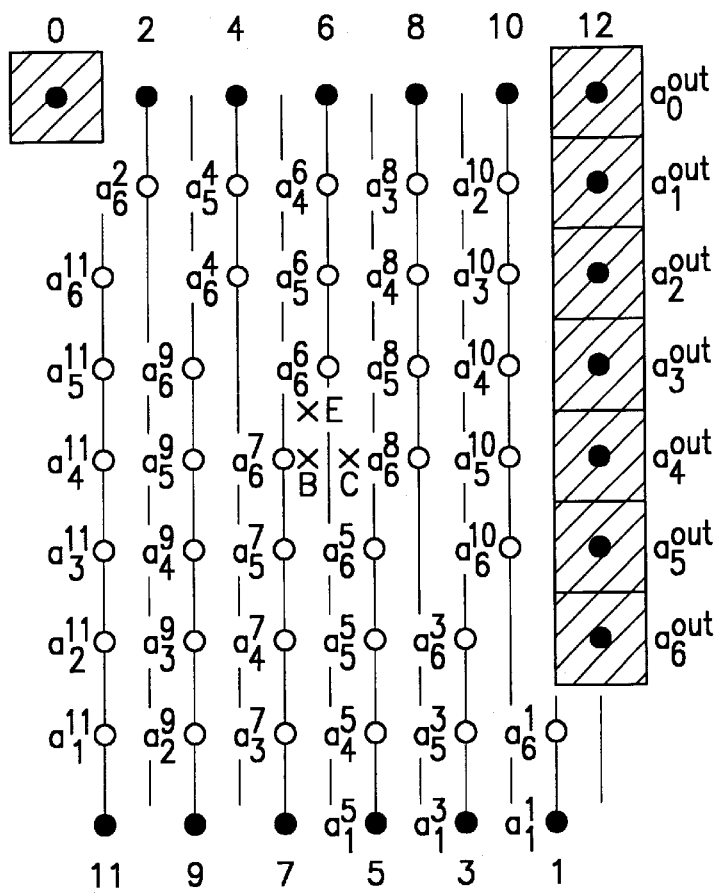
FIG. 29 is a diagram of a spot arrangement in accordance with one embodiment of the present invention.

FIG. 29 considers one particular input spot and shows how it may be connected to any of 6 outputs. Twelve bounces are required in this case. The gray box also indicates the size of the spot array that may be input without conflict. Any spot in this array can be directed to any of the output squares and thus focused to any output detector. Table 3 shows the order of the mirrors visited by a given beam to achieve the spot pattern shown in FIG. 29. The order may vary. What matters is the number of times the beam goes to Mirror E. Each time the beam goes to mirror E its spot pattern will be shifted by one row.

TABLE 3

The mirror pattern used to achieve the spot pattern of FIG. 29.
This is for the 3-arm Dual White cell using a two-position DMD.

| Intended output | Order of Mirrors |
| --- | --- |
| 0 | BC BC BC BC BC BC |
| 1 | BC BC BC BC BC EC |
| 2 | BC BC BC BC EC EC |
| 3 | BC BC BC EC EC EC |
| 4 | BC BC EC EC EC EC |
| 5 | BC EC EC EC EC EC |
| 6 | EC EC EC EC EC EC |

The arrangement of FIG. 29 can also be implemented with a liquid crystal-style spatial light modulator and a 4-arm dual White cell. One may superimpose the center of curvature of the fourth mirror (call it F) with the center of curvature of Mirror C.

To summarize this preferred embodiment, an optical interconnection device is implemented using a single spatial light modulator and a few lenses and mirrors. The device is reconfigurable and strictly non-blocking. The preferred versions allow one to independently connect any input to any output (any to any). They also permit the connection of multiple inputs to a single output (many to any). One may connect a single input to multiple outputs (any to many) in the case of a polarization-style SLM by partially changing the polarization on the appropriate bounces such that some of the light energy is switched to the appropriate output. In the case of a DMD-style SLM, such amplitude control could be implemented by dithering the micromirrors. For example, if the beam associated with input "a" is to be sent to two outputs, the micromirrors for the corresponding pixels could be set such that they direct the light to the first output half the time, and the other output the other half of the time. This may require timing things such that the micromirror switching does not interfere with the data, for example making the micromirror switching frequency much faster than the clock rate of the data stream.

It is noted that the optical interconnection device presented here uses a White cell or multiple White cells to generate a spot pattern. The spot pattern is the key to operation of this device, but the spots may be generated by many other optical means, including mirrors, and lenses.

Figure 30:
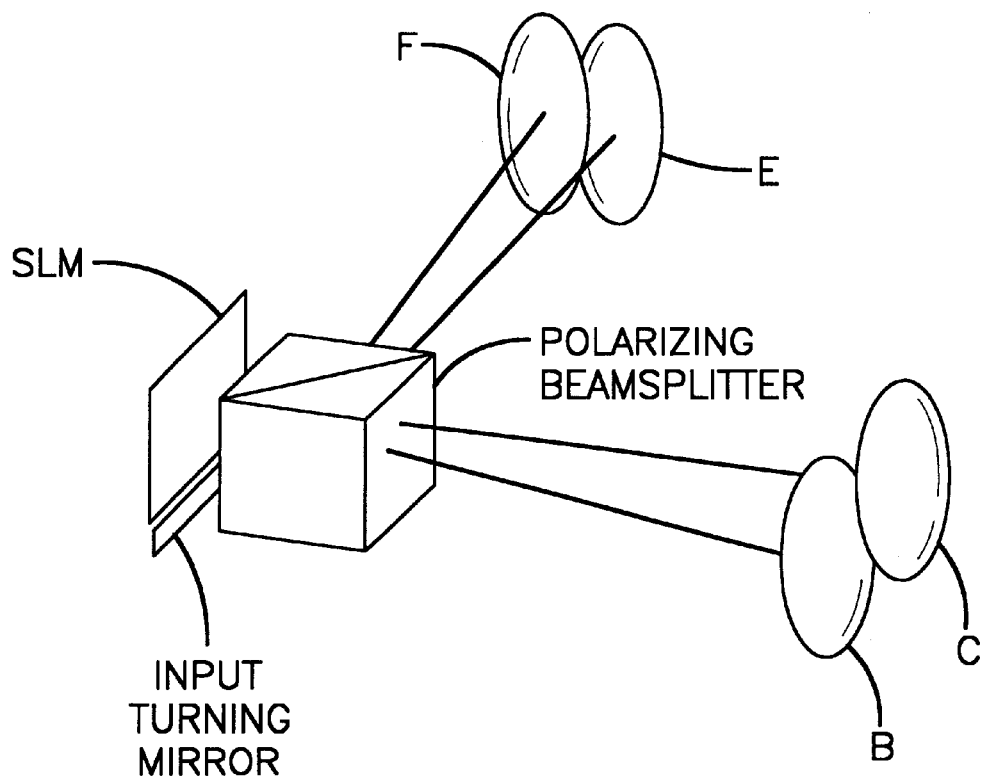
FIG. 30 is a perspective view showing a dual White cell implemented with a liquid crystal SLM in accordance with one embodiment of the present invention.

Another photonic device can be made that contains four White cell mirrors, as shown in FIG. 30 for the case where the spatial light modulator is a liquid crystal or other polarizing type. Here there are two White cells, one consisting of Mirror B, C, and the SLM, and the other consisting of Mirrors E, F, and the SLM. The centers of curvature can be aligned on the face of the SLM. Here, the light beams enter (in an array of spots) on the input turning mirror. From there the beams go to Mirror B and then pass to the SLM. At this point, the beams may each be independently switched. Those that are switched go to Mirror E and have their spot patterns shifted by one row; those that are not switched go to Mirror C and do not have their spots patterns shifted. Returning from either E or C, the light returns to the SLM, from which it may go to F or B. Beams going to F have their spot patterns shifted by one row. Beams going to B do not have their spot patterns shifted.

Figure 31:
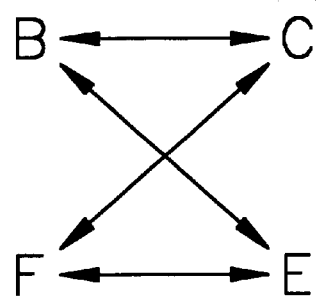
FIG. 31 is a diagram showing the possible transitions for the LC-based quadratic cell of FIG. 30.

The connectivity diagram for this cell is shown in FIG. 31. Note that in this case that the light can go directly between Mirrors E and F, which means that the number of row shifts (and thus independent outputs) is now equal to m, the number of bounces, instead of m/2.

A better photonic device may be made by aligning Mirror F such that its center of curvature is displaced from CCB and CCC by amount different than that by which CCE is displaced. Let the number of bounces on the SLM be m.

If a beam is directed to stay in the White cell containing Mirrors B and C for all of its bounces, it traces out a particular spot pattern, forming two rows, and exits at an output corresponding to one of these rows. If the beam is sent once to Mirror E, its spot pattern gets transferred up one row and it will exit at the next output. If the beam goes to Mirror E twice, it will move up two rows, and so forth. The beam may visit Mirror E at most m/2 times, so that in using Mirror E only a beam may be directed to m/2 different to outputs.

If the light is sent to Mirror F, however, the spot pattern may be shifted by a larger amount since F's center of curvature may be displaced by a large amount. It makes sense to choose CCF such that in a single visit to Mirror F the spot pattern is shifted by one more than is possible using Mirror E, or $(m/2+1)\delta$, where $\delta$ is the separation between rows of spots.

For example, suppose that m=20. The beam can visit Mirror E as many as m/2=10 times, and thus be transferred to any of 10 different outputs using this mirror alone. If the beam is sent to F one time and E no times, then the pattern is shifted by m/2+1=11 and the spot exits at the $11^{th}$ output. A visit to E once and F once delivers the beam to output 12. The maximum shift (and thus number of possible outputs) obtainable would be incurred by visiting Mirror F m/2 times to shift a total of (m/2+1)m/2 rows and Mirror E m/2 times to shift an addition m/2 rows. The maximum number of outputs, N, then, is $$N = \left(\frac{m}{2}\right)\left(\frac{m}{2}+1\right) + \left(\frac{m}{2}\right) = \left(\frac{m}{2}\right)^2 + m.$$

We term this a "quadratic cell" because the number of outputs goes as the square of the number of bounces.

A similar device can be implemented using a two-state DMD as shown in FIG. 32. In this figure two axes are established, each containing a White cell. Suppose for example that the DMD had two stable mirror positions, at +10° and −10°. The axes are then chosen such that one lies at +10° and the other lies at −30° with respect to the normal to the DMD plane. On each of the axes is placed two White cell mirrors, one above the plane containing the arms and one below. The White cell whose axis is at 10° contains Mirrors A and B. The White cell whose axis is at −30° contains Mirrors E and F. The lenses at the SLM end of the device are not shown. The placements of the centers of curvature, and the connectivity diagram, are also shown it the figure.

If the DMD pixels are all oriented at +10°, then light bounces back and forth between Mirrors A, B, and the DMD. If the pixel corresponding to a particular bounce is switched to −10° then the light is switched to the other White cell. The next pixel is also set to −10° to return the light to the first cell. Light cannot go from Mirror E directly to Mirror F in this configuration. It must first return to the first White cell. Table 4 summarizes the possible transitions.

TABLE 4

Possible transitions for the dual White cell.

| Micropixel at +10° | Micropixel at −10° |
| --- | --- |
| A←→B | A←→E |

TABLE 4-continued

Possible transitions for the dual White cell.

| Micropixel at +10° | Micropixel at –10° |
|---|---|
| | B←→F |

Table 5 shows the direction light will go if incident from various directions with the pixels set in either orientation.

TABLE 5

The output angles for rays incident at various angles for the two-position DMD.

| Input Angle | Output if pixel at +10° | Output if pixel at –10° |
|---|---|---|
| 10° | 10° | –30° |
| 30° | +50° | +10° |
| +50° | –30° | Don't care |

Let m be the number of bounces on the DMD. Assume that the light is brought into the cell via an input arm (not shown) that is along an axis at +50° to the normal to the DMD plane. Here, the DMD pixels themselves can be used as input and output turning mirrors. The pixel corresponding to the input spot is set to +10°, and the light will go first from the input arm at +50° into the White cell containing Mirrors E and F. Suppose it is chosen to go to F. On the next bounce, the appropriate pixel is set to –10°, and the beam goes to Mirror B. Now the beam can be directed to go into either cell, and decisions may be made that lead to spot pattern row shifts. Thus, two bounces are required just to input the light into the cell.

Similarly, two bounces may be used for output. Suppose the final path-choice-bounce is on a lower mirror, either B or E. The output arm will necessarily be along the 50° axis as well, and to get to this arm the beam must be coming from the EF cell. The light should leave Mirror E, thus headed out upward, so it can be separated from the input beam headed in and upward toward Mirror F. To get to Mirror E in order to be switched out, the light must come from A. Thus two bounces are also required for output.

A total of four bounces are required for input and output if the DMD pixels themselves are used for input and output. This has two disadvantages. One disadvantage is that there will be some energy loss from the extra bounces. The other disadvantage is that a beam incident on a micromirror at such a large angles as are needed for the input-output arm in this case will have a large footprint on the pixel. An alternative is to use separate input and output turning mirrors. The disadvantage then is the need for more components and the need to align them.

Let us suppose that one chooses to use the pixels as input and output turning mirrors. By the preceding argument, if the total number of time the light bounces on the DMD is m, then the number of times the beam may be switched usefully is four less than that. Let the number of controllable bounces be m'=m–4.

Let the center of curvature of Mirror E be displaced by one half pixel (δ) from the line containing the centers of curvature of Mirrors B and C. Mirror E can only be visited on every other bounce, following a sequence BEBEBE-BEBE . . . After any visit to Mirror E, the beam must return to Mirror B according to the connectivity diagram of FIG. 32.

Mirror F may be visited on alternate bounces FCFCFC. It is preferred to displace the center of curvature of Mirror F (CCF) by more than CCE is displaced. This device does not have the same connectivity as the liquid crystal-based cell of FIG. 30, because it is not possible in this case for light to directly from E to F. That is, while a beam can visit Mirror E or Mirror F m'/2 times each, it cannot visit both mirrors E and F that many times. If both mirrors are visited as often as possible, each can be used at most m'/4 times. Thus, the position of the center of Curvature of Mirror F is adjusted to (m'/4+1)δ away form the line connecting CCB and CCC, and the maximum number of different outputs that a beam can be directed to is $$N = \left(\frac{m'}{4}\right)\left(\frac{m'}{4}+1\right)+\left(\frac{m'}{4}\right) = \left(\frac{m'}{4}\right)^2 + 2\left(\frac{m'}{4}\right).$$

The device is still quadratic but it is quadratic in m/4. This equation predicts that if m=16, and thus m'=12, the number of outputs should be 15. It turns out that one may go a little higher. Table 6 shows how to count up to 18 in this case. The input and output bounces are included for completeness. Examining the rows for outputs 16–18 reveals that one may visit Mirror F an extra time, at the expense of a visit to Mirror E. Note that we have chosen the input beam to come in via FC and go out via BE, and that no sequence requires that the beam go directly between E and F. In this example, m'/4=3, but Mirror F is visited four times and Mirror E is visited the remaining two times to get to output number 18. Thus the total number of possible different outputs is given by (m'/4+1) visits to F (displaced by (m'/4+1)), plus (m'/4–1) visits to E to with a displacement of 1:

$$N = \left(\frac{m'}{4}+1\right)\left(\frac{m'}{4}+1\right)+\left(\frac{m'}{4}-1\right)$$

$$= \left[\left(\frac{m'}{4}\right)^2 + 2\left(\frac{m'}{4}\right)+1\right]+\left(\frac{m'}{4}-1\right) \quad \text{Quadratic cell, two-position DMD}$$

$$= \left[\left(\frac{m'}{4}\right)^2 + 3\left(\frac{m'}{4}\right)\right].$$

TABLE 6

The mirror progressions for switching a beam to any of 19 different output (including zero) for the cell of FIG. 32. The displacement of the center of curvatures of Mirror E = Δ and F = 4Δ for m' = 12.

| Delay | Mirror Progression<br>Input \| switchable bounces \| output |
|---|---|
| 0 | FC \| BC BC BC BC BC BC \| BE |
| 1 | FC \| BC BC BC BC BC BE \| BE |
| 2 | FC \| BC BC BC BC BE BE \| BE |
| 3 | FC \| BC BC BC BE BE BE \| BE |
| 4 | FC \| FC BC BC BC BC BC \| BE |
| 5 | FC \| FC BC BC BC BC BE \| BE |

TABLE 6-continued

The mirror progressions for switching a beam to any of 19 different output (including zero) for the cell of FIG. 32. The displacement of the center of curvatures of Mirror E = Δ and F = 4Δ for m' = 12.

| Delay | Mirror Progression Input \| switchable bounces \| output |
|---|---|
| 6 | FC \| FC BC BC BC BE BE \| BE |
| 7 | FC \| FC BC BC BE BE BE \| BE |
| 8 | FC \| FC FC BC BC BC BC \| BE |
| 9 | FC \| FC FC BC BC BC BE \| BE |
| 10 | FC \| FC FC BC BC BE BE \| BE |
| 11 | FC \| FC FC BC BE BE BE \| BE |
| 12 | FC \| FC FC FC BC BC BC \| BE |
| 13 | FC \| FC FC FC BC BC BE \| BE |
| 14 | FC \| FC FC FC BC BE BE \| BE |
| 15 | FC \| FC FC FC BE BE BE \| BE |
| 16 | FC \| FC FC FC FC BC BC \| BE |
| 17 | FC \| FC FC FC FC BC BE \| BE |
| 18 | FC \| FC FC FC FC BE BE \| BE |
| 19 | No solution |

Another preferred embodiment utilizes an SLM having more than two states per pixel. Consider a hypothetical DMD whose mirrors can tilt to three different angles, for example +α, 0, and −α. A ray incident on such a DMD could be reflected at any of three angles:

$\theta = 2\alpha - \phi$ (mirror at +α) or
$\theta = -\phi$ (mirror at 0) or
$\theta = -2\alpha - \phi$ (mirror at −α)

where θ is the angle of reflection with respect to the DMD normal and φ is the angle of incidence with respect to the DMD normal. Table 7 shows some possible input angles and the resulting output angles for an arbitrary case in which α=±10°.

TABLE 7

Output angles for rays incident at various angles for the three-position DMD.

| Input angle | Output if pixel at +10° | Output if pixel at 0° | Output if pixel at −10° |
|---|---|---|---|
| 5° | 15° | −5° | −25° |
| 10° | 10° | −10° | −30° |
| 15° | 5° | −15° | −35° |
| 20° | 0° | −20° | −40° |

Figure 33:
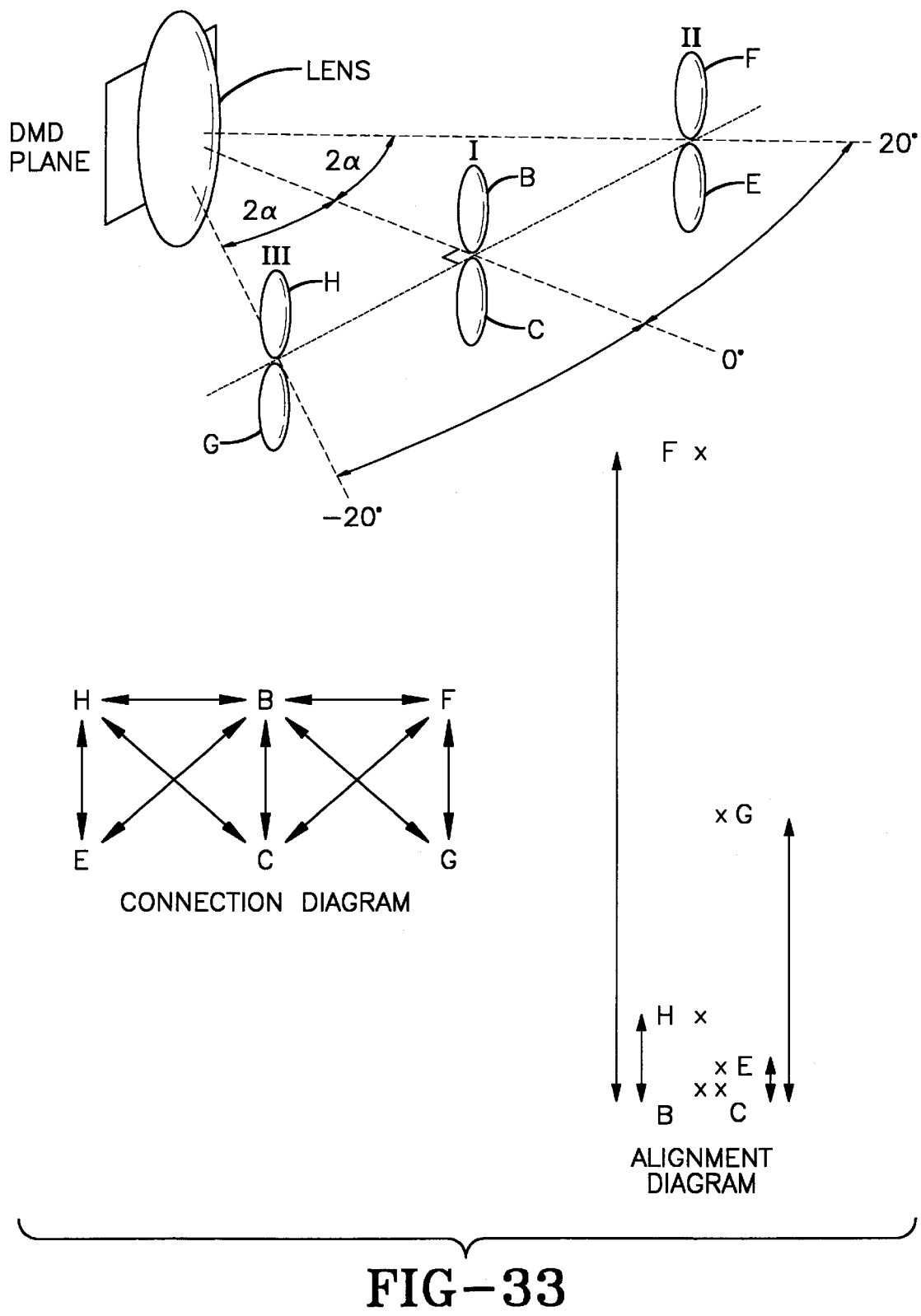
FIG. 33 is a perspective view of a three-position DMD with three associated White cells in accordance with one embodiment of the present invention.

Using this DMD device as the common mirror, three White cells may be constructed, labeled I, II, and III, whose axes are at +2α, 0°, and −2α to the normal to the DMD plane. For this example, these angles would be 20°, −20°, and 0°, as shown in FIG. 33. The connectivity is again shown, along with the alignment diagram. Table 8 explains the connectivity diagram. Light from an upper mirror goes to a lower mirror next, and vice versa.

TABLE 8

| From | To (pixel +10°) | To (pixel 0°) | To (pixel −10°) |
|---|---|---|---|
| I | II | I | III |
| II | I | III | (−40°) |
| III | (+40°) | II | I |

There are other possible choices of White cell arm angles, as well, such as +10°, −10°, and −30°. These choices may not be as flexible, as one may not be able to reach as many different arms from a given arm as one can for the choices of 0, ±2α.

From Table 7 it can be seen that beams may be directed in many directions. Only three are chosen for the next device. In this device, light from Arm I may be directed into either of the other two arms on any bounce. Light from Arm II may go to Arm I or Arm II, but not back into arm II. Similarly, light coming from Arm III may go to II or I, but not back into III. As seen in the connectivity diagram, the mirrors have been arranged differently than they are physically arranged. Physically Mirrors E and H are in different arms, but together with the DMD form a White cell (similarly for G and F).

The mirrors are then preferably aligned as follows. The center of curvature of Mirror E is again one unit displaced from the line containing the centers of curvature of Mirrors B and C. Mirror H is aligned with its center displaced by (m/4+1)Δ, where m is the number of bounces on the DMD that are used for switching. Using just these two mirrors, a beam can be shifted by up to [(m/4+1)(m/4)+(m/4)]Δ rows. Mirror Mirror G is aligned such that its center is displaced from those of B and C by one more than this, or $$\text{Displacement of C. C. G} = \left\{\frac{m}{4}\left(\frac{m}{4}+1\right) + \frac{m}{4} + 1\right\}\Delta$$

$$= \left\{\left(\frac{m}{4}\right)^2 + 2\left(\frac{m}{4}\right) + 1\right\}\Delta.$$

Using, so far, just mirrors E, H, and G, a beam's spot pattern may be shifted over:

$$\text{can shift so far.} = \left\{\left(\frac{m}{4}\right)\left[\left(\frac{m}{4}\right)^2 + 2\left(\frac{m}{4}\right) + 1\right] + \right.$$
$$\left.\left(\frac{m}{4}\right)\left[\left(\frac{m}{4}\right) + 1\right] + \left(\frac{m}{4}\right)\right\}\Delta$$

$$= \left\{\left(\frac{m}{4}\right)^3 + 2\left(\frac{m}{4}\right)^2 + \left(\frac{m}{4}\right) + \left(\frac{m}{4}\right)^2 + \left(\frac{m}{4}\right) + \left(\frac{m}{4}\right)\right\}\Delta$$

$$= \left\{\left(\frac{m}{4}\right)^3 + 3\left(\frac{m}{4}\right)^2 + 3\left(\frac{m}{4}\right)\right\}\Delta.$$

Finally, the displacement of Mirror F is set such that its center of curvature is displaced by one more:

$$\text{displacement of C. C. F.} = \left\{\left(\frac{m}{4}\right)\left[\left(\frac{m}{4}\right)^2 + 2\left(\frac{m}{4}\right) + 1\right]\Delta + \right.$$
$$\left.\frac{m}{4}\left(\frac{m}{4}+1\right) + \frac{m}{4} + 1\right\}\Delta$$

$$= \left\{\left(\frac{m}{4}\right)^3 + 2\left(\frac{m}{4}\right)^2 + \frac{m}{4} + \left(\frac{m}{4}\right)^2 + \right.$$
$$\left.\frac{m}{4} + \frac{m}{4} + 1\right\}\Delta$$

$$= \left\{\left(\frac{m}{4}\right)^3 + 3\left(\frac{m}{4}\right)^2 + 3\left(\frac{m}{4}\right) + 1\right\}\Delta.$$

If a given beam is allowed to visit each mirror at most m/4 times, the maximum attainable number of row displacements (outputs) looks like $$N_{apparent} = \left\{\frac{m}{4}\left[\left(\frac{m}{4}\right)^3 + 3\left(\frac{m}{4}\right)^2 + 3\left(\frac{m}{4}\right) + 1\right] + \right.$$
$$\frac{m}{4}\left[\left(\frac{m}{4}\right)^2 + 2\left(\frac{m}{4}\right) + 1\right] + \frac{m}{4}\left[\left(\frac{m}{4}\right) + 1\right] + \frac{m}{4}\right\}\Delta$$

$$= \left\{\left(\frac{m}{4}\right)^4 + 3\left(\frac{m}{4}\right)^3 + 3\left(\frac{m}{4}\right)^2 + \frac{m}{4} + \left(\frac{m}{4}\right)^3 + \right.$$
$$\left.2\left(\frac{m}{4}\right)^2 + \frac{m}{4} + \left(\frac{m}{4}\right)^2 + \frac{m}{4} + \frac{m}{4}\right\}\Delta$$

$$= \left\{\left(\frac{m}{4}\right)^4 + 4\left(\frac{m}{4}\right)^3 + 6\left(\frac{m}{4}\right)^2 + 4\left(\frac{m}{4}\right)\right\}\Delta.$$

The number of attainable different outputs is actually one less than this, and Table 9 shows why for a system of m=8. The input and output bounces have been neglected. From this equation, a maximum row displacement of 80 may be achieved. To arrive at that number, one of mirrors E, F, G, or H would have to be visited on every bounce, but to do that requires going either directly between E and F or directly between G and H, and neither of these transitions is allowed. For every number from 0 to 79 inclusive, however, some order may be found in which to visit the mirrors in order to produce the necessary delay without violating the transition rules.

Thus the actual number of delays attainable is:

$$N_{actual} = \left\{\left(\frac{m}{4}\right)^4 + 4\left(\frac{m}{4}\right)^3 + 6\left(\frac{m}{4}\right)^2 + 4\left(\frac{m}{4}\right) - 1\right\}\Delta$$

quartic cell, 3-position DMD.

This cell is quartic in (m/4).

TABLE 9

How to count using the cell of FIG. 33. Take m = 8, E = $\Delta$, H = 3$\Delta$, G = 9$\Delta$, and F = 27$\Delta$. The input and output bounces are not shown.

| Shift to Output # | Mirror Pattern |
|---|---|
| 0 | BC BC BC BC |
| 1 | BC BC BC BE |
| 2 (1 + 1) | BC BC BE BE |
| 3 | HC BC BC BC |
| 8 (3 + 3 + 1 + 1) | HC HC BE BE |
| 9 | BG BC BC BC |
| 12 (9 + 3) | HC BG BC BC |
| 15 (9 + 3 + 3) | HC HC BG BC |
| 18 (9 + 9) | BG BG BC BC |
| 24 (9 + 9 + 3 + 3) | HC HC BG BG |
| 27 | FC BC BC BC |
| 30 (27 + 3) | FC HC BC BC |
| 33 (27 + 3 + 3) | FC HC HC BC |
| 36 (27 + 3 + 3 + 3) | FC HC HC HC |
| 39 (27 + 3 + 1 + 3 + 1 + 3 + 1) | FC HE HE HE |
| 40 (27 + 3 + 1 + 9) | FC HE BC BG |
| 42 (27 + 3 + 3 + 9) | FC HC HC BG |
| 43 (27 + 3 + 1 + 3 + 9) | FC HE HC BG |
| 44 (27 + 3 + 1 + 3 + 1 + 9) | FC HE HE BG |
| 45 (27 + 9 + 9) | FC BG BG BC |
| 46 (27 + 9 + 9 + 1) | FC BG BG AE |
| 47 (27 + 9 + 27 + 9 + 1 + 1) | FG FG BE BE |
| 48 (27 + 9 + 9 + 3) | FG BG BC HE |
| 53 (3 + 1 + 3 + 1 + 9 + 27 + 9) | HE HE BG FG |
| 54 (27 + 27) | FC FC BC BC |
| 57 (27 + 27 + 3) | FC FC HC BC |
| 62 (27 + 27 + 3 + 1 + 3 + 1) | FC FC BE HE |
| 63 (27 + 9 + 27) | FG FC BC BC |
| 71 (27 + 9 + 27 + 3 + 1 + 3 + 1) | FG FC HE HE |
| 72 (27 + 9 + 27 + 9) | FC FC BC BC |
| 79 (3 + 1 + 3 + 27 + 9 + 27 + 9) | HE HC FG FG |
| 80 (no solution) | HE H̲E̲ F̲G̲ FG |
| underscored transitions | nor |
| not allowed | FG F̲G̲ H̲E̲ HE |

It may be observed that the displacements of the four spot pattern-shifting arms in the quartic cell increase by polynomials in m/4 whose coefficients can be found from the rows of Pascal's Triangle:

$$\left\{1\left(\frac{m}{4}\right)^0\right\}\Delta$$

$$\left\{1\left(\frac{m}{4}\right)^1 + 1\left(\frac{m}{4}\right)^0\right\}\Delta$$

$$\left\{1\left(\frac{m}{4}\right)^2 + 2\left(\frac{m}{4}\right)^1 + 1\left(\frac{m}{4}\right)^0\right\}\Delta$$

$$\left\{1\left(\frac{m}{4}\right)^3 + 3\left(\frac{m}{4}\right)^2 + 3\left(\frac{m}{4}\right)^1 + 1\left(\frac{m}{4}\right)^0\right\}\Delta.$$

These ideas may be extended to optical interconnection devices based on digital micromirror devices that have more than three stable micromirror positions.

Another optical element that may be used in an optical interconnection system of the present invention is a roof prism. Light incident normally on the diagonal face of a roof prism will be totally internally reflected from the two roof surfaces. It is a well-known property of the roof prism that the light beam exiting the roof will be parallel to the input beam. Thus, a ray leaving the spot on the right in the figure will arrive at a new spot on the left. A roof prism may also comprise two discrete mirrors, oriented with some angle between them. The angle need not necessarily be 90°.

To generate a proper spot pattern using the roof prism, various things may be done. First, the hypotenuse face of the roof prism may be angled slightly with respect to the spatial light modulator, such that as a beam bounces back and forth between the two sides of the roof prism, it also progresses forward or backward along the direction of the prism ridge. Multiple beams may be introduced, which would each strike a unique set of spots on the spatial light modulator.

Alternatively, one could rotate the roof prism about the ridge such that the hypotenuse face of the roof prism is tilted slightly with respect to the spatial light modulator. In this case the beams progress outward on the SLM. Multiple input beams may again be used.

Figure 34:
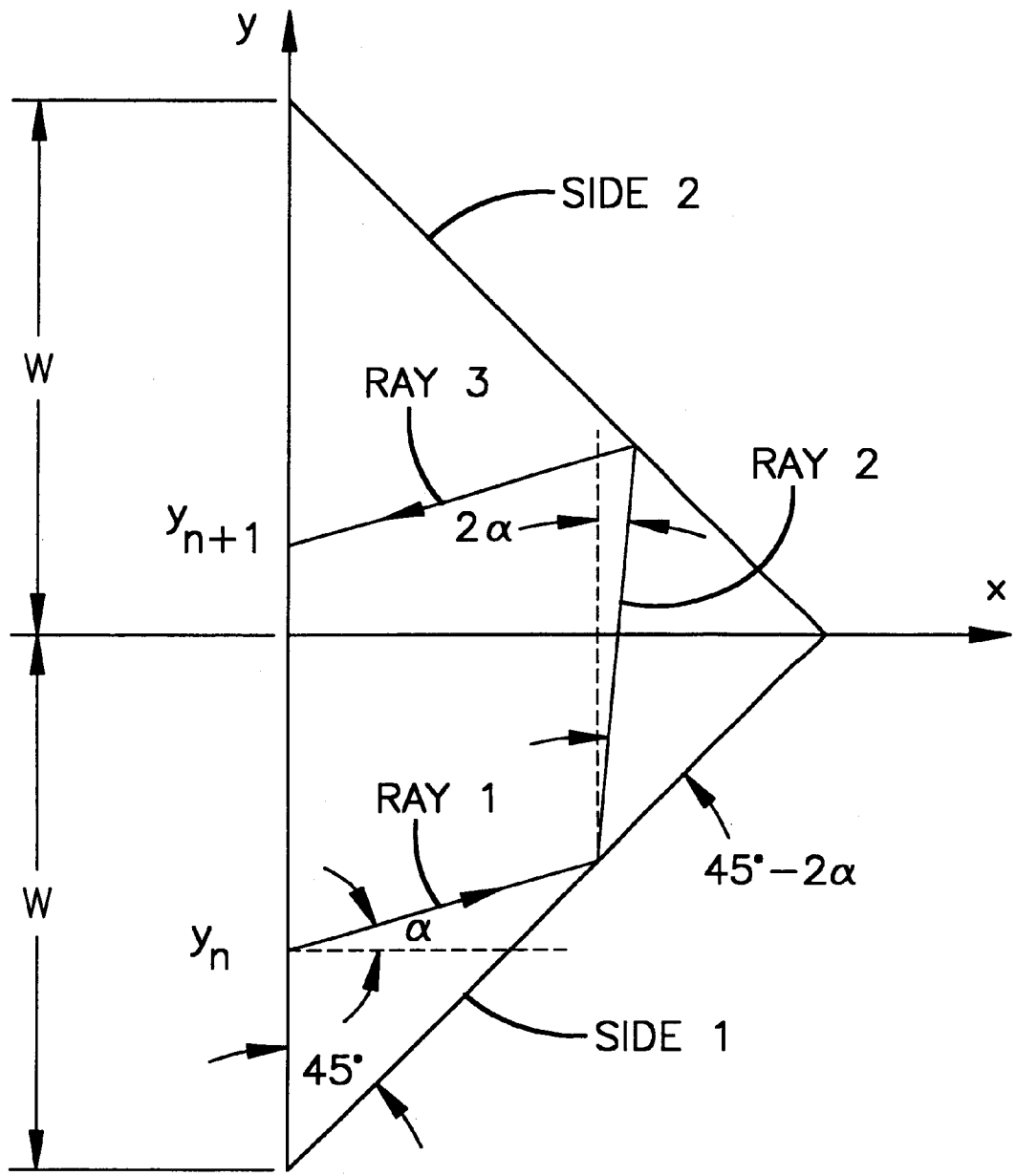
FIG. 34 is a ray diagram for a roof prism in accordance with one embodiment of the present invention.

Positions of successive spots may be found in the following manner. Consider a 90° roof prism whose base has a half-width of W and that has a height of W. The y-axis is then placed along the base and the z-axis through the apex as shown in FIG. 34. Next, consider a ray inside the prism travelling at an angle $\alpha$ with respect to the z-axis. Since Ray 1 has a slope of $\alpha$, the equation for Ray 1 may be written as:

$$y = \alpha z + y_n$$

where $y_n$ is the y-intercept of the ray, the point at which it intersects the base of the prism. Next, the equation for Side 1 of the prism may be written, Side 1 having a slope of 1 and a y-intercept of −W.

$$y = x - W.$$

Solving for the intersection obtains the point $A = (z_A, y_A)$ where $$z_A = \frac{y_n + W}{1 - \alpha}$$

$$y_A = \alpha\left(\frac{y_n + W}{1 - \alpha}\right)$$

in which we must find the y-intercept b. We have a known point on this line, Point (A) given by the equation for $z_A$ above, so substituting that point in obtains:

$$\alpha\left(\frac{y_n + W}{1 - \alpha}\right) + y_n = \frac{1}{\alpha}\left(\frac{y_n + W}{1 - \alpha}\right) + b \text{ or}$$

$$b = \frac{\alpha(y_n + W)}{1 - \alpha} - \frac{1}{\alpha}\left(\frac{W + y_n}{1 - \alpha}\right) + y_n = \left(\alpha - \frac{1}{\alpha}\right)\left(\frac{y_n + W}{1 - \alpha}\right) + y_n.$$

The equation for Ray 2 is thus $$y = \frac{z}{\alpha} + \left(\alpha - \frac{1}{\alpha}\right)\left(\frac{y_n + W}{1 - \alpha}\right) + y_n.$$

Ray 2 also intersects the upper side of the roof prism, the equation for which is y=−z+W.

The intersection of above equations for Ray 2 is point B. Solving for the coordinates finds:

$$z_B = \frac{W - \left(\alpha - \frac{1}{\alpha}\right)\left(\frac{y_n + W}{1 - \alpha}\right) - y_n}{1 + \frac{1}{\alpha}}$$

$$y_B = W - \frac{W - \left(\alpha - \frac{1}{\alpha}\right)\left(\frac{y_n + W}{1 + \alpha}\right) - y_n}{1 + \frac{1}{\alpha}}.$$

Point B also lies on Ray 3, the equation for which is y=αz+b=αz+y$_{n+1}$ where it has been noted that the y-intercept of Ray 3 is the position y$_{n+1}$, to be found. Plugging in coordinates (z$_B$, y$_B$) results in $$y_{n+1} = W - \left\{\frac{1 + \alpha}{1 + \frac{1}{\alpha}}\left[W - \left(\alpha - \frac{1}{\alpha}\right)\left(\frac{y_n + W}{1 - \alpha}\right) - y_n\right]\right\}.$$

To find the positions at which these rays intersect the flat mirror, Rays 1 and 3 have only been extended to the SLM plane. If that plane is a distance L away from the apex of the roof prism, and the roof prism has a height of h=W, then at the SLM plane the coordinates are y$_n$'=y$_n$−α(L−W)

y$_{n+1}$'=y$_{n+1}$−α(L−W).

These equations only apply when the input ray (Ray 1) strikes the lower half of the roof prism. If it strikes the upper half first, the above procedure is followed in reverse, intersecting Ray 1 with the upper mirror first. The result is:

$$y_{n+1} = -W + \left\{\frac{1 - \alpha}{1 - \frac{1}{\alpha}}\left[W + \left(\alpha - \frac{1}{\alpha}\right)\left(\frac{W - y_n}{1 + \alpha}\right) + y_n\right]\right\}.$$

Figure 35:
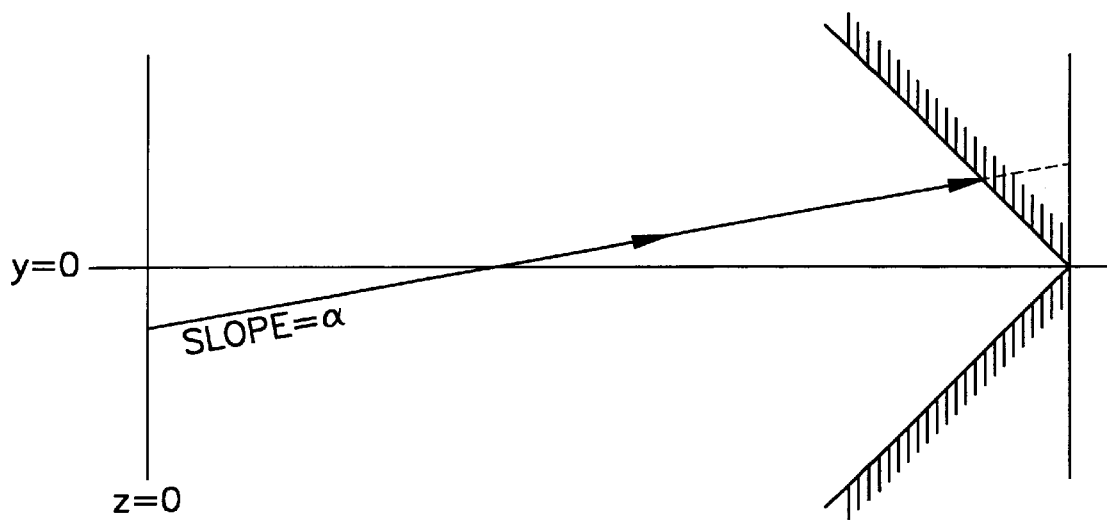
FIG. 35 is a ray diagram of a ray test in accordance with one embodiment of the present invention.

Deciding which equation to use may be done in the following way. If the ray is allowed to continue to the plane z=L, and it crosses that plane above the y-axis, then it will strike the upper side of the roof prism first, as shown in FIG. 35. Thus if y(z=L)>0, the first equation for y$_{n+1}$ should be used; if y(z=L)<0, the second equation for y$_{n+1}$ should be used. The spots may progress inward or outward, or first inward and then outward. The last case is the most useful because the beams may be introduced into the cell at the outside edge of the flat mirror, bound inward, then outward, and be extracted at the opposite, or same, outside edge.

Figure 36:
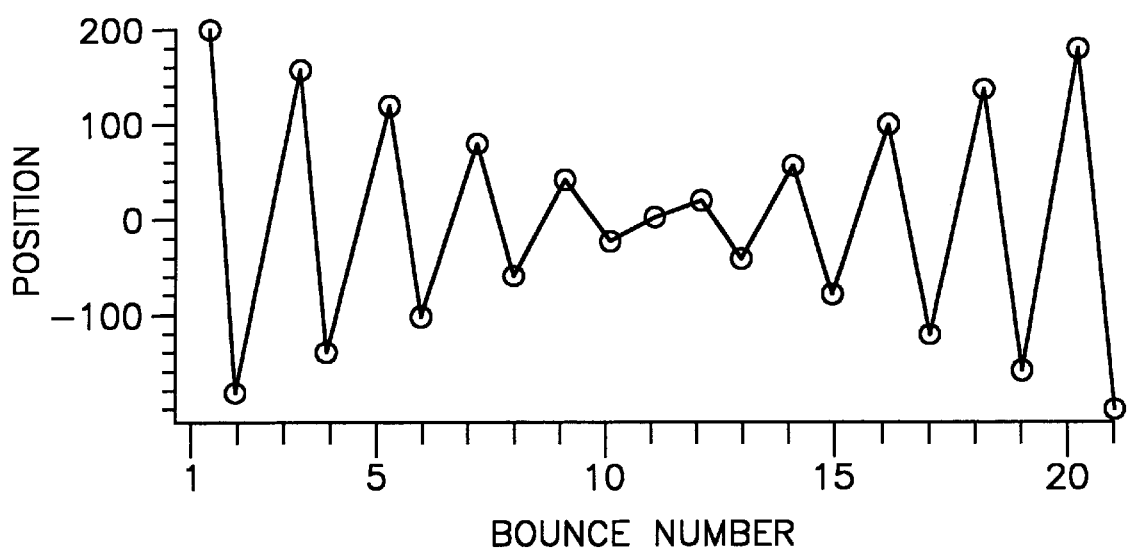
FIG. 36 is a diagram of spot position for a light beam in accordance with one embodiment of the present invention.

FIG. 36 shows the spots that would result if an input spot were introduced at the position x=201, whose ray has a slope of −0.1, and was directed at a prism whose apex was 100 units from the input plane. Note that these spots would actually land in a line of constant y; the plot shown in FIG. 36 stretches them out to show the order of progression. The spots in this case progress inward and then outward. The spacing between successive spots is constant.

In a situation in which the SLM is not parallel to the hypotenuse face of the roof prism, another progression of spots is generated. In this case, however, the image plane (the SLM) is not perpendicular to the optical axis, and spots will tend to be magnified or demagnified going from one side of the SLM to the other. If the SLM is tilted around the x-axis, the spots will grow or shrink as they progress away from center. If the flat mirror is tilted in the y-z plane, then each beam will have two spot sizes as it progresses down the mirror, one on the −x side and the other on the +x side.

Figure 37:
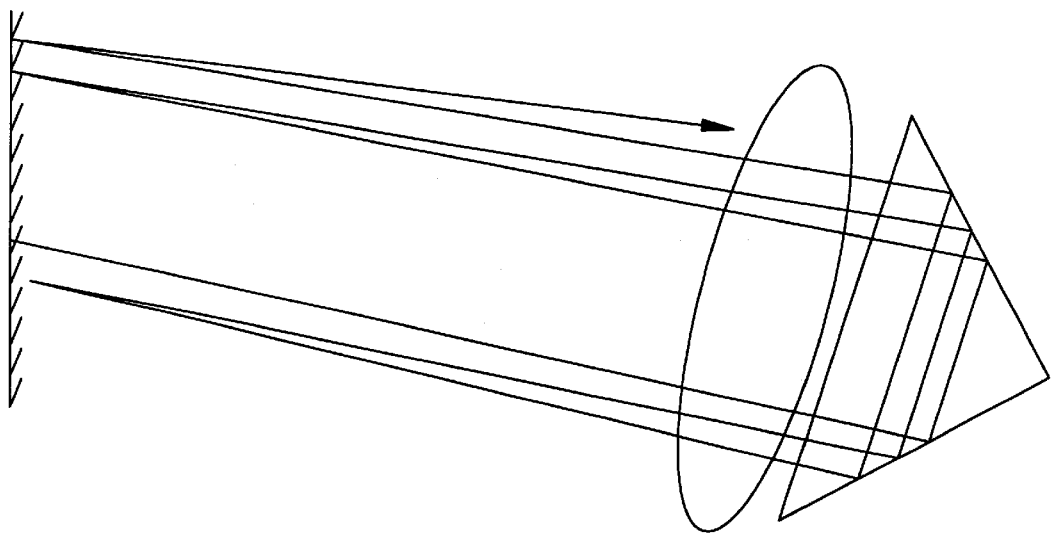
FIG. 37 is a ray diagram for a right-angled roof prism system of one to embodiment of the present invention.

The point is made again that any of these spot patterns may be generated with combinations of mirrors and lenses. A roof prism is shown only because it is expected to have less energy loss. Each pixel of the SLM or DMD is assumed to have the ability to tilt out of the plane of the DMD in one or more directions. For example, FIG. 37 shows the case for a DMD in which all pixels are turned to the same orientation. The DMD mirror plane is tipped with respect to the roof prism hypotenuse face, but each of the individual pixels is parallel to that face.

Figure 38:
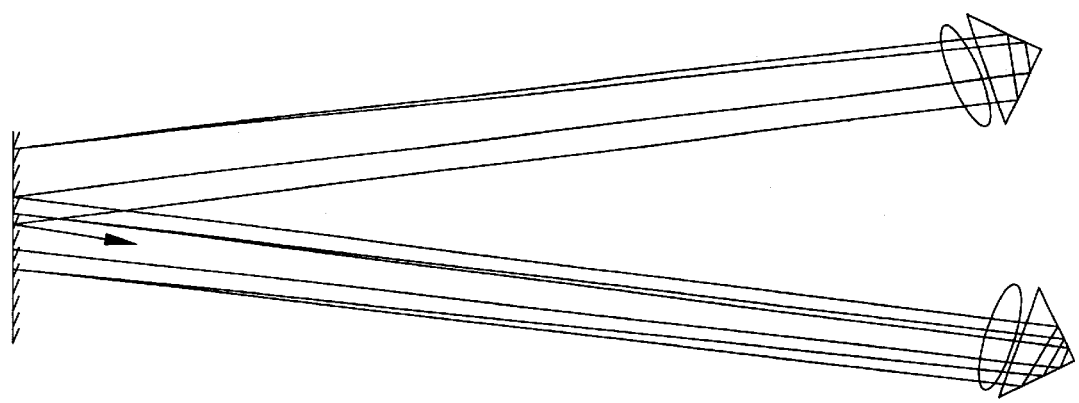
FIG. 38 is a ray diagram for a dual roof prism system of the present invention.

The entity in FIG. 37 will be referred to as a Prism cell. The prism cell can be configured in many different ways. Next, the mirrors are allowed to switch between two stable orientations, for example ±θ. Then, a beam bouncing around in one cell can be switched out on any particular bounce. A second-cell can then be added, as shown in FIG. 38.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, it will be within the ability of one of ordinary skill in the art to make alterations or modifications to the present invention, such as through the substitution of equivalent materials or structural arrangements, or through the use of equivalent process steps, so as to be able to practice the present invention without departing from its spirit as reflected in the appended claims, the text and teaching of which are hereby incorporated by reference herein. It is the intention, therefore, to limit the invention only as indicated by the scope of the claims and equivalents thereof.

What is claimed is:

1. A free-space optical interconnection device comprising:
   (a) at least one input light source, said at least one input light source adapted to generate an array of light beams;
   (b) a plurality of optical elements configured so as to define a plurality of possible light paths for each said light beam in said array;
   (c) a spatial light modulator adapted to select a path from among said light paths for each pass of a said light beam through said optical elements and reflect the light beam to said selected path, each said light beam making multiple passes through said optical elements; and (d) an output plane adapted to receive each said light beam emerging from said optical elements, said output plane having at least two dimensions, the resultant position of each said light beam on the output plane determined in one said dimension by the position of said light beam in one dimensional input array and in the other said dimension by said light paths traveled by said light beam through said optical elements.

2. An optical interconnection device according to claim 1 additionally comprising an input mirror adapted to reflect said one dimensional array of light beams into said plurality of optical elements.

3. An optical interconnection device according to claim 2 wherein said input mirror is adjustable.

4. An optical interconnection device according to claim 1 additionally comprising at least one receiving device adapted to receive a said light beam emerging from said optical elements.

5. An optical interconnection device according to claim 1 wherein said output plane is selected from the group consisting of spatial light modulators, fiber arrays, and beam collecting devices.

6. An optical interconnection device according to claim 1 wherein said plurality of optical elements is selected from the group consisting of mirrors, lenses, gratings, and prisms.

7. An optical interconnection device according to claim 1 additionally comprising an output mirror adapted to direct a said light beam emerging from said optical elements to said output plane.

8. An optical interconnection device according to claim 1 additionally comprising at least one refocusing optical element adapted to restrict the divergence of a light is beam diverted by said optical elements through at least one of said light paths.

9. An optical interconnection device according to claim 1 wherein said spatial light modulator consists of a polarizing spatial light modulator adapted to change the polarization of a said light beam directed to said spatial light modulator.

10. An optical interconnection device according to claim 9 additionally comprising a beam splitting device adapted to direct a said light beam along a said light path depending on the polarization of the light beam.

11. An optical interconnection device according to claim 1 wherein said spatial light modulator consists of a deformable mirror device spatial light modulator.

12. An optical interconnection device according to claim 1 additionally comprising an optical receiving device for each possible position of an output beam on said output plane.

13. An optical interconnection device according to claim 12 wherein said optical receiving device comprises an optical fiber.

14. An optical interconnection device according to claim 1 additionally comprising a number of optical receiving devices equal to the number of possible light beams in said input array.

15. An optical interconnection device according to claim 14 wherein each optical receiving device comprises an optical fiber.

16. An optical interconnection device comprising:
(a) an input light source, said input light source adapted to generate at least one individual light beam from at least one direction;
(b) a first optical configuration, said first optical configuration comprising:
  (i) a first plurality of optical elements configured so as to define a plurality of possible light paths for each said light beam; and
  (ii) a first spatial light modulator adapted to select a path from among said light paths for each pass of a said light beam through said first plurality of optical elements;
(c) a second optical configuration, said second optical configuration adapted to receive as input said light beams emerging from said first optical configuration, said second optical configuration comprising:
  (i) a second plurality of optical elements configured so as to define a plurality of possible light paths for each said light beam emerging from said first optical configuration; and
  (ii) a second spatial light modulator adapted to select a path from among said light paths for each pass of a said light beam through said second plurality of optical elements; and
(d) at least one receiving device adapted to receive a said light beam exiting said second optical configuration, said optical configurations adapted so that a similar period of time is needed for each said light beam to pass from said input light source through said optical configurations to said receiving device.

17. An optical interconnection device according to claim 16 additionally comprising an input mirror adapted to reflect said at least one individual light beam to said first optical configuration.

18. An optical interconnection device according to claim 17 wherein said input mirror is adjustable.

19. An optical interconnection device according to claim 16 additionally comprising an output mirror adapted to reflect each said light beam emerging from said second optical configuration.

20. An optical interconnection device according to claim 19 wherein said output mirror is adjustable.

21. An optical interconnection device according to claim 16 wherein said first optical configuration additionally comprises at least one first refocusing optical element adapted to restrict the divergence of a light beam diverted by said first plurality of optical elements through at least one of said light paths.

22. An optical interconnection device according to claim 16 wherein said second optical configuration additionally comprises at least one second refocusing optical element adapted to restrict the divergence of a light beam diverted by said second plurality of optical elements through at least one of said light paths.

23. An optical interconnection device according to claim 16 wherein said input light source is adapted to generate an array of light beams.

24. An optical interconnection device according to claim 16 wherein said first and second pluralities of optical elements are selected from the group consisting of mirrors, lenses, gratings, quarter wave plates, and prisms.

25. An optical interconnection device according to claim 16 wherein a said spatial light modulator consists of a polarizing spatial light modulator adapted to change the polarization of a said light beam directed to said spatial light modulator.

26. An optical interconnection device according to claim 25 additionally comprising a beam splitting device adapted to direct a said light beam along a said light path depending on the polarization of the light beam.

27. An optical interconnection device according to claim 16 wherein a said spatial light modulator consists of a deformable mirror device spatial light modulator adapted to reflect a said light beam to at least one of said plurality of light paths.

28. An optical interconnection device comprising:
(a) an input light source, said input light source adapted to generate at least one individual light beam from at least one direction;
(b) a first optical configuration, said first optical configuration comprising:
   (i) a first plurality of optical elements configured so as to define a plurality of possible light paths for each said light beam; and
   (ii) a spatial light modulator adapted to select a path from among said light paths for each pass of a said light beam through said first plurality of optical elements, said first optical configuration adapted to use a first portion of said spatial light modulator;
(c) a second optical configuration, said second optical configuration adapted to receive as input said light beams emerging from said first optical configuration, said second optical configuration comprising:
   (i) a second plurality of optical elements configured so as to define a plurality of possible light paths for each said light beam emerging from said first optical configuration; and
   (ii) a second portion of said spatial light modulator adapted to select a path from among said light paths for each pass of a said light beam through said second plurality of optical elements, said second portion of said spatial light modulator having no reflective elements in common with said first portion; and
(d) at least one receiving device adapted to receive a said light beam exiting said second optical configuration, said first and second optical configurations adapted so that a similar period of time is needed for each said light beam to pass from said input light source through said configurations to said receiving device.

29. An optical interconnection device according to claim 28 additionally comprising an input mirror adapted to reflect said at least one individual light beam from said input light source to said first optical configuration.

30. An optical interconnection device according to claim 29 wherein said input mirror is adjustable.

31. An optical interconnection device according to claim 28 additionally comprising an output mirror adapted to reflect each said light beam emerging from said second optical configuration to said at least one receiving device.

32. An optical interconnection device according to claim 31 wherein said output mirror is adjustable.

33. An optical interconnection device according to claim 28 wherein said first optical configuration additionally comprises at least one first refocusing optical element adapted to restrict the divergence of a light beam diverted by said first plurality of optical elements through at least one of said light paths.

34. An optical interconnection device according to claim 28 wherein said second optical configuration additionally comprises at least one second refocusing optical element adapted to restrict the divergence of a light beam diverted by said second plurality of optical elements through at least one of said light paths.

35. An optical interconnection device according to claim 28 wherein said input light source is adapted to generate an array of light beams.

36. An optical interconnection device according to claim 28 wherein said first and fail second pluralities of optical elements are selected from the group consisting of mirrors, lenses, gratings, quarter wave plates, and prisms.

37. An optical interconnection device according to claim 28 wherein a said spatial light modulator consists of a polarizing spatial light modulator adapted to change the polarization of a said light beam directed to said spatial light modulator.

38. An optical interconnection device according to claim 37 additionally comprising a beam splitting device adapted to direct a said light beam along a said light path depending on the polarization of the light beam.

39. An optical interconnection device according to claim 28 wherein a said spatial light modulator consists of a deformable mirror device spatial light modulator adapted to reflect a said light beam to at least one of said plurality of light paths.

40. An optical switching apparatus comprising:
(a) at least one input optical fiber, each said input optical fiber adapted to carry an optical signal;
(b) a first optical configuration, said first optical configuration comprising:
   (i) a first plurality of optical elements configured so as to define a plurality of possible light paths for each said optical signal; and
   (ii) a first spatial light modulator adapted to select a path from among said light paths for each pass of a said optical signal through said first plurality of optical elements;
(c) a second optical configuration, said second optical configuration adapted to receive as input a said optical signal emerging from said first optical configuration, said second optical configuration comprising:
   (i) a second plurality of optical elements configured so as to define a plurality of possible light paths for each said optical signal emerging from said first optical configuration; and
   (ii) a second spatial light modulator adapted to select a path from among said light paths for each pass of a said optical signal through said second plurality of optical elements; and
(d) a plurality of output optical fibers, each said output optical fiber adapted to carry a said optical signal exiting said second optical configuration, said first and second optical configurations adapted such that a similar period of time is needed for each said optical signal to pass from a said input optical fiber to a said output optical fiber.

41. An optical switching apparatus according to claim 40 additionally comprising an input mirror adapted to reflect said optical signal from said optical fiber to said first optical configuration.

42. An optical switching apparatus according to claim 41 wherein said input mirror is adjustable.

43. An optical switching apparatus according to claim 40 additionally comprising an output mirror adapted to reflect each said optical signal emerging from said second optical configuration to a said output optical fiber.

44. An optical switching apparatus according to claim 43 wherein said output mirror is adjustable.

45. An optical switching apparatus according to claim 40 wherein said first optical configuration additionally comprises at least one refocusing optical element adapted to restrict the divergence of a said optical signal diverted by said first plurality of optical elements through at least one of said light paths.

46. An optical switching apparatus according to claim 40 wherein said second optical configuration additionally comprises at least one refocusing optical element adapted to restrict the divergence of a said optical signal diverted by said second plurality of optical elements through at least one of said light paths.

47. An optical switching apparatus according to claim 40 wherein said first and second pluralities of optical elements are selected from the group consisting of mirrors, lenses, gratings, quarter wave plates, and prisms.

48. An optical switching apparatus according to claim 40 wherein a said spatial light modulator consists of a polarizing spatial light modulator adapted to change the polarization of a said optical signal directed to said spatial light modulator.

49. An optical switching apparatus according to claim 48 additionally comprising a beam splitting device adapted to direct a said optical signal along a said light path depending on the polarization of the light beam.

50. An optical switching apparatus according to claim 40 wherein a said spatial light modulator consists of a deformable mirror device spatial light modulator.

51. An optical switching apparatus according to claim 40 wherein said first and second spatial light modulators comprise separate regions of a single spatial light modulator.

* * * * *

UNITED STATES PATENT AND TRADEMARK OFFICE
CERTIFICATE OF CORRECTION

PATENT NO. : 6,266,176 B1
DATED : July 24, 2001
INVENTOR(S) : Betty Lise Anderson and Stuart A. Collins, Jr.

It is certified that error appears in the above-identified patent and that said Letters Patent is hereby corrected as shown below:

<u>Title page,</u>
Item [75], Inventors should read -- Betty Lise Anderson, Gahanna; Stuart A. Collins, Jr., Worthington, both of OH (US) --

Signed and Sealed this

Thirteenth Day of August, 2002

*Attest:*

*Attesting Officer*

JAMES E. ROGAN
*Director of the United States Patent and Trademark Office*